United States Patent
Sharma

(10) Patent No.: US 9,426,148 B2
(45) Date of Patent: *Aug. 23, 2016

(54) INCREASED COMMUNICATION SECURITY

(71) Applicant: EXILANT Technologies Private Limited, Bangalore (IN)

(72) Inventor: Vishnu Sharma, Bhubaneswar (IN)

(73) Assignee: EXILANT Technologies Private Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,906

(22) Filed: Aug. 27, 2014

(65) Prior Publication Data

US 2015/0281213 A1 Oct. 1, 2015

Related U.S. Application Data

(63) Continuation-in-part of application No. 14/231,625, filed on Mar. 31, 2014.

(51) Int. Cl.
*H04L 29/06* (2006.01)
*H04L 9/08* (2006.01)

(52) U.S. Cl.
CPC .............. *H04L 63/083* (2013.01); *H04L 9/083* (2013.01); *H04L 63/0428* (2013.01); *H04L 63/166* (2013.01)

(58) Field of Classification Search
CPC . H04L 9/0816; H04L 9/0819; H04L 9/0822; H04L 9/083; H04L 9/0838; H04L 9/0866
See application file for complete search history.

(56) References Cited

U.S. PATENT DOCUMENTS

| | | |
|---|---|---|
| 5,217,003 A | 6/1993 | Wilk |
| 5,875,296 A | 2/1999 | Shi et al. |
| 6,252,873 B1 | 6/2001 | Vines |
| 6,377,691 B1 | 4/2002 | Swift et al. |
| 6,879,243 B1 | 4/2005 | Booth et al. |
| 6,882,269 B2 | 4/2005 | Moreno |
| 7,050,875 B2 | 5/2006 | Cribbs et al. |
| 7,538,689 B2 | 5/2009 | Haase |

(Continued)

FOREIGN PATENT DOCUMENTS

| | | |
|---|---|---|
| IN | 202969 | 11/2006 |
| IN | 2621CHE/2008 | 10/2009 |

(Continued)

OTHER PUBLICATIONS

"Blockwise Transfers in CoAP," from http://tools.ietf.org/pdf/draft-ietf-core-block-14.pdf, Oct. 21, 2013, 31 pages.

(Continued)

*Primary Examiner* — Edward Zee

(57) ABSTRACT

A method of increasing communication security may include receiving, at a first computer system, a first message including a first data portion and a second data portion, wherein the first data portion is associated with a security token, wherein the first data portion includes a first instance of a session key, and wherein the second data portion includes a second instance of the session key. The method may also include generating a second message including the first data portion. The method may further include communicating the second message from the first computer system for delivery to a second computer system.

34 Claims, 36 Drawing Sheets

(56) References Cited

U.S. PATENT DOCUMENTS

| | | |
|---|---|---|
| 7,552,467 B2 | 6/2009 | Lindsay |
| 7,559,529 B2 | 7/2009 | Affaticati et al. |
| 7,719,422 B1 | 5/2010 | Steinmetz et al. |
| 7,828,646 B2 | 11/2010 | Franks, Jr. |
| 8,193,930 B2 | 6/2012 | Petite et al. |
| 8,500,012 B2 | 8/2013 | Amdahl et al. |
| 8,612,181 B2 | 12/2013 | Czaja et al. |
| 8,755,404 B2 | 6/2014 | Viswanathan et al. |
| 8,781,968 B1 | 7/2014 | Bushman et al. |
| 2003/0129944 A1 | 7/2003 | Chang et al. |
| 2005/0004684 A1 | 1/2005 | Cribbs |
| 2005/0021393 A1 | 1/2005 | Bao et al. |
| 2005/0033960 A1 | 2/2005 | Vialen et al. |
| 2006/0206932 A1* | 9/2006 | Chong ............... H04L 63/0807 726/10 |
| 2006/0237427 A1 | 10/2006 | Logan |
| 2008/0044014 A1 | 2/2008 | Corndorf |
| 2008/0262909 A1 | 10/2008 | Li et al. |
| 2010/0121693 A1 | 5/2010 | Pacana |
| 2011/0239283 A1 | 9/2011 | Chern |
| 2011/0271110 A1 | 11/2011 | Ohba et al. |
| 2011/0288685 A1 | 11/2011 | Usem |
| 2013/0024915 A1 | 1/2013 | Jones et al. |
| 2013/0060642 A1 | 3/2013 | Shlomot |
| 2013/0232554 A1* | 9/2013 | Campagna ............. H04L 63/08 726/4 |
| 2014/0143855 A1 | 5/2014 | Keoh et al. |
| 2014/0298037 A1 | 10/2014 | Xiao et al. |

FOREIGN PATENT DOCUMENTS

| | | |
|---|---|---|
| IN | 255060 | 1/2013 |
| IN | 124DEL/2013 | 8/2014 |
| IN | 1431CHE/2014 | 8/2014 |
| WO | 0064745 | 11/2000 |
| WO | 2006073722 | 7/2006 |
| WO | 2012065160 | 5/2012 |
| WO | 2012068591 | 5/2012 |
| WO | 2013087039 | 6/2013 |
| WO | 2014024078 | 2/2014 |
| WO | 2014179623 | 11/2014 |
| WO | 2015047744 | 4/2015 |

OTHER PUBLICATIONS

"Constrained Application Protocol (CoAP)," from http://tools.ietf.org/pdf/draft-ietf-core-coap-18.pdf, Jun. 28, 2013, 118 pages.
"CoRE Resource Directory," from http://tools.ietf.org/pdf/draft-ietf-core-resource-directory-01.pdf, Dec. 11, 2013, 28 pages.
"Datagram Transport Layer Security Version 1.2," from http://www.rfc-editor.org/rfc/pdfrfc/rfc6347.txt.pdf, Jan. 2012, 32 pages.
"Observing Resources in CoAP," from http://tools.ietf.org/pdf/draft-ietf-core-observe-12.pdf, Feb. 14, 2014, 33 pages.
"Signing and Authenticating REST Requests," Amazon Simple Storage Service Developer Guide, API Version Mar. 1, 2006, from http://docs.aws.amazon.com/AmazonS3/latest/dev/RESTAuthentication.html, accessed on Jan. 15, 2014, 8 pages.
"Access Control Framework for Constrained Environments," from https://tools.ietf.org/pdf/draft-selander-core-access-control-00.pdf, Jul. 5, 2013, 37 pages.
Jucker, Stefan, "Securing the Constrained Application Protocol," Institute for Pervasive Computing, Department of Computer Science, ETH Zurich, Oct. 10, 2012, 103 pages.
Kelly, S. et al., "Using HMAC-SHA-256, HMAC-SHA-384, and HMAC-SHA-512 with IPsec," Request for Comments 4868, Internet Engineering Task Force, May 2007, 21 pages.
Ukil, Arijit et al., "Lightweight Security Scheme for Vehicle Tracking System Using CoAP," Proceedings of the International Workshop on Adaptive Security (ASPI 2013), Sep. 2013, 8 pages.
"Using CoAP with IPsec," from http://tools.ietf.org/pdf/draft-bormann-core-ipsec-for-coap-00.pdf, Dec. 6, 2012, 9 pages.
"Delegated CoAP Authorization Function (DCAF)," from https://tools.ietf.org/pdf/draft-gerdes-core-dcaf-authorize-00.pdf, Jul. 15, 2013, 35 pages.
"Guide to Supervisory Control and Data Acquisition (SCADA) and Industrial Control Systems Security," from https://www.dhs.gov/sites/default/files/publications/csd-nist-guidetosupervisoryand-dataccquisition-scadaandindustrialcontrolsystemssecurity-2007.pdf, Sep. 2006, 164 pages.
"Lightweight Mutual Authentication for CoAP (WIP)," from https://tools.ietf.org/pdf/draft-bhattacharyya-core-coap-lite-auth-00.pdf, Mar. 3, 2014, 11 pages.
"Remote Sensing and Control for Establishing and Maintaining Digital Irrigation," from http://airccse.org/journal/IJAIT/papers/2112ijait02.pdf, Feb. 2012, 15 pages.
"Wireless Sensor/Actuator Network Design for Mobile Control Applications," from http://arxiv.org/ftp/arxiv/papers/0806/0806.1569.pdf, 2007, 17 pages.
EESR, European Application No. 15156551.2, mailed Aug. 26, 2015.
EESR, European Application No. 15156583.5, mailed Aug. 26, 2015.
EESR, European Application No. 15161863.4, mailed Aug. 26, 2015.
EESR, European Application No. 15182286.3, mailed Jan. 20, 2016.
EESR, European Application No. 15182308.5, mailed Jan. 20, 2016.
EESR, European Application No. 15182322.6, mailed Jan. 20, 2016.
EESR, European Application No. 15182345.7, mailed Jan. 20, 2016.
U.S. Notice of Allowance, U.S. Appl. No. 14/231,625, mailed Jan. 8, 2016.
U.S. Notice of Allowance, U.S. Appl. No. 14/231,625, mailed Mar. 24, 2016.
U.S. Notice of Allowance, U.S. Appl. No. 14/231,656, mailed Mar. 29, 2016.
U.S. Notice of Allowance, U.S. Appl. No. 14/470,896, mailed Feb. 25, 2016.
U.S. Notice of Allowance, U.S. Appl. No. 14/470,917, mailed Feb. 22, 2016.
U.S. Office Action, U.S. Appl. No. 14/231,625, mailed Jul. 6, 2015.
U.S. Office Action, U.S. Appl. No. 14/231,625, mailed Oct. 14, 2015.
U.S. Office Action, U.S. Appl. No. 14/231,634, mailed Feb. 29, 2016.
U.S. Office Action, U.S. Appl. No. 14/231,634, mailed Nov. 18, 2015.
U.S. Office Action, U.S. Appl. No. 14/231,656, mailed Aug. 7, 2015.
U.S. Office Action, U.S. Appl. No. 14/470,896, mailed Aug. 28, 2015.
U.S. Office Action, U.S. Appl. No. 14/470,914, mailed Aug. 26, 2015.
U.S. Office Action, U.S. Appl. No. 14/470,914, mailed Mar. 10, 2016.
U.S. Office Action, U.S. Appl. No. 14/470,917, mailed Sep. 9, 2015.
U.S. Notice of Allowance, U.S. Appl. No. 14/470,896, mailed May 16, 2016.
U.S. Notice of Allowance, U.S. Appl. No. 14/470,917, mailed May 23, 2016.
U.S. Office Action, U.S. Appl. No. 14/470,914, mailed Jun. 14, 2016.
U.S. Notice of Allowance, U.S. Appl. No. 14/231,625, mailed Jun. 21, 2016.
U.S. Notice of Allowance, U.S. Appl. No. 14/231,656, mailed Jun. 21, 2016.

* cited by examiner

210

| Version 310 | Message Type 320 | Token Length 330 | Code 340 | Message Identifier 350 |

| Option Identifier 412 | Option Length 414 | Option Value 416 |
|---|---|---|
| Option Identifier 422 | Option Length 424 | Option Value 426 |
| Option Identifier 432 | Option Length 434 | Option Value 436 |

410 ⎨ (first row)
420 ⎨ (second row)
430 ⎨ (third row)

| Version: 1 | Type: 0 (CON) | Token Length: 1 | Code: 0.01 (GET) | Message ID: "0xbc90" |
|---|---|---|---|---|
| Token: "0x71" | | | | |
| Option Identifier: 3 (Uri-Host) | Option Length: 15 | Option Value: "www.example.com" | | |
| Option Identifier: 4 (Uri-Port) | Option Length: 2 | Option Value: "5683" | | |
| Option Identifier: 4 (Uri-Path) | Option Length: 7 | Option Value: "sensors" | | |
| Option Identifier: 0 (Uri-Path) | Option Length: 11 | Option Value: "temperature" | | |
| Option Identifier: 3 (Max-Age) | Option Length: 1 | Option Value: "0" | | |
| Option Identifier: 1 (Uri-Query) | Option Length: 9 | Option Value: "uid=cs110" | | |
| Option Identifier: 0 (Uri-Query) | Option Length: 7 | Option Value: "hs256=1" | | |
| Option Identifier: 0 (Uri-Query) | Option Length: 7 | Option Value: "nonce=1" | | |
| Payload Marker: 0xFF | Payload: Authentication Data 1 | | | |

| Version: 1 | Type: 2 (ACK) | Token Length: 1 | Code: 2.05 (Content) | Message ID: "0xbc90" |
|---|---|---|---|---|
| Token: "0x71" | | | | |
| Option Identifier: 14 (Max-Age) | Option Length: 1 | Option Value: "0" | | |
| Option Identifier: 1 (Uri-Query) | Option Length: 9 | Option Value: "uid=cs120" | | |
| Option Identifier: 0 (Uri-Query) | Option Length: 7 | Option Value: "hs256=1" | | |
| Option Identifier: 0 (Uri-Query) | Option Length: 7 | Option Value: "nonce=1" | | |
| Payload Marker: 0xFF | Payload: "22.5 C"; Authentication Data 2 | | | |

| Unique Identifier | Key |
|---|---|
| cs110 | Key 1 |
| cs120 | Key 2 |
| cs130 | Key 3 |
| cs140 | Key 4 |

| Unique Identifier | Unique Identifier |
|---|---|
| cs120 | cs110 |
| | cs130 |
| | cs140 |
| cs150 | cs110 |
| | cs160 |
| cs170 | cs110 |

1610 (left column), 1620 (right column)

| Version: 1 | Type: 0 (CON) | Token Length: 1 | Code: 0.01 (GET) | Message ID: "0x7d34" |
|---|---|---|---|---|
| Token: "0x72" | | | | |
| Option Identifier: 3 (Uri-Host) | Option Length: 15 | Option Value: "www.example.com" | | |
| Option Identifier: 4 (Uri-Port) | Option Length: 2 | Option Value: "5683" | | |
| Option Identifier: 4 (Uri-Path) | Option Length: 20 | Option Value: "communicationrequest" | | |
| Option Identifier: 3 (Max-Age) | Option Length: 1 | Option Value: "0" | | |
| Option Identifier: 1 (Uri-Query) | Option Length: 9 | Option Value: "tid=cs120" | | |
| Option Identifier: 0 (Uri-Query) | Option Length: 9 | Option Value: "uid=cs110" | | |
| Option Identifier: 0 (Uri-Query) | Option Length: 7 | Option Value: "hs256=1" | | |
| Option Identifier: 0 (Uri-Query) | Option Length: 7 | Option Value: "nonce=1" | | |
| Payload Marker: 0xFF | Payload: Authentication Data A | | | |

| Version: 1 | Type: 2 (ACK) | Token Length: 1 | Code: 2.05 (Content) | Message ID: "0x7d34" |
|---|---|---|---|---|
| Token: "0x72" | | | | |
| Option Identifier: 14 (Max-Age) | Option Length: 1 | Option Value: "0" | | |
| Option Identifier: 1 (Uri-Query) | Option Length: 10 | Option Value: "uid=cs1430" | | |
| Option Identifier: 0 (Uri-Query) | Option Length: 7 | Option Value: "hs256=1" | | |
| Option Identifier: 0 (Uri-Query) | Option Length: 7 | Option Value: "nonce=1" | | |
| Payload Marker: 0xFF | Payload: First Data Portion Associated With Security Token; Second Data Portion Including Instance Of Session Key; Authentication Data B | | | |

| Unique Identifier Of Caller System 1910 | Unique Identifier Of Target System 1920 | Expiration Data 1930 | Instance Of Session Key 1940 |

| Unique Identifier | Unique Identifier | Key |
|---|---|---|
| cs120 | cs110 | Session Key 1 |
|  | cs130 | Session Key 2 |
|  | cs140 | Session Key 3 |
| cs150 | cs110 | Session Key 4 |
|  | cs160 | Session Key 5 |
| cs170 | cs110 | Session Key 6 |

| Unique Identifier | Key |
|---|---|
| cs120 | Session Key 1 |
| cs150 | Session Key 4 |
| cs170 | Session Key 6 |

| Version: 1 | Type: 0 (CON) | Token Length: 1 | Code: 0.01 (GET) | Message ID: "0x7a10" |
|---|---|---|---|---|
| Token: "0x73" | | | | |
| Option Identifier: 3 (Uri-Host) | | Option Length: 15 | Option Value: "www.example.com" | |
| Option Identifier: 4 (Uri-Port) | | Option Length: 2 | Option Value: "5683" | |
| Option Identifier: 4 (Uri-Path) | | Option Length: 11 | Option Value: "keytransfer" | |
| Option Identifier: 3 (Max-Age) | | Option Length: 1 | Option Value: "0" | |
| Option Identifier: 1 (Uri-Query) | | Option Length: 9 | Option Value: "uid=cs110" | |
| Option Identifier: 0 (Uri-Query) | | Option Length: 7 | Option Value: "hs256=1" | |
| Option Identifier: 0 (Uri-Query) | | Option Length: 7 | Option Value: "nonce=1" | |
| Payload Marker: 0xFF | | Payload: Data Portion Associated With Security Token; Authentication Data C | | |

| Version: 1 | Type: 2 (ACK) | Token Length: 1 | Code: 2.05 (Content) | Message ID: "0x7a10" |
|---|---|---|---|---|
| Token: "0x73" | | | | |
| Option Identifier: 14 (Max-Age) | | Option Length: 1 | Option Value: "0" | |
| Option Identifier: 1 (Uri-Query) | | Option Length: 9 | Option Value: "uid=cs120" | |
| Option Identifier: 0 (Uri-Query) | | Option Length: 7 | Option Value: "hs256=1" | |
| Option Identifier: 0 (Uri-Query) | | Option Length: 7 | Option Value: "nonce=1" | |
| Payload Marker: 0xFF | | Payload: "Key Transfer Successful"; Authentication Data D | | |

| Unique Identifier | Key |
|---|---|
| cs110 | Session Key 1 |
| cs130 | Session Key 2 |
| cs140 | Session Key 3 |

INCREASED COMMUNICATION SECURITY

RELATED APPLICATIONS

The present application is a continuation-in-part of U.S. patent application Ser. No. 14/231,625, filed Mar. 31, 2014, entitled "INCREASED COMMUNICATION SECURITY," naming Vishnu Sharma as the inventor, and having attorney docket number EXLT-0002.US1. That application is incorporated herein by reference in its entirety and for all purposes.

The present application is related to U.S. patent application Ser. No. 14/470,896, filed Aug. 27, 2014, entitled "INCREASED COMMUNICATION SECURITY," naming Vishnu Sharma as the inventor, and having attorney docket number EXLT-0002.P1.US1. The present application is also related to U.S. patent application Ser. No. 14/470,914, filed Aug. 27, 2014, entitled "INCREASED COMMUNICATION SECURITY," naming Vishnu Sharma as the inventor, and having attorney docket number EXLT-0002.P3.US1. The present application is also related to U.S. patent application Ser. No. 14/470,917, filed Aug. 27, 2014, entitled "INCREASED COMMUNICATION SECURITY," naming Vishnu Sharma as the inventor, and having attorney docket number EXLT-0002.P4.US1. Those applications are incorporated herein by reference in their entirety and for all purposes.

BACKGROUND

The Constrained Application Protocol (CoAP) is a protocol for allowing computer systems or devices to communicate by exchanging messages. The protocol specifies certain parameters related to message format and message exchange rules. Messages sent over CoAP can be relatively small in size, and therefore, CoAP allows communication between computer systems or devices with limited processing resources and/or limited storage resources. These computer systems or devices are sometimes referred to as "constrained nodes" or "constrained devices."

To address security concerns associated with communication via CoAP messages, it has been suggested that messages sent over CoAP use Datagram Transport Layer Security (DTLS). Although DTLS can increase the security of communications, it does not provide for authentication of the sender of the CoAP message.

SUMMARY

Embodiments disclosed herein are directed to increased security for communication of messages between computer systems or devices.

In one embodiment, a method of increasing communication security may include receiving, at a first computer system, a first message including a first data portion and a second data portion, wherein the first data portion is associated with a security token, wherein the first data portion includes a first instance of a session key, and wherein the second data portion includes a second instance of the session key. The method may also include generating a second message including the first data portion. The method may further include communicating the second message from the first computer system for delivery to a second computer system.

In another embodiment, an apparatus may include a communication interface configured to receive a first message including a first data portion and a second data portion, wherein the first data portion is associated with a security token, wherein the first data portion includes a first instance of a session key, and wherein the second data portion includes a second instance of the session key. The apparatus may also include a message generation component configured to generate a second message including the first data portion. The communication interface may be further configured to communicate the second message.

In yet another embodiment, an apparatus may include means for receiving, at a first computer system, a first message including a first data portion and a second data portion, wherein the first data portion is associated with a security token, wherein the first data portion includes a first instance of a session key, and wherein the second data portion includes a second instance of the session key. The apparatus may also include means for generating a second message including the first data portion. The apparatus may further include means for communicating the second message from the first computer system for delivery to a second computer system.

BRIEF DESCRIPTION OF THE DRAWINGS

The present invention is illustrated by way of example, and not by way of limitation, in the figures of the accompanying drawings and in which like reference numerals refer to the same or similar elements.

FIG. 3 shows a portion associated with a header of a CoAP message in accordance with one embodiment.

FIG. 4 shows a portion associated with at least one option of a CoAP message in accordance with one embodiment.

FIG. 5A shows a CoAP message associated with a request in accordance with one embodiment.

FIG. 5B shows a CoAP message associated with a response in accordance with one embodiment.

FIG. 7 shows data associated with at least one key in accordance with one embodiment.

FIG. 16 shows permissions configuration data in accordance with one embodiment.

FIG. 17A shows a CoAP message in accordance with one embodiment.

FIG. 17B shows a CoAP message in accordance with one embodiment.

FIG. 19 shows a data portion associated with a security token in accordance with one embodiment.

FIG. 21 shows data associated with at least one session key in accordance with one embodiment.

FIG. 23 shows data associated with at least one session key accessible to a caller system in accordance with one embodiment.

FIG. 24A shows a CoAP message in accordance with one embodiment.

FIG. 24B shows a CoAP message in accordance with one embodiment.

FIG. 27 shows data associated with at least one session key accessible to a target system in accordance with one embodiment.

DETAILED DESCRIPTION OF THE INVENTION

Figure 1:
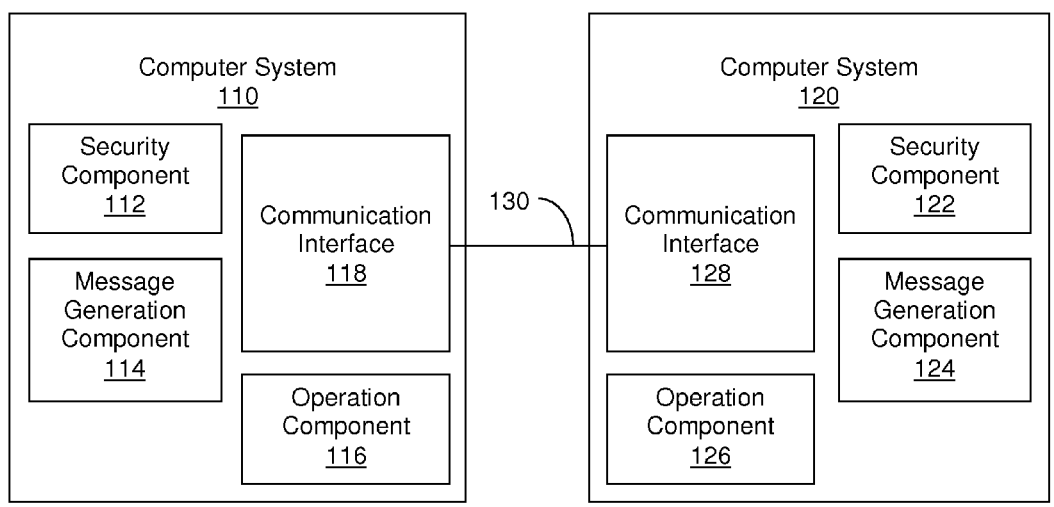
FIG. 1 shows a system for increasing communication security in accordance with one embodiment.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "activating," "adding," "adjusting," "allocating," "allowing," "analyzing," "applying," "assembling," "assigning," "authenticating," "authorizing," "balancing," "blocking," "calculating," "capturing," "causing," "changing," "charging," "combining," "comparing," "collecting," "communicating," "comparing," "configuring," "controlling," "converting," "correlating," "creating," "deactivating," "debugging," "decreasing," "decrypting," "defining," "delivering," "depicting," "detecting," "determining," "discharging," "displaying," "downloading," "enabling," "encrypting," "establishing," "executing," "forwarding," "flipping," "generating," "grouping," "hiding," "identifying," "ignoring," "increasing," "initiating," "instantiating," "interacting," "measuring," "modifying," "monitoring," "moving," "outputting," "parsing," "performing," "placing," "presenting," "processing," "programming," "providing," "provisioning," "querying," "receiving," "reformatting," "regulating," "removing," "rendering," "repeating," "resuming," "retaining," "sampling," "simulating," "selecting," "sending," "sorting," "storing," "subtracting," "suspending," "tracking," "transcoding," "transforming," "transmitting," "unblocking," "using," "validating," "verifying," or the like, may refer to the action and/or processes of a computer system, or similar electronic computing device, that manipulates and transforms data represented as physical (electronic) quantities within the computer system's registers and memories into other data similarly represented as physical quantities within the computer system memories or registers or other such information storage, transmission and/or display devices.

Embodiments

FIG. 1 shows system 100 for increasing communication security in accordance with one embodiment. As shown in FIG. 1, computer system 110 and computer system 120 may communicate Constrained Application Protocol (CoAP) messages over connection 130. Authentication data may be generated and included in one or more of the CoAP messages. The authentication data may allow message validation to be performed for verifying the authenticity of the sender of the CoAP message and/or the integrity of the CoAP message. And in one embodiment, where a CoAP message includes a nonce, security can be improved by allowing the recipient of the CoAP message to detect and/or act on a replay attack.

Figure 2:
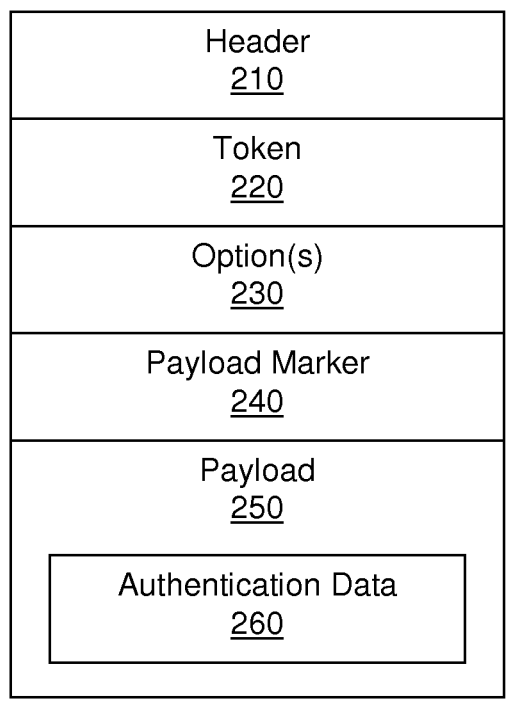
FIG. 2 shows a CoAP message in accordance with one embodiment.

FIG. 2 shows CoAP message 200 in accordance with one embodiment. CoAP message 200 may be part of a bit stream or byte stream used for communication between a plurality of systems or devices (e.g., computer system 110, computer system 120, etc.). The term "CoAP message" as used herein may refer to data which is formatted and/or communicated in accordance with CoAP.

As shown in FIG. 2, CoAP message 200 may include portion 210 associated with a header, portion 220 associated with a token, portion 230 associated with at least one option, portion 240 associated with a payload marker, and portion 250 associated with a payload, or some combination thereof. Authentication data 260 may be included in portion 250 in one embodiment.

Portion 210 may include one or more sub-portions of data. For example, as shown in FIG. 3, portion 210 may include portion 310 associated with a version, portion 320 associated with a message type, portion 330 associated with a token length, portion 340 associated with a code, portion 350 associated with a message identifier, some combination thereof, etc.

Portion 310 may be data associated with a CoAP version number. In one embodiment, portion 310 may be two bits in length. And in other embodiments, portion 310 may be larger or smaller than two bits in length.

As shown in FIG. 3, portion 320 may be data associated with a message type of CoAP message 200. For example, the message type associated with portion 320 may be confirmable, non-confirmable, acknowledgement, reset, etc.

In one embodiment, portion 320 may be two bits in length. And in other embodiments, portion 320 may be larger or smaller than two bits in length.

Portion 330 may be data associated with a length of a token (e.g., the length of portion 220 of FIG. 2) of CoAP message 200. In one embodiment, portion 330 may be four bits in length. And in other embodiments, portion 330 may be larger or smaller than four bits in length.

As shown in FIG. 3, portion 340 may be data associated with a code. In one embodiment, the code associated with portion 340 may be a method code. For example, the code associated with portion 340 may be "GET," "POST," "PUT," "DELETE," etc. In one embodiment, the code associated with portion 340 may be a response code. For example, the code associated with portion 340 may be "Created," "Deleted," "Valid," "Changed," "Content," "Bad Request," "Unauthorized," "Bad Option," "Forbidden,' "Not Found," etc.

In one embodiment, portion 340 may be eight bits in length. And in other embodiments, portion 340 may be larger or smaller than eight bits in length.

Portion 350 may be data associated with a message identifier. The message identifier associated with portion 350 may be used to match or group CoAP messages based on message type (e.g., to match or group a confirmable or non-confirmable CoAP message with an acknowledgement or reset CoAP message) in one embodiment. For example, a confirmable or non-confirmable CoAP message may be matched or grouped with an acknowledgement or reset CoAP message.

In one embodiment, the message identifier associated with portion 350 may be used (e.g., in conjunction with a nonce) to distinguish a properly re-sent message (e.g., with a different nonce than a previous message with the same message identifier) from a replay attack (e.g., resulting from the sending of a message with the same nonce and the same message identifier).

In one embodiment, portion 350 may be 16 bits in length. And in other embodiments, portion 350 may be larger or smaller than 16 bits in length.

Although FIG. 3 shows portion 210 with a specific number and type of portions, it should be appreciated that portion 210 may include a different number and/or type of portions in other embodiments. For example, portion 210 may include fewer portions or at least one additional portion. As another example, a plurality of portions of portion 210 may be combined into a smaller number of portions. Although FIG. 3 shows portion 210 with a specific organization of portions, it should be appreciated that portion 210 may include a different organization of portions in other embodiments.

Turning back to FIG. 2, portion 220 may be associated with a token. The token associated with portion 220 may be used to match or group at least one request (e.g., one or more CoAP messages) to at least one response (e.g., one or more other CoAP messages) in one embodiment.

In one embodiment, portion 220 may be at most eight bits in length. The length of portion 220 may be associated with and/or dictated by portion 330 in one embodiment. And in other embodiments, portion 220 may be larger than eight bits in length.

As shown in FIG. 2, portion 230 may be associated with at least one option. The at least one option associated with portion 230 may include a unique identifier in one embodiment. For example, the at least one option associated with portion 230 may include a unique identifier associated with a sender of a CoAP message (e.g., computer system 110, computer system 120, etc.). In one embodiment, the unique identifier may be included in portion 230 as an option associated with a query (e.g., a "Uri-Query" option).

In one embodiment, the at least one option associated with portion 230 may include an authentication mechanism identifier. The term "authentication mechanism identifier" as used herein may be any data or metadata that identifies or is otherwise associated with an authentication mechanism For example, the at least one option associated with portion 230 may include an authentication mechanism identifier associated with an authentication mechanism used to generate authentication data 260. In one embodiment, the authentication mechanism identifier may be included in portion 230 as an option associated with a query (e.g., a "Uri-Query" option).

The at least one option associated with portion 230 may include a nonce in one embodiment. The nonce may be a random number, a pseudorandom number, a sequential or incremental number (e.g., a number with a predetermined offset from the nonce of a previously-transmitted CoAP message), a timestamp, etc. In one embodiment, the nonce may be included in portion 230 as an option associated with a query (e.g., a "Uri-Query" option).

In one embodiment, the at least one option associated with portion 230 may include a max-age value. For example, the max-age value may be used to indicate that the message is not to be cached by an intermediary system or device (e.g., situated between the sender of the CoAP message and the ultimate recipient of the CoAP message) such as a proxy server or other type of computer system or device.

The at least one option associated with portion 230 may include other data in one embodiment. For example, the at least one option associated with portion 230 may include data associated with a host, data associated with a port, data associated with a path, some combination thereof, etc. As another example, the at least one option associated with portion 230 may include data associated with a query (e.g., including at least one parameter). In one embodiment, each parameter of the query may be encoded in portion 230 as a respective option.

In one embodiment, portion 230 may include one or more respective sub-portions of data associated with each option of the at least one option. For example, as shown in FIG. 4, for each option of the at least one option (e.g., 410, 420, 430, etc.), portion 230 may include a respective portion associated with an option identifier (e.g., 412, 422, 432, etc.), a respective portion associated with an option length (e.g., 414, 424, 434, etc.), a respective portion associated with an option value (e.g., 416, 426, 436, etc.), etc.

A portion associated with an option identifier (e.g., 412, 422, 432, etc.) may include data associated with an option number corresponding to an option associated with the portion (e.g., option 410, option 420, option 430, etc.). For example, where option 410 is associated with a port (e.g., a "Uri-Port" option), portion 412 may include data associated with a numerical value of "7" (e.g., where "7" is the option number corresponding to an option associated with a port) as the option identifier. As another example, where option 420 is associated with a path (e.g., a "Uri-Path" option), portion 422 may include data associated with a numerical value of "11" (e.g., where "11" is the option number corresponding to an option associated with a path) as the option identifier. And as yet another example, where option 430 is associated with a query (e.g., a "Uri-Query" option), portion 432 may include data associated with a numerical value of "15" (e.g., where "15" is the option number corresponding to an option associated with a query) as the option identifier.

In one embodiment, a portion associated with an option identifier (e.g., 412, 422, 432, etc.) may include data associated with an option delta corresponding to an option associated with the portion (e.g., option 410, option 420, option 430, etc.). An option delta may be the difference between the current option number and the option number of the preceding option in one embodiment. For the first option, a numerical value of "0" may be used for the option number of the preceding option. A delta of "0" may be used for subsequent instances of the same option.

For example, where portion 412 is associated with an option number corresponding to "7" and option 410 is the first option, then portion 412 may include data associated with a numerical value of "7" (e.g., the delta or difference between "0" and "7") as the option identifier. As another example, where portion 412 is associated with an option number corresponding to "7" and portion 422 is associated with an option number corresponding to "11," then portion 422 may include data associated with a numerical value of "4" (e.g., the delta or difference between "7" and "11") as the option identifier. As yet another example, where portion 422 is associated with an option number corresponding to "11" and portion 432 is associated with an option number corresponding to "15," then portion 432 may include data associated with a numerical value of "4" (e.g., the delta or difference between "11" and "15") as the option identifier.

A portion associated with an option length (e.g., 414, 424, 434, etc.) may include a length of a corresponding portion associated with an option value (e.g., 416, 426, 436, etc.). For example, where portion 416 includes data associated with a port of "5683," portion 414 may include data associated with a length of two bytes (e.g., where two bytes are used to encode a numerical value of "5683"). As another example, where portion 426 includes data associated with a path of "temperature," portion 424 may include data associated with a length of 11 bytes (e.g., where 11 bytes are used to encode the path of "temperature"). As yet another example, where portion 436 includes data associated with a unique identifier of "uid=cs110," portion 434 may include data associated with a length of 9 bytes (e.g., where 9 bytes are used to encode the unique identifier of "uid=cs110").

Although FIG. 4 shows at least one option 230 with a specific number and type of portions, it should be appreciated that at least one option 230 may include a different number and/or type of portions in other embodiments. For example, at least one option 230 may include fewer portions (e.g., a smaller number of options, a smaller number of respective sub-portions associated with each option, etc.) or at least one additional portion (e.g., a larger number of options, a larger number of respective sub-portions associated with each option, etc.). As another example, a plurality of portions of at least one option 230 may be combined into a smaller number of portions. Although FIG. 4 shows at least one option 230 with a specific organization of portions, it should be appreciated that at least one option 230 may include a different organization of portions in other embodiments.

Turning back to FIG. 2, portion 240 may be associated with a payload marker. Portion 240 may be included in CoAP message 200 if portion 250 (e.g., associated with a payload) is included in CoAP message 200.

Portion 250 may be associated with a payload. In one embodiment, portion 250 may include only authentication data 260. In this case, the payload associated with portion 250 may include only authentication data 260 and no other data, content, etc. Alternatively, portion 250 may include data and/or content in addition to authentication data 260. In this case, authentication data 260 may be included in the last portion of portion 250 (e.g., with other data and/or content of the payload preceding authentication data 260), the first portion of portion 250 (e.g., with other data and/or content of the payload following authentication data 260), an intermediary portion of portion 250 (e.g., with other data and/or content of the payload both preceding and following authentication data 260), etc.

In one embodiment, CoAP message 200 may be associated with a request sent from at least one computer system to at least one other computer system. In this case, CoAP message 200 may include data associated with a request for the at least one recipient to perform at least one operation.

Alternatively, CoAP message 200 may be associated with a response sent from at least one computer system to at least one other computer system. In this case, CoAP message 200 may include data and/or content associated with a corresponding request (e.g., of a previously-communicated CoAP message). For example, CoAP message 200 may include data and/or content accessed as a result of performing at least one operation requested via a previously-communicated CoAP message.

A first CoAP message (e.g., associated with a request) and a second CoAP message (e.g., associated with a response to the request of the first CoAP message) may share a common message identifier (e.g., associated with data of portion 350 of FIG. 3) in one embodiment. A first CoAP message (e.g., associated with a request) and a second CoAP message (e.g., associated with a response to the request of the first CoAP message) may share a common token (e.g., associated with data of portion 220 of FIG. 2) in one embodiment.

In one embodiment, where a first CoAP message is associated with a request and a second CoAP message is associated with a response to the request (e.g., of the first CoAP message), a message type (e.g., associated with data of portion 320 as shown in FIG. 3) associated with the second CoAP message may correspond to and/or be determined by a message type (e.g., associated with data of portion 320 as shown in FIG. 3) associated with the first CoAP message. For example, where the first CoAP message is associated with a message type of "confirmable," the second CoAP message may be associated with a message type of "confirmable" or "acknowledgement."

In one embodiment, where a first CoAP message is associated with a request and a second CoAP message is associated with a response to the request (e.g., of the first CoAP message), a response code (e.g., associated with data of portion 340 as shown in FIG. 3) associated with the second CoAP message may correspond to and/or be determined by a method code (e.g., associated with data of portion 340 as shown in FIG. 3) associated with the first CoAP message. For example, where the first CoAP message is associated with a method code of "GET," the second CoAP message may be associated with a response code of "Content" (e.g., including the data and/or content requested using the first CoAP message).

FIG. 5A shows CoAP message 500A associated with a request in accordance with one embodiment. As shown in FIG. 5A, CoAP message 500A may include data associated with a header, where the data associated with the header includes data associated with a version (e.g., "1"), a message type (e.g., "CON" or confirmable), a token length (e.g., "1" associated with a length of 1 byte), a code (e.g., a method code of "GET"), and a message identifier (e.g., "0xbc90"). Data associated with a token (e.g., "0x71") may also be included in CoAP message 500A.

CoAP message 500A may include data associated with at least one option. For example, CoAP message 500A may include data associated with a host (e.g., an option value of "www.example.com"), data associated with a port (e.g., an option value of "5683"), data associated with a path (e.g., an option value of "sensors," an option value of "temperature," etc.), some combination thereof, etc. In this case, at least one option associated with CoAP message 500A may correspond to a URI of "coap://www.example.com:5683/sensors/temperature", "coap://www.example.com/sensors/temperature", "coaps://www.example.com:5683/sensors/temperature", "coaps://www.example.com/sensors/temperature", some combination thereof, etc.

As another example, CoAP message 500A may include data associated with a max-age value (e.g., an option value of "0"). In this case, a max-age value of "0" may be used to indicate that CoAP message 500A is not to be cached by an intermediary system or device (e.g., situated between the sender of the CoAP message 500A and the ultimate recipient of the CoAP message 500A) such as a proxy server or other type of computer system or device.

As a further example, CoAP message 500A may include data associated with a query (e.g., including one or more parameters). An option value of "uid=cs110" (e.g., associated with a first parameter) may be associated with a unique identifier (e.g., "cs110") of a sender of CoAP message 500A (e.g., computer system 110). An option value of "hs256=1" (e.g., associated with a second parameter) may be associated with an authentication mechanism (e.g., hash-based message authentication code (HMAC) utilizing a hash function of SHA256) used to generate the authentication data (e.g., "Authentication Data 1") included in CoAP message 500A. An option value of "nonce=1" (e.g., associated with a third parameter) may be associated with a nonce (e.g., with a value of "1") included in CoAP message 500A.

In one embodiment, one or more portions of CoAP message 500A may be associated with a URI including at least one parameter of a query. For example, CoAP message 500A may be associated with a URI of "coap://www.example.com:5683/sensors/temperature?uid=cs110&hs256=1&nonce=1" or "coaps://www.example.com:5683/sensors/temperature?uid=cs110&hs256=1&nonce=1".

CoAP message 500A may include data associated with at least one option length. For example, CoAP message 500A may include data associated with a first option length (e.g., 15 bytes) corresponding to data associated with a first option value (e.g., "www.example.com"), a second option length (e.g., 2 bytes) corresponding to data associated with a second option value (e.g., "5683"), a third option length (e.g., 7 bytes) corresponding to data associated with a third option value (e.g., "sensors"), etc.

As shown in FIG. 5A, CoAP message 500A may include data associated with at least one option identifier. The at least one option identifier may include data associated with an option number and/or an option delta in one embodiment. For example, CoAP message 500A may include data associated with a first numerical value (e.g., "3") as a first option identifier corresponding to a first option (e.g., associated with a host), where the first numerical value (e.g., "3") may be the delta or difference between the current option number (e.g., "3") and the option number of the preceding option (e.g., "0" in this case since this is the first option). As such, the first numerical value of "3" may correspond to an option number of "3."

As another example, CoAP message 500A may include data associated with a second numerical value (e.g., "4") as a second option identifier corresponding to a second option (e.g., associated with a port), where the second numerical value (e.g., "4") may be the delta or difference between the current option number (e.g., "7") and the option number of the preceding option (e.g., "3"). As such, the second numerical value of "4" may correspond to an option number of "7."

As a further example, CoAP message 500A may include data associated with a third numerical value (e.g., "4") as a third option identifier corresponding to a third option (e.g., associated with a path), where the third numerical value (e.g., "4") may be the delta or difference between the current option number (e.g., "11") and the option number of the preceding option (e.g., "7"). As such, the third numerical value of "4" may correspond to an option number of "11."

As shown in FIG. 5A, CoAP message 500A may include data associated with a payload marker (e.g., "0xFF"). CoAP message 500A may include data associated with a payload, where the data associated with a payload may include authentication data (e.g., "Authentication Data 1").

Although FIG. 5A shows CoAP message 500A with a specific number and type of portions, it should be appreciated that CoAP message 500A may include a different number and/or type of portions in other embodiments. For example, CoAP message 500A may include fewer portions or at least one additional portion. As another example, a plurality of portions of CoAP message 500A may be combined into a smaller number of portions. Although FIG. 5A shows CoAP message 500A with a specific organization of portions, it should be appreciated that CoAP message 500A may include a different organization of portions in other embodiments.

In one embodiment, data associated with at least one option may be excluded from CoAP message 500A. For example, data (e.g., associated with a host, a port, a path, a max-age value, or some combination thereof) used by intermediary systems or devices (e.g., situated between the sender of CoAP message 500A and the ultimate recipient of CoAP message 500A) such as a proxy server or other type of computer system or device may be excluded in one or more embodiments where intermediary systems or devices do not exist or are unlikely to exist.

FIG. 5B shows CoAP message 500B associated with a response in accordance with one embodiment. As shown in FIG. 5B, CoAP message 500B may include data associated with a header, where the data associated with the header includes data associated with a version (e.g., "1"), a message type (e.g., "ACK" or acknowledgement), a token length (e.g., "1" associated with a length of 1 byte), a code (e.g., a response code of "Content"), and a message identifier (e.g., "0xbc90"). Data associated with a token (e.g., "0x71") may also be included in CoAP message 500B.

CoAP message 500B may include data associated with at least one option. For example, CoAP message 500B may include data associated with a max-age value (e.g., an option value of "0"). In this case, a max-age value of "0" may be used to indicate that CoAP message 500B is not to be cached by an intermediary system or device (e.g., situated between the sender of the CoAP message 500B and the ultimate recipient of the CoAP message 500B) such as a proxy server or other type of computer system or device.

As another example, CoAP message 500B may include data associated with a query (e.g., including one or more parameters). An option value of "uid=cs120" (e.g., associated with a first parameter) may be associated with a unique identifier (e.g., "cs120") of a sender of CoAP message 500B (e.g., computer system 120). An option value of "hs256=1" (e.g., associated with a second parameter) may be associated with an authentication mechanism (e.g., hash-based message authentication code (HMAC) utilizing a hash function of SHA256) used to generate the authentication data (e.g., "Authentication Data 2") included in CoAP message 500B. An option value of "nonce=1" (e.g., associated with a third parameter) may be associated with a nonce (e.g., with a value of "1") included in CoAP message 500B.

CoAP message 500B may include data associated with at least one option length. For example, CoAP message 500B may include data associated with a first option length (e.g., 1 byte) corresponding to data associated with a first option value (e.g., "0"), a second option length (e.g., 9 bytes) corresponding to data associated with a second option value (e.g., "uid=cs120"), a third option length (e.g., 7 bytes) corresponding to data associated with a third option value (e.g., "hs256=1"), etc.

As shown in FIG. 5B, CoAP message 500B may include data associated with at least one option identifier. The at least one option identifier may include data associated with an option number and/or an option delta in one embodiment. For example, CoAP message 500B may include data associated with a first numerical value (e.g., "14") as a first option identifier corresponding to a first option (e.g., associated with a max-age value), where the first numerical value (e.g., "14") may be the delta or difference between the current option number (e.g., "14") and the option number of the preceding option (e.g., "0" in this case since this is the first option). As such, the first numerical value of "14" may correspond to an option number of "14."

As another example, CoAP message 500B may include data associated with a second numerical value (e.g., "1") as a second option identifier corresponding to a second option (e.g., associated with a query), where the second numerical value (e.g., "1") may be the delta or difference between the current option number (e.g., "15") and the option number of the preceding option (e.g., "14"). As such, the second numerical value of "1" may correspond to an option number of "15."

As a further example, CoAP message 500B may include data associated with a third numerical value (e.g., "0") as a third option identifier corresponding to a third option (e.g., associated with a query), where the third numerical value (e.g., "0") may be the delta or difference between the current option number (e.g., "15") and the option number of the preceding option (e.g., "15"). As such, the third numerical value of "0" may correspond to an option number of "15."

As shown in FIG. 5B, CoAP message 500B may include data associated with a payload marker (e.g., "0xFF"). CoAP message 500B may include data associated with a payload, where the data associated with a payload may include authentication data (e.g., "Authentication Data 2") and/or other data or content (e.g., "22.5 C").

In one embodiment, CoAP message 500A (e.g., associated with a request) and CoAP message 500B (e.g., associated with a response to the request) may share a common message identifier (e.g., "0xbc90"). CoAP message 500A (e.g., associated with a request) and CoAP message 500B (e.g., associated with a response to the request) may share a common token (e.g., "0x71") in one embodiment.

In one embodiment, a message type associated with CoAP message 500B (e.g., "ACK" or acknowledgement) may correspond to and/or be determined by a message type associated with CoAP message 500A (e.g., "CON" or confirmable). And in one embodiment, a response code associated with CoAP message 500B (e.g., "Content") may correspond to and/or be determined by a method code associated with CoAP message 500A (e.g., "GET"). In this case, CoAP message 500B may include the data or content requested using CoAP message 500A (e.g., the temperature of "22.5 C").

Although FIG. 5B shows CoAP message 500B with a specific number and type of portions, it should be appreciated that CoAP message 500B may include a different number and/or type of portions in other embodiments. For example, CoAP message 500B may include fewer portions or at least one additional portion. As another example, a plurality of portions of CoAP message 500B may be combined into a smaller number of portions. Although FIG. 5B shows CoAP message 500B with a specific organization of portions, it should be appreciated that CoAP message 500B may include a different organization of portions in other embodiments.

In one embodiment, data associated with at least one option may be excluded from CoAP message 500B. For example, data (e.g., associated with a host, a port, a path, a max-age value, or some combination thereof) used by intermediary systems or devices (e.g., situated between the sender of CoAP message 500B and the ultimate recipient of CoAP message 500B) such as a proxy server or other type of computer system or device may be excluded in one or more embodiments where intermediary systems or devices do not exist or are unlikely to exist.

Although FIG. 2 shows CoAP message 200 with a specific number and type of portions, it should be appreciated that CoAP message 200 may include a different number and/or type of portions in other embodiments. For example, CoAP message 200 may include fewer portions or at least one additional portion. As another example, a plurality of portions of CoAP message 200 may be combined into a smaller number of portions. Although FIG. 2 shows CoAP message 200 with a specific organization of portions, it should be appreciated that CoAP message 200 may include a different organization of portions in other embodiments. For example, authentication data 260 may be included in at least one portion of CoAP message 200 other than portion 250.

Turning back to FIG. 1, computer system 110 and computer system 120 may each include a respective security component (e.g., 112 and 122) configured to generate authentication data (e.g., to be included in one or more CoAP messages to be communicated) and/or perform message validation (e.g., with respect to at least one received CoAP message and/or with respect to authentication data included in at least one received CoAP message). A message generation component (e.g., message generation component 114 of computer system 110, message generation component 124 of computer system 120, etc.) may generate CoAP messages (e.g., including authentication data generated by security component 112, security component 122, etc.) to be communicated.

In one embodiment, a CoAP message (e.g., 200, 500A, 500B, etc.) may be generated (e.g., using message generation component 114, message generation component 124, etc.) based on a uniform resource identifier (URI). As an example, the URI may be formatted as follows:

coap://[host or IP address]:[port number]/[path]?[query]

One or more portions of the URI (e.g., the host or IP address, the port number, the path, etc.) may each be included in the CoAP message as a respective option (e.g., associated with data of portion 230 as shown in FIG. 2). For example, the host or IP address may be included as a Uri-Host option, the port number as a Uri-Port option, the path as at least one Uri-Path option, etc. The query of the URI may include at least one parameter, where each parameter of the query may be included in the CoAP message (e.g., 200, 500A, 500B, etc.) as a respective option (e.g., associated with data of portion 230 as shown in FIG. 2). For example, each parameter may be included in the CoAP message as a respective Uri-Query option.

The CoAP message (e.g., 200, 500A, 500B, etc.) including authentication data (e.g., 260, "Authentication Data 1," "Authentication Data 2," etc.) may be communicated using Datagram Transport Layer Security (DTLS) in one embodiment. In this case, the CoAP message (e.g., 200, 500A, 500B, etc.) may be generated (e.g., using message generation component 114, message generation component 124, etc.) based on a URI that begins with "coaps://."

Computer system 110 and computer system 120 may each include a respective operation component (e.g., 116 and 126) in one embodiment. An operation component (e.g., 116, 126, etc.) may be configured to perform at least one operation if a received CoAP message is determined to be valid (e.g., based on message validation performed using security component 112, security component 122, etc.).

In one embodiment, the at least one operation may include at least one operation associated with a method code (e.g., associated with data of portion 340 as shown in FIG. 3) in the CoAP message (e.g., 200, 500A, 500B, etc.) and/or at least one operation associated with an option (e.g., associated with data of portion 230 as shown in FIG. 2) of the CoAP message (e.g., 200, 500A, 500B, etc.). For example, where a CoAP message (e.g., 500A) is associated with a request to get a temperature (e.g., with a method code of "GET" and a Uri-Path option of "temperature" as depicted in FIG. 5A), the at least one operation (e.g., performed by operation component 116 of computer system 110, operation component 126 of computer system 120, etc.) may include accessing a temperature (e.g., reading a temperature, accessing a stored temperature, etc.). In this case, the operation component (e.g., 116, 126, etc.) may include a temperature sensor.

The at least one operation may include communication of a second CoAP message (e.g., 500B) in one embodiment. For example, responsive to determining that a first CoAP message (e.g., 200, 500A, etc.) is valid, the second CoAP message may be communicated from the recipient of the first CoAP message to the sender of the first CoAP message.

In one embodiment, the at least one operation may include an operation associated with a request code (e.g., associated with data of portion 340 as shown in FIG. 3) of the CoAP message (e.g., 200, 500A, 500B, etc.). For example, where a CoAP message (e.g., 500B) is associated with a response including data and/or content (e.g., with a response code of "Content" and a payload including data associated with a temperature as depicted in FIG. 5B), the at least one operation (e.g., performed by operation component 116 of computer system 110, operation component 126 of computer system 120, etc.) may include processing of the data (e.g., to generate business intelligence, for charting, for analytics, etc.), performing one or more other operations, etc.

If a received CoAP message is determined to be invalid (e.g., based on message validation performed using security component 112, security component 122, etc.), an operation component (e.g., 116 and 126) of computer systems 110 and 120 may be configured to perform at least one other operation. For example, the at least one other operation may include ignoring the received CoAP message (e.g., not sending a reply to the received CoAP message, performing no further processing related to the received CoAP message, etc.). As another example, the at least one other operation may include limiting access to the recipient (e.g., to computer system 110 where the CoAP message is received at computer system 110, to computer system 120 where the CoAP message is received at computer system 120, etc.) of the sender (e.g., computer system 110, computer system 120, at least one other computer system or device, etc.).

As shown in FIG. 1, connection 130 may be implemented using communication interface 118 (of computer system 110) and communication interface 128 (of computer system 120). Communication interface 118 and communication interface 128 may each include respective hardware and/or respective software allowing connection 130 to be established and allowing communication of at least one CoAP message over connection 130. Communication interface 118 and communication interface 128 may allow unidirectional communication and/or bidirectional communication over connection 130 in one embodiment. And in one embodiment, communication interface 118 and communication interface 128 may allow contemporaneous (or simultaneous) bidirectional communication (e.g. "full-duplex" communication) over connection 130.

Connection 130 between computer system 110 and computer system 120 may be a wired connection in one embodiment. For example, connection 130 may be a IEEE 1394 or FireWire® connection, PCI Express® connection, Ethernet connection, SATA connection, eSATA connection, RS-232 connection, I²C connection, etc. In one embodiment, connection 130 may be a wireless connection such as a Bluetooth® connection, Near Field Communication (NFC) connection, infrared (IR) connection, IEEE 802.XX connection, cellular connection, etc.

In one embodiment, computer system 110 and/or computer system 120 may have limited processing resources and/or limited storage resources. As an example, computer system 110 and/or computer system 120 may be "constrained nodes" or "constrained devices." In one embodiment, a "constrained device" may be a computer system or device with no larger than an 8-bit microcontroller. And in one or more other embodiments, a "constrained device" may be a computer system or device with at least one microcontroller larger or smaller than 8-bits in size.

As another example, computer system 110 and/or computer system 120 may communicate over a "constrained network" such as a 6LowPAN network. In this case, connection 130 may be used to implement and/or be part of a "constrained network."

Computer system 110 may be a client and computer system 120 may be a server in one embodiment. In this case, computer system 110 may communicate requests (e.g., CoAP message 200, CoAP message 500A, etc.) to computer system 120, and computer system 120 may communicate responses (e.g., CoAP message 200, CoAP message 500B, etc.) to computer system 110.

Alternatively, computer system 110 may be a server and computer system 120 may be a client in one embodiment. In this case, computer system 120 may communicate requests (e.g., CoAP message 200, CoAP message 500A, etc.) to computer system 110, and computer system 110 may communicate responses (e.g., CoAP message 200, CoAP message 500B, etc.) to computer system 120.

Although FIG. 1 shows system 100 with a specific number and type of systems or devices, it should be appreciated that system 100 may include a different number and/or type of systems or devices in other embodiments. For example, system 100 may include more than one instance of computer system 110 and/or computer system 120 in one or more other embodiments. Where system 100 includes more than one instance of computer system 110, each instance of computer system 110 may communicate with computer system 120 over a respective connection (e.g., similar to connection 130). Where system 100 includes more than one instance of computer system 120, each instance of computer system 120 may communicate with computer system 110 over a respective connection (e.g., similar to connection 130). As such, embodiments can increase the security associated with communication of CoAP messages between any number of systems or devices.

Accordingly, communication of messages between systems or devices in accordance with one or more embodiments can be used in one or more applications. For example, in the context of home automation, a first computer system (e.g., 110) may be used to communicate with and/or control at least one home appliance or system (e.g., a television, computer display, refrigerator, microwave, oven, door lock, security system, heating or air conditioning system, etc.). In this case, each home appliance or system may include at least one respective instance of a second computer system (e.g., 120). As another example, in the context of remote data monitoring, a first computer system (e.g., 110) may be used to remotely monitor at least one parameter (e.g., temperature, pressure, humidity, moisture, wind speed, etc.) measured by at least one sensor. In this case, each sensor may be included in (e.g., as at least a portion of an operational component 126) and/or in communication with at least one instance of a second computer system (e.g., 120).

The data sent to the first computer system (e.g., 110) may be stored and collected (e.g., in a database), thereby allowing processing of the data (e.g., to generate business intelligence, for charting, for analytics, etc.).

Figure 6A:
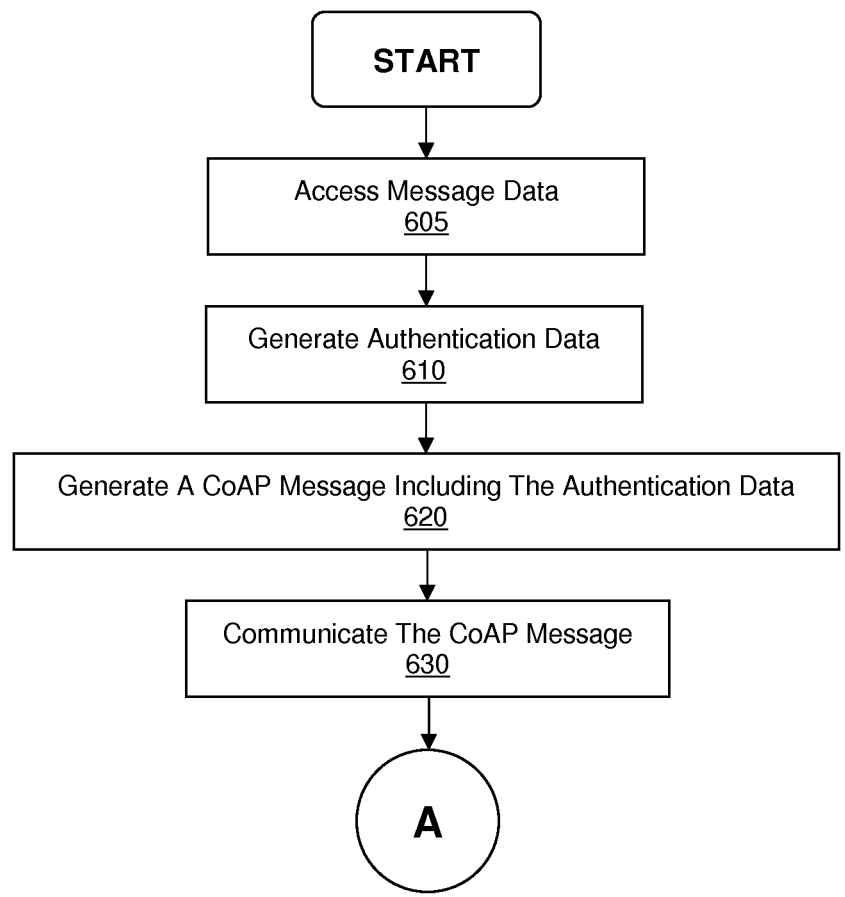
FIG. 6A shows a first portion of a flowchart of a process for increasing communication security in accordance with one embodiment.
Figure 6B:
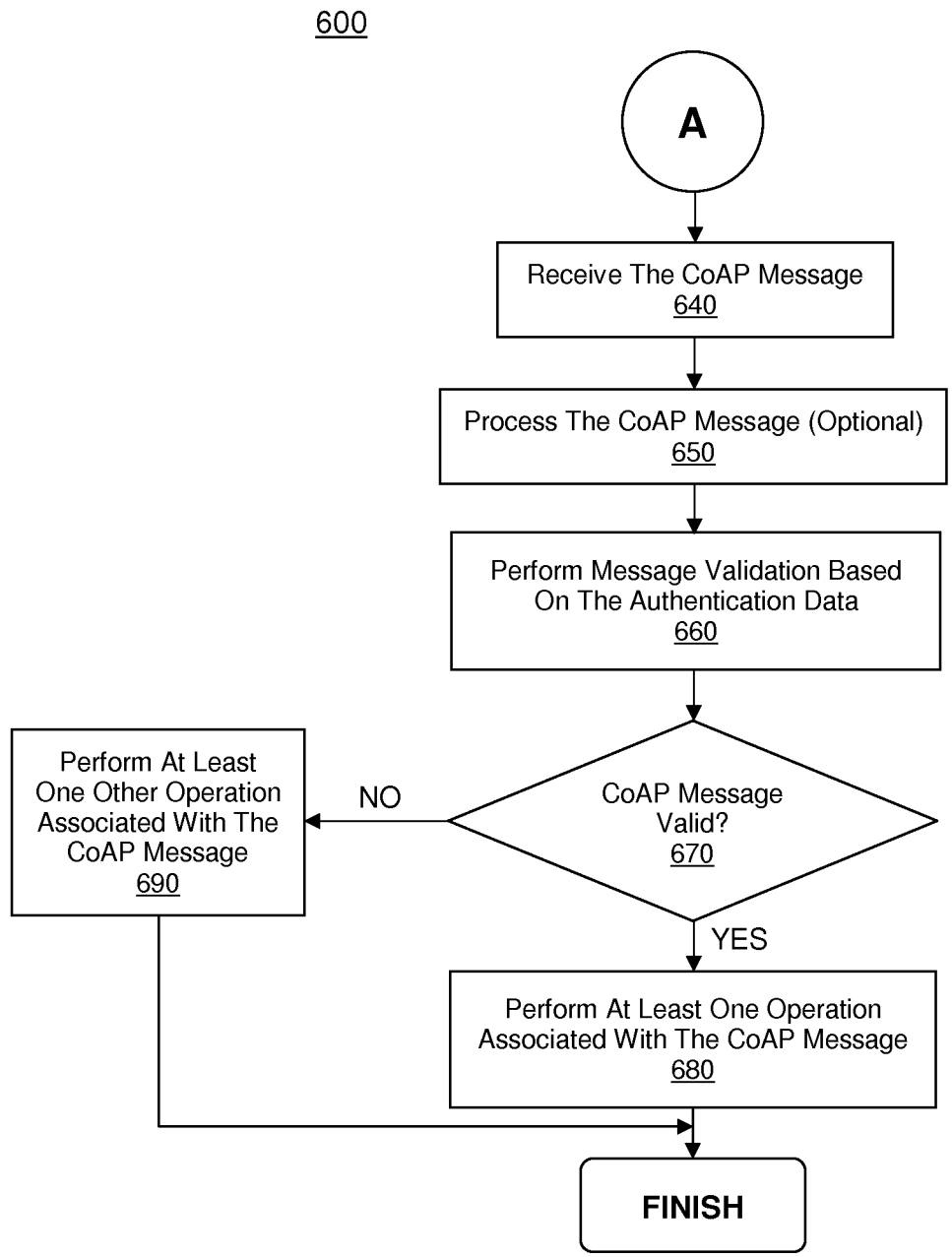
FIG. 6B shows a second portion of a flowchart of a process for increasing communication security in accordance with one embodiment.

FIGS. 6A and 6B show a flowchart of process 600 for increasing communication security in accordance with one embodiment. As shown in FIG. 6A, step 605 involves accessing message data. In one embodiment, the message data (e.g., accessed in step 605) may include at least a portion of a CoAP message (e.g., 200, 500A, 500B, etc.) other than authentication data (e.g., 260 of FIG. 2, "Authentication Data 1" of FIG. 5A, "Authentication Data 2" of FIG. 5B, etc.). For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), some combination thereof, etc. And in one embodiment, the message data (e.g., accessed in step 605) may include a unique identifier (e.g., associated with a sender of the CoAP message, included in portion 230 of CoAP message 200, etc.), an authentication mechanism identifier (e.g., associated with an authentication mechanism used to generate the authentication data included in the CoAP message, included in portion 230 of CoAP message 200, etc.), a nonce (e.g., included in portion 230 of CoAP message 200, etc.), or some combination thereof.

As shown in FIG. 6A, step 610 involves generating authentication data (e.g., 260 of FIG. 2, "Authentication Data 1" of FIG. 5A, "Authentication Data 2" of FIG. 5B, etc.). In one embodiment, the authentication data may be generated in step 610 at a computer system (e.g., by security component 112 of computer system 110, by security component 122 of computer system 120, etc.) using an authentication mechanism such as HMAC, OAuth, OAuth 2.0, OpenID, etc. And in one embodiment, the authentication data (e.g., 260 of FIG. 2, "Authentication Data 1" of FIG. 5A, "Authentication Data 2" of FIG. 5B, etc.) may be generated in step 610 based on message data (e.g., accessed in step 605).

The authentication data may be generated in step 610 based on a key in one embodiment. For example, where the authentication mechanism used to generate the authentication data in step 610 is HMAC, the authentication data may be generated by performing a hash function (e.g., MD5, SHA-1, SHA256, SHA512, etc.) on the message data (e.g., accessed in step 605) using a key. And in one embodiment, the CoAP message (e.g., 200, 500A, 500B, etc.) may be free of a key used to generate the authentication data in step 610.

In one embodiment, the key may be associated with the sender of the CoAP message (e.g., generated in step 620). For example, the key may be a secret key or private key that is unique to the sender (e.g., computer system 110, computer system 120, etc.). Alternatively, the key may be associated with the recipient of the CoAP message (e.g., generated in step 620). For example, the key may be a secret key or private key that is unique to the recipient (e.g., computer system 110, computer system 120, etc.).

Where a key associated with the sender of the CoAP message (e.g., generated in step 620) is used to generate the authentication data in step 610, the key may be stored locally at the sender in one embodiment. For example, the key may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key may be stored remotely (e.g., at another system or device) and accessed by the sender in a secure manner in one embodiment. Accordingly, a key associated with the sender of the CoAP message may be accessed and used by the sender to securely generate the authentication data in step 610.

Where a key associated with the recipient of the CoAP message (e.g., generated in step 620) is used to generate the authentication data in step 610, the sender may access the key based on information about the recipient in one embodiment. For example, using data (e.g., 700 of FIG. 7) which correlates or maps information about systems or devices (e.g., unique identifiers) to keys, the sender (e.g., computer system 110) may access a key (e.g., "Key 2") associated with the recipient (e.g., computer system 120) based on information about the recipient (e.g., the unique identifier of "cs120" associated with computer system 120, other information associated with computer system 120, etc.). In one embodiment, the data (e.g., 700 of FIG. 7) may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the data (e.g., 700 of FIG. 7) may be stored remotely (e.g., at another system or device) and accessed by the sender in a secure manner in one embodiment. Accordingly, a key associated with the recipient of the CoAP message may be accessed and used by the sender to securely generate the authentication data in step 610.

Although FIG. 7 shows data 700 as including a particular amount of data, it should be appreciated that a different amount of data may be included in data 700 in other embodiments. Additionally, although FIG. 7 shows data 700 as including a particular arrangement and type of data, it should be appreciated that a different arrangement and/or type of data may be included in data 700 in other embodiments.

The size or length of the key (e.g., used to generate the authentication data in step 610) may be associated with the authentication mechanism used to generate the authentication data in step 610. For example, where the authentication mechanism of HMAC utilizing a SHA256 hash function is used to generate the authentication data, the length of the key may be 32 bytes. As another example, where the authentication mechanism of HMAC utilizing a SHA512 hash function is used to generate the authentication data, the length of the key may be 64 bytes.

In one embodiment, multiple CoAP messages may each include respective authentication data generated based on a key associated with a common system or device. For example, where a first CoAP message (e.g., 500A) is sent from a first computer system (e.g. 110) to a second computer system (e.g., 120), and where a second CoAP message (e.g., 500B) is sent from the second computer system (e.g., 120) to the first computer system (e.g., 110), the first CoAP message (e.g., 500A) and the second CoAP message (e.g., 500B) may each include respective authentication data (e.g., "Authentication Data 1" and "Authentication Data 2") generated based on a key associated with the first computer system (e.g., 110). It should be appreciated that the authentication data (e.g., "Authentication Data 1" and "Authentication Data 2") included in the first and second CoAP messages may be different (even though they are generated based on the same key associated with the first computer system) since the respective data or content of each CoAP message may be different.

As another example, where a first CoAP message (e.g., 500A) is sent from a first computer system (e.g. 110) to a second computer system (e.g., 120), and where a second CoAP message (e.g., 500B) is sent from the second computer system (e.g., 120) to the first computer system (e.g., 110), the first CoAP message (e.g., 500A) and the second CoAP message (e.g., 500B) may each include respective authentication data (e.g., "Authentication Data 1" and "Authentication Data 2") generated based on a key associated with the second computer system (e.g., 120). It should be appreciated that the authentication data (e.g., "Authentication Data 1" and "Authentication Data 2") included in the first and second CoAP messages may be different (even though they are generated based on the same key associated with the second computer system) since the respective data or content of each CoAP message may be different.

As shown in FIG. 6A, step 620 involves generating a CoAP message which includes the authentication data (e.g., generated in step 610). The CoAP message (e.g., 200, 500A, 500B, etc.) may be generated in step 620 using a message generation component (e.g., 114 of the computer system 110, 124 of the computer system 120, etc.) in one embodiment. And in one embodiment, step 620 may be performed in accordance with process 800 of FIG. 8.

Figure 8:
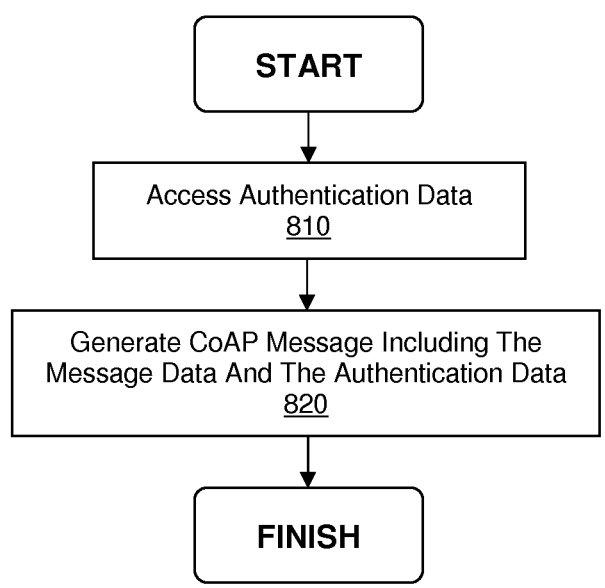
FIG. 8 shows a flowchart of a process for generating a CoAP message in accordance with one embodiment.

FIG. 8 shows a flowchart of process 800 for generating a CoAP message in accordance with one embodiment. As shown in FIG. 8, step 810 involves accessing authentication data (e.g., 260, "Authentication Data 1" of CoAP message 500A, "Authentication Data 2" of CoAP message 500B, etc.). The authentication data accessed in step 810 may be the authentication data generated in step 610 of process 600 in one embodiment.

As shown in FIG. 8, step 820 involves generating the CoAP message (e.g., 200, 500A, 500B, etc.) including message data (e.g., accessed in step 605) and the authentication data (e.g., accessed in step 810). The CoAP message (e.g., 200, 500A, 500B, etc.) may be generated in step 820 using a message generation component (e.g., 114 of computer system 110, 124 of computer system 120, etc.) in one embodiment. In one embodiment, step 820 may involve formatting the message data in accordance with CoAP (e.g., into one or more portions of CoAP message 200). The authentication data may be included in or as the payload (e.g., associated with portion 250 of CoAP message 200) of the CoAP message (e.g., 200, 500A, 500B, etc.) in one embodiment.

In one embodiment, step 820 may involve further including a payload marker as part of the CoAP message generation. For example, where the message data is free of data or content to be included as a payload (e.g., and therefore is also free of a payload marker), a payload marker may be included as part of the CoAP message in step 820 since the authentication data (e.g., accessed in step 810) may be included as the payload (e.g., the entire payload) of the CoAP message.

In one embodiment, step 820 may involve generating a bit stream or byte stream including the message data (e.g., accessed in step 605) and the authentication data (e.g., accessed in step 810). The bit stream or byte stream may be formatted in accordance with CoAP in one embodiment.

Although FIG. 8 depicts process 800 as including a specific number of steps, it should be appreciated that process 800 may include a different number of steps in other embodiments. Although FIG. 8 depicts process 800 as including a specific ordering of steps, it should be appreciated that process 800 may include a different ordering of steps in other embodiments.

Turning back to FIG. 6A, step 630 involves communicating the CoAP message (e.g., generated in step 620 and/or in accordance with one or more steps of process 800 of FIG. 8). In one embodiment, step 630 may involve communicating the CoAP message from a first computer system (e.g., 110) to at least one other computer system (e.g., 120, one or more other systems or devices, etc.). And in one embodiment, step 630 may involve communicating the CoAP message from a second computer system (e.g., 120) to at least one other computer system (e.g., 110, one or more other systems or devices, etc.).

In one embodiment, the CoAP message may be communicated in step 630 over a connection (e.g., 130 between computer system 110 and computer system 120). The CoAP message may be communicated in step 630 as a bit stream or a byte stream in one embodiment. And in one embodiment, step 630 may involve communicating the CoAP message using a communication interface (e.g., 118 of computer system 110, 128 of computer system 120, etc.).

Accordingly, communication security can be increased by including authentication data in CoAP messages communicated between systems or devices. For example, the recipient of the CoAP message (e.g., 200, 500A, 500B, etc.) can perform message validation with respect to the authentication data (e.g., included in the CoAP message) to verify the authenticity of the sender of the CoAP message and/or the integrity of the CoAP message. As another example, where the CoAP message (e.g., 200, 500A, 500B, etc.) includes a nonce (e.g., in the data associated with portion 230, in another portion of the CoAP message, etc.), communication security can be improved by allowing the recipient to detect and/or act on a replay attack.

As shown in FIG. 6B, step 640 involves receiving the CoAP message (e.g., 200, 500A, 500B, etc.). In one embodiment, step 640 may involve receiving the CoAP message at the second computer system (e.g., 120) from another computer system (e.g., 110, another system or device, etc.). And in one embodiment, step 640 may involve receiving the CoAP message at the first computer system (e.g., 110) from another computer system (e.g., 120, another system or device, etc.).

In one embodiment, the CoAP message may be received in step 640 over a connection (e.g., 130 between computer system 110 and computer system 120). The CoAP message may be received in step 640 as a bit stream or a byte stream in one embodiment. And in one embodiment, step 640 may involve receiving the CoAP message using a communication interface (e.g., 118 of computer system 110, 128 of computer system 120, etc.).

Step 650 involves optionally processing the CoAP message (e.g., received in step 640). In one embodiment, step 650 may involve processing the CoAP message using a security component (e.g., 112 of computer system 110, 122 of computer system 120, etc.). And in one embodiment, step 650 may be performed in accordance with process 900 of FIG. 9.

Figure 9:
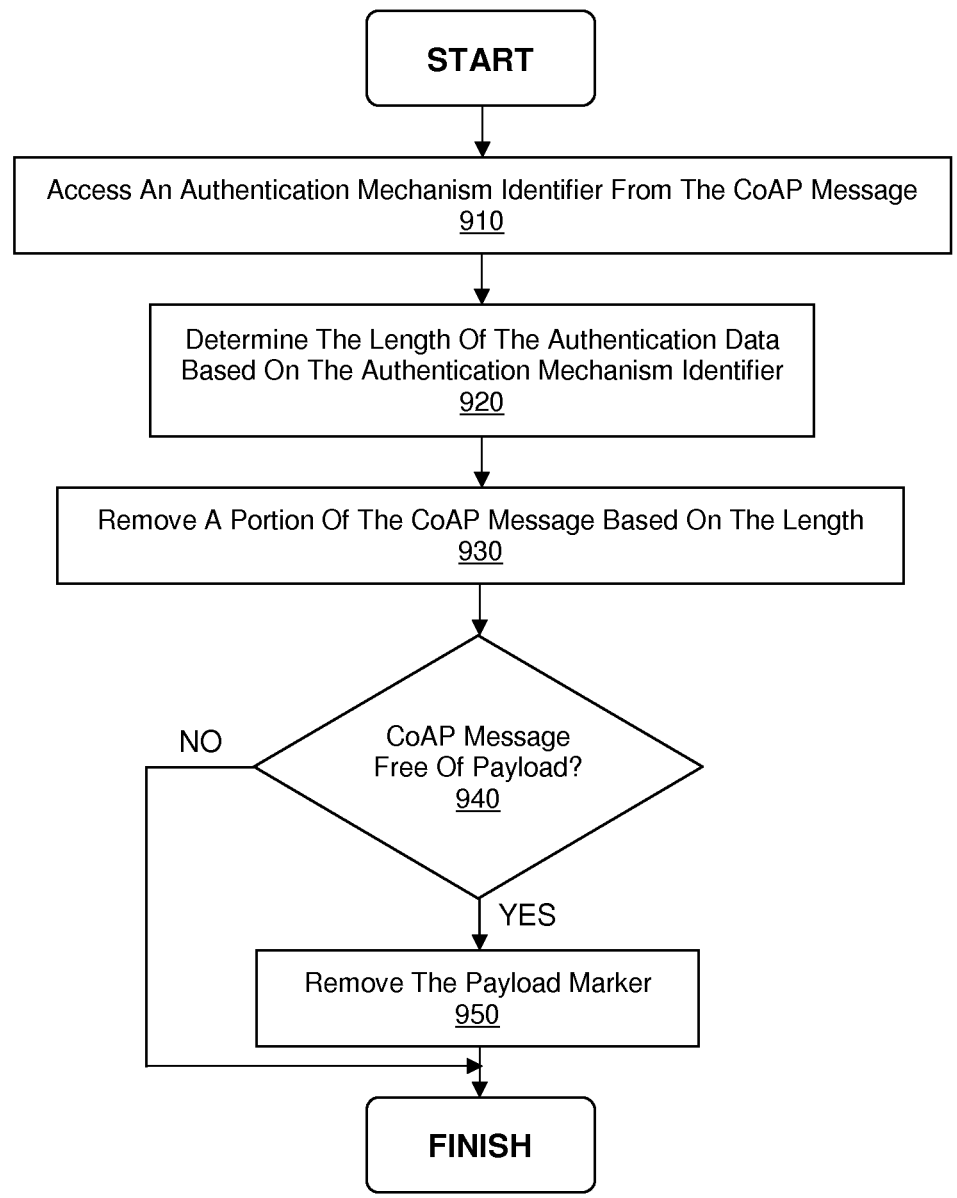
FIG. 9 shows a flowchart of a process for processing a CoAP message in accordance with one embodiment.

FIG. 9 shows a flowchart of process 900 for processing a CoAP message in accordance with one embodiment. As shown in FIG. 9, step 910 involves accessing an authentication mechanism identifier from the CoAP message (e.g., 200, 500A, 500B, etc.). The authentication mechanism identifier may be associated with the authentication mechanism (e.g., HMAC utilizing a MD5 hash function, HMAC utilizing a SHA-1 hash function, HMAC utilizing a SHA256 hash function, HMAC utilizing a SHA512 hash function, OAuth, OAuth 2.0, OpenID, etc.) used to generate the authentication data (e.g., in step 610 of process 600) in one embodiment. And in one embodiment, the authentication mechanism identifier may be accessed in step 910 from a portion of the CoAP message associated with at least one option (e.g., portion 230 of CoAP message 200). For example, an authentication mechanism identifier (e.g. "hs256=1" associated with, in this case, an authentication mechanism of HMAC utilizing a SHA256 hash function) may be accessed from a portion of CoAP message 500A associated with an option value (e.g., of an option associated with a query, of a "Uri-Query" option, etc.).

Step 920 may involve determining the length of the authentication data (e.g., 260, "Authentication Data 1" of CoAP message 500A, "Authentication Data 2" of CoAP message 500B, etc.) based on the authentication mechanism identifier (e.g., accessed in step 910). For example, where the authentication mechanism identifier (e.g. "hs256=1" of CoAP message 500A) is associated with an authentication mechanism of HMAC utilizing a SHA256 hash function, the length of the authentication data may be determined in step 920 to be 32 bytes. As another example, where the authentication mechanism identifier is associated with an authentication mechanism of HMAC utilizing a SHA512 hash function, the length of the authentication data may be determined in step 920 to be 64 bytes.

As shown in FIG. 9, step 930 involves removing a portion of the CoAP message based on the length (e.g., determined in step 920). The portion of the CoAP message removed in step 930 may include at least a portion of the authentication data (e.g., 260). In one embodiment, the portion removed in step 930 may be a predetermined portion (e.g., the first portion, the last portion, an intermediary portion, etc.) of a payload of the CoAP message. For example, where the length of the authentication data is determined to be 32 bytes in step 920, step 930 may involve removing the last 32 bytes of the CoAP message.

Step 940 involves determining whether the CoAP message is free of a payload (e.g., after removal of the portion in step 930). If it is determined in step 940 that at least a portion of the payload remains (e.g., the CoAP message is not free of the payload), then step 950 may be bypassed and process 900 may terminate. Alternatively, if it is determined in step 940 that the CoAP message is free of the payload (e.g., no other data or content remains after removal of the portion in step 930), then the payload marker (e.g., associated with portion 240 of CoAP message 200) may be removed from the CoAP message in step 950.

Accordingly, in one embodiment, the payload marker may be removed from the CoAP message where the payload of the CoAP message (e.g., received in step 640) includes only the authentication data (e.g., 260, "Authentication Data 1" of CoAP message 500A, "Authentication Data 2" of CoAP message 500B, etc.). This may be used to account for the situation where, during message generation (e.g., in step 620 and/or in accordance with one or more steps of process 800 of FIG. 8), the payload marker was included in the CoAP message since the authentication data was included as the payload (e.g., the entire payload) of the CoAP message.

Although FIG. 9 depicts process 900 as including a specific number of steps, it should be appreciated that process 900 may include a different number of steps in other embodiments. Although FIG. 9 depicts process 900 as including a specific ordering of steps, it should be appreciated that process 900 may include a different ordering of steps in other embodiments.

Turning back to FIG. 6B, step 660 involves performing message validation based on the authentication data (e.g., accessed from the CoAP message in step 650 and/or in step 930). In one embodiment, the message validation may be used to verify the authenticity of the sender of the CoAP message (e.g., 200, 500A, 500B, etc.) and/or the integrity of the CoAP message (e.g., 200, 500A, 500B, etc.). Where the CoAP message (e.g., 200, 500A, 500B, etc.) includes a nonce (e.g., in data associated with portion 230, in another portion of the CoAP message, etc.), the message validation may be used to detect a replay attack.

In one embodiment, message validation may be performed in step 660 by comparing second authentication data to the authentication data (e.g., accessed from the CoAP message in step 650 and/or in step 930). The second authentication data may be generated (e.g., in step 660) based on at least a portion of the CoAP message (e.g., received in step 640) in one embodiment. For example, the second authentication data may be generated based on data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), some combination thereof, etc. As another example, the second authentication data may be generated based on at least a unique identifier (e.g., associated with a sender of the CoAP message, included in portion 230 of CoAP message 200, etc.), an authentication mechanism identifier (e.g., associated with an authentication mechanism used to generate the authentication data included in the CoAP message and/or used to generate the second authentication data, included in portion 230 of CoAP message 200, etc.), a nonce (e.g., included in portion 230 of CoAP message 200, etc.), or some combination thereof. And as a further example, the second authentication data may be generated based on at least a portion of the CoAP message excluding the authentication data (e.g., 260 of FIG. 2, "Authentication Data 1" of FIG. 5A, "Authentication Data 2" of FIG. 5B, etc.).

The second authentication data may be generated (e.g., in step 660) based on a key in one embodiment. For example, where the authentication mechanism used to generate the second authentication data is HMAC, the second authentication data may be generated by performing a hash function (e.g., MD5, SHA-1, SHA256, SHA512, etc.) on at least a portion of the CoAP message using a key. And in one embodiment, the CoAP message (e.g., received in step 640) may be free of a key used to generate the second authentication data.

In one embodiment, the key may be associated with the sender of the CoAP message (e.g., received in step 640). For example, the key may be a secret key or private key that is unique to the sender (e.g., computer system 110, computer system 120, etc.). Alternatively, the key may be associated with the recipient of the CoAP message (e.g., received in step 640). For example, the key may be a secret key or private key that is unique to the recipient (e.g., computer system 110, computer system 120, etc.).

In one embodiment, at least one attribute of the generation of the second authentication data in step 660 may be the same as at least one attribute of the generation of the authentication data (e.g., in step 610). For example, the second authentication data may be generated based on the same data as the authentication data, the second authentication data may be generated based on the same key as the authentication data, the second authentication data may be generated using the same authentication mechanism as the authentication data, some combination thereof, etc.

The message validation may be performed in step 660 using a security component (e.g., 112 of computer system 110, 122 of computer system 120, etc.) in one embodiment. And in one embodiment, step 660 may be performed in accordance with process 1000 of FIG. 10.

Figure 10:
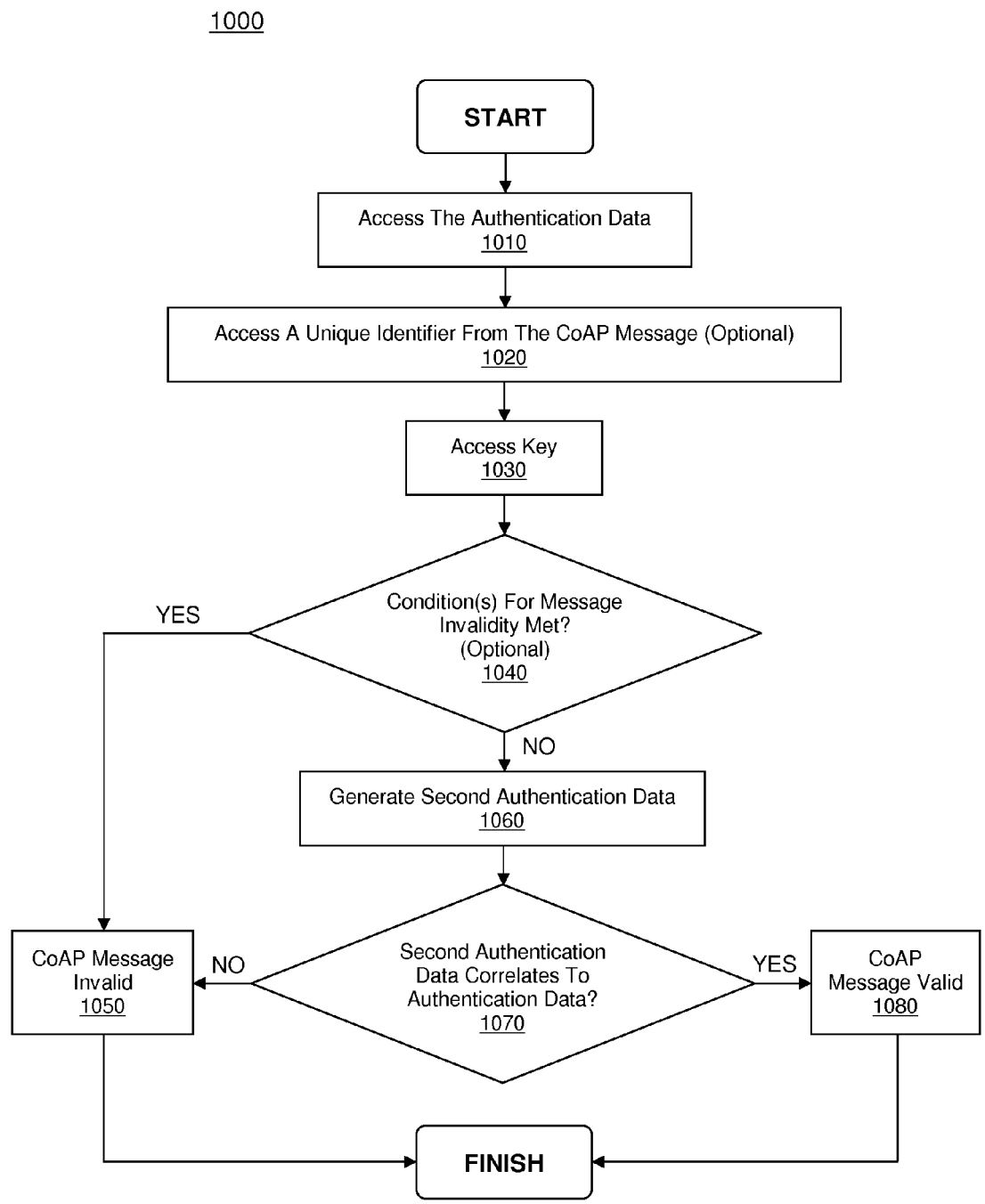
FIG. 10 shows a flowchart of a process for performing message validation in accordance with one embodiment.

FIG. 10 shows a flowchart of process 1000 for performing message validation in accordance with one embodiment. As shown in FIG. 10, step 1010 involves accessing the authentication data (e.g., 260 of FIG. 2, "Authentication Data 1" of FIG. 5A, "Authentication Data 2" of FIG. 5B, etc.). In one embodiment, the authentication data may be accessed from the CoAP message (e.g., received in step 640). And in one embodiment, the authentication data may be accessed from data associated with processing of the CoAP message (e.g., in step 650 and/or in accordance with one or more steps of process 900). For example, the authentication data may be accessed from a portion of data removed from the CoAP message (e.g., in step 930).

Step 1020 involves optionally accessing a unique identifier from the CoAP message (e.g., 200, 500A, 500B, etc.). For example, where the CoAP message includes authentication data generated using a key associated with the sender of the CoAP message, a unique identifier (e.g., associated with the sender of the CoAP message) may be accessed from the CoAP message in step 1020 by the recipient. In one embodiment, the unique identifier may be accessed in step 1020 from a portion of the CoAP message associated with at least one option (e.g., portion 230 of CoAP message 200).

As shown in FIG. 10, step 1030 involves accessing a key. The key may be stored locally at the recipient in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key may be stored remotely (e.g., at a system or device other than the recipient) and accessed by the recipient in step 1030 in a secure manner. As such, in accordance with one or more embodiments, the key may be accessed (e.g., by the recipient) in step 1030 while limiting other access to the key (e.g., by at least one system or device other than the recipient).

The key may be associated with the sender of the CoAP message (e.g., received in step 640) in one embodiment. For example, the key may be a secret key or private key that is unique to the sender (e.g., computer system 110, computer system 120, etc.). Alternatively, the key may be associated with the recipient of the CoAP message (e.g., received in step 640). For example, the key may be a secret key or private key that is unique to the recipient (e.g., computer system 110, computer system 120, etc.).

Where the key is associated with the sender of the CoAP message, the recipient may access the key in step 1030 based on information about the sender in one embodiment. For example, the unique identifier (e.g., associated with the sender of the CoAP message) accessed in step 1020 may be used by the recipient to access the key (e.g., associated with the sender) in step 1030.

In one embodiment, the recipient may access the key (e.g., associated with the sender of the CoAP message) in step 1030 using data (e.g., 700 of FIG. 7) which correlates or maps information about systems or devices (e.g., unique identifiers) to keys. The data (e.g., 700 of FIG. 7) may be stored locally at the recipient in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the data (e.g., 700 of FIG. 7) may be stored remotely (e.g., at a system or device other than the recipient) and accessed by the recipient in a secure manner.

Where the key is associated with the recipient of the CoAP message, the key may be accessed locally by the recipient in step 1030 in one embodiment. For example, the key (e.g., associated with the recipient) may be accessed from local storage in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key (e.g., associated with the recipient) may be accessed remotely (e.g., from another system or device) in a secure manner by the recipient in step 1030 in one embodiment.

As shown in FIG. 10, step 1040 involves determining whether at least one condition for message invalidity is met. In one embodiment, step 1040 may be performed in accordance with process 1100 of FIG. 11.

Figure 11:
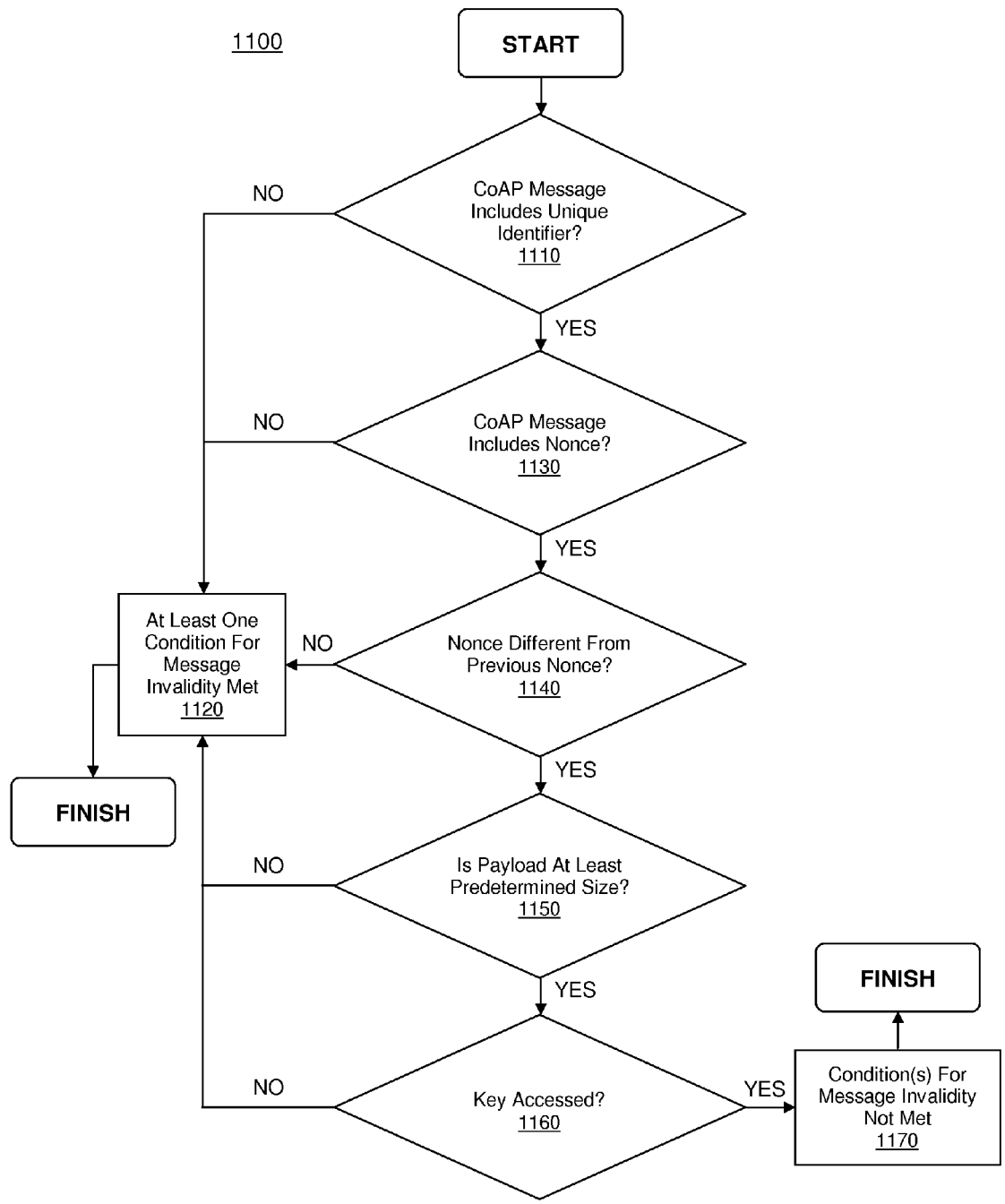
FIG. 11 shows a flowchart of a process for determining whether at least one condition for message invalidity is met in accordance with one embodiment.

FIG. 11 shows a flowchart of process 1100 for determining whether at least one condition for message invalidity is met in accordance with one embodiment. As shown in FIG. 11, step 1110 involves determining whether the CoAP message (e.g., received in step 640) includes a unique identifier. In one embodiment, step 1110 may involve determining whether the CoAP message includes a unique identifier associated with the sender (e.g., computer system 110, computer system 120, another system or device, etc.) of the CoAP message. And in one embodiment, step 1110 may involve determining whether a portion of the CoAP message associated with at least one option (e.g., portion 230 of CoAP message 200) includes a unique identifier.

If it is determined in step 1110 that the CoAP message does not include a unique identifier, then it may be determined in step 1120 that at least one condition for message invalidity has been met and process 1100 may terminate. Alternatively, if it is determined in step 1110 that the CoAP message includes a unique identifier, then step 1130 may be performed.

As shown in FIG. 11, step 1130 involves determining whether the CoAP message (e.g., received in step 640) includes a nonce. In one embodiment, step 1130 may involve determining whether a portion of the CoAP message associated with at least one option (e.g., portion 230 of CoAP message 200) includes a nonce.

If it is determined in step 1130 that the CoAP message does not include a nonce, then it may be determined in step 1120 that at least one condition for message invalidity has been met and process 1100 may terminate. Alternatively, if it is determined in step 1130 that the CoAP message includes a nonce, then step 1140 may be performed.

As shown in FIG. 11, step 1140 involves determining whether the nonce (e.g., included in the CoAP message as determined in step 1130) is different from a previous nonce (e.g., of a previously-transmitted or previously-received CoAP message). In one embodiment, the recipient of the CoAP message may store at least one previous nonce (e.g., from one or more previously-transmitted or previously-received CoAP messages) for comparison with the nonce of the CoAP message.

In one embodiment, it may be determined in step 1140 whether the nonce is different from another nonce of another CoAP message (e.g., of a previously-transmitted or previously-received CoAP message) from the same sender (e.g., corresponding to the unique identifier associated with step 1110). For example, the recipient of the CoAP message may store at least one previous nonce corresponding to the sender of the CoAP message for comparison with the nonce of the CoAP message.

In one embodiment, step 1140 may be used to increase communication security by detecting a replay attack. For example, if it is determined in step 1140 that the nonce is the same as (e.g., not different from) a previous nonce, then it may indicate a malicious re-sending of the CoAP message or that the CoAP message is otherwise associated with a replay attack.

If it is determined in step 1140 that the nonce is not different from a previous nonce, then it may be determined in step 1120 that at least one condition for message invalidity has been met and process 1100 may terminate. Alternatively, if it is determined in step 1140 that the nonce is different from a previous nonce, then step 1150 may be performed.

As shown in FIG. 11, step 1150 involves determining whether a payload of the CoAP message (e.g., received in step 640) is at least a predetermined size. In one embodiment, the predetermined size may correspond to an authentication mechanism used to generate authentication data (e.g., 260 of FIG. 2, "Authentication Data 1" of FIG. 5A, "Authentication Data 2" of FIG. 5B, etc.) included in the CoAP message and/or an authentication mechanism identifier included in the CoAP message (e.g., in a portion of the CoAP message associated with at least one option, in portion 230 of CoAP message 200, in another portion, etc.).

For example, where an authentication mechanism (e.g., used to generate the authentication data included in the CoAP message) is HMAC utilizing a SHA256 hash function and/or where an authentication mechanism identifier (e.g., included in the CoAP message) is associated with an authentication mechanism (e.g., used to generate the authentication data included in the CoAP message) of HMAC utilizing a SHA256 hash function, the predetermined size used in step 1150 may be 32 bytes. As another example, where an authentication mechanism (e.g., used to generate the authentication data included in the CoAP message) is HMAC utilizing a SHA512 hash function and/or where an authentication mechanism identifier (e.g., included in the CoAP message) is associated with an authentication mechanism (e.g., used to generate the authentication data included in the CoAP message) of HMAC utilizing a SHA512 hash function, the predetermined size used in step 1150 may be 64 bytes.

In one embodiment, step 1150 may be used to increase communication security by identifying one or more security risks related to authentication data of the CoAP message. For example, if it is determined in step 1150 that the payload of the CoAP message is not at least a predetermined size, then it may indicate that the CoAP message does not include any authentication data and/or that the authentication data is not proper (e.g., not of the proper size or length based on an authentication mechanism used to generate the authentication data).

If it is determined in step 1150 that the payload of the CoAP message is not at least a predetermined size, then it may be determined in step 1120 that at least one condition for message invalidity has been met and process 1100 may terminate. Alternatively, if it is determined in step 1150 that the payload of the CoAP message is at least a predetermined size, then step 1160 may be performed.

As shown in FIG. 11, step 1160 involves determining if a key has been accessed (e.g., in step 1030 of process 1000). In one embodiment, step 1160 may involve determining if a key associated with the recipient of the CoAP message has been accessed. And in one embodiment, step 1160 may involve determining if a key associated with the sender of the CoAP message has been accessed (e.g., based on a unique identifier or other information associated with the sender).

If it is determined in step 1160 that a key has not been accessed, then it may be determined in step 1120 that at least one condition for message invalidity has been met and process 1100 may terminate. Alternatively, if it is determined in step 1160 that a key has been accessed, then it may be determined in step 1170 that at least one condition for message invalidity has not been met and process 1100 may terminate.

Although FIG. 11 depicts process 1100 as including a specific number of steps, it should be appreciated that process 1100 may include a different number of steps in other embodiments. For example, one or more steps (e.g., step 1110, 1130, 1140, 1150, 1160, or some combination thereof) may be omitted in one or more embodiments. Although FIG. 11 depicts process 1100 as including a specific ordering of steps, it should be appreciated that process 1100 may include a different ordering of steps in other embodiments.

Turning back to FIG. 10, if it is determined in step 1040 that at least one condition for message invalidity has been met, then it may be determined in step 1050 that the CoAP message (e.g., received in step 640) is invalid. Alternatively, if it is determined in step 1040 that at least one condition for message invalidity has not been met, then step 1060 may be performed.

As shown in FIG. 10, step 1060 involves generating second authentication data. In one embodiment, the second authentication data may be generated in step 1060 using an authentication mechanism such as HMAC, OAuth, OAuth 2.0, OpenID, etc. And in one embodiment, the authentication mechanism used to generate the second authentication data in step 1060 may be the same as the authentication mechanism used to generate (e.g., in step 610) the authentication data (e.g., included in the CoAP message received in step 640).

In one embodiment, the authentication mechanism used to generate the second authentication data in step 1060 may be determined based on an authentication mechanism identifier included in the CoAP message (e.g., in portion 230 associated with at least one option). In one embodiment, the authentication mechanism used to generate the second authentication data in step 1060 may be determined based on at least one other message (e.g., including information about an authentication mechanism used to generate the authentication data and/or the second authentication data), where the at least one other message may be separate from the CoAP message (e.g., including the authentication data) and may be communicated before or after the CoAP message. And in one embodiment, the authentication mechanism used to generate the second authentication data in step 1060 may be determined using data stored at the recipient (e.g., in security component 112 of computer system 110, in another component of computer system 110, in security component 122 of computer system 120, in another component of computer system 120, in a component of another system or device, etc.), where the data may be supplied to the recipient by another system or device.

In one embodiment, the second authentication data may be generated in step 1060 based on at least a portion of the CoAP message (e.g., received in step 640). For example, the second authentication data may be generated in step 1060 based on data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), some combination thereof, etc. As another example, the second authentication data may be generated in step 1060 based on at least a unique identifier (e.g., associated with a sender of the CoAP message, included in portion 230 of CoAP message 200, etc.), an authentication mechanism identifier (e.g., associated with an authentication mechanism used to generate the authentication data included in the CoAP message and/or used to generate the second authentication data in step 1060, included in portion 230 of CoAP message 200, etc.), a nonce (e.g., included in portion 230 of CoAP message 200, etc.), or some combination thereof. And as a further example, the second authentication data may be generated in step 1060 based on at least a portion of the CoAP message excluding the authentication data (e.g., 260 of FIG. 2, "Authentication Data 1" of FIG. 5A, "Authentication Data 2" of FIG. 5B, etc.).

The second authentication data may be generated in step 1060 based on a key in one embodiment. For example, where the authentication mechanism used to generate the second authentication data is HMAC, the second authentication data may be generated in step 1060 by performing a hash function (e.g., MD5, SHA-1, SHA256, SHA512, etc.) on at least a portion of the CoAP message using a key (e.g., accessed in step 1030). And in one embodiment, the CoAP message (e.g., received in step 640) may be free of a key used to generate the second authentication data in step 1060.

In one embodiment, the key may be associated with the sender of the CoAP message (e.g., received in step 640). For example, the key may be a secret key or private key that is unique to the sender (e.g., computer system 110, computer system 120, etc.). Alternatively, the key may be associated with the recipient of the CoAP message (e.g., received in step 640). For example, the key may be a secret key or private key that is unique to the recipient (e.g., computer system 110, computer system 120, etc.).

Where a key associated with the recipient of the CoAP message (e.g., received in step 640) is used to generate the second authentication data in step 1060, the key may be stored locally at the recipient in one embodiment. For example, the key may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the key may be stored remotely (e.g., at another system or device) and accessed by the recipient in a secure manner in one embodiment. Accordingly, a key associated with the recipient of the CoAP message may be accessed and used by the recipient to securely generate the second authentication data in step 1060.

Where a key associated with the sender of the CoAP message (e.g., received in step 640) is used to generate the second authentication data in step 1060, the recipient may access the key based on information about the sender in one embodiment. For example, using data (e.g., 700 of FIG. 7) which correlates or maps information about systems or devices (e.g., unique identifiers) to keys, the recipient (e.g., computer system 120) may access a key (e.g., "Key 1") associated with the sender (e.g., computer system 110) based on information about the recipient (e.g., the unique identifier of "cs110" associated with computer system 110). In one embodiment, the data (e.g., 700 of FIG. 7) may be stored locally in a security component (e.g., 112 of computer system 110, 122 of computer system 120, etc.), in a memory (e.g., of computer system 110, of computer system 120, etc.), in a database (e.g., of computer system 110, of computer system 120, etc.), etc. Alternatively, the data (e.g., 700 of FIG. 7) may be stored remotely (e.g., at another system or device) and accessed by the recipient in a secure manner in one embodiment. Accordingly, a key associated with the sender of the CoAP message may be accessed and used by the recipient to securely generate the second authentication data in step 1060.

The size or length of the key (e.g., used to generate the second authentication data in step 1060) may be associated with the authentication mechanism used to generate the second authentication data in step 1060. For example, where the authentication mechanism of HMAC utilizing a SHA256 hash function is used to generate the authentication data, the length of the key may be 32 bytes. As another example, where the authentication mechanism of HMAC utilizing a SHA512 hash function is used to generate the authentication data, the length of the key may be 64 bytes.

As shown in FIG. 10, step 1070 may involve determining whether the second authentication data (e.g., generated in step 1060) correlates to the authentication data (e.g., included in the CoAP message received in step 640). If the second authentication data does not correlate to the authentication data, then it may be determined in step 1050 that the CoAP message (e.g., received in step 640) is invalid. Alternatively, if the second authentication data correlates to the authentication data, then it may be determined in step 1080 that the CoAP message (e.g., received in step 640) is valid.

In one embodiment, message validation (e.g., performed in accordance with one or more steps of process 1000) may be used to verify the authenticity of the sender of a CoAP message. For example, where the authentication data and second authentication data are each generated using at least one key (e.g., at least one secret key, at least one private key, at least one key which is accessible to authorized systems or devices, some combination thereof, etc.), the authenticity of the sender of a CoAP message may be verified if it is determined that the CoAP message is valid in step 1080.

In one embodiment, message validation (e.g., performed in accordance with one or more steps of process 1000) may be used to verify the integrity of a CoAP message. For example, where the authentication data and second authentication data are each generated based on data included in the CoAP message (e.g., message data, other data, etc.), the integrity of the CoAP message may be verified if it is determined that the CoAP message is valid in step 1080.

Although FIG. 10 depicts process 1000 as including a specific number of steps, it should be appreciated that process 1000 may include a different number of steps in other embodiments. Although FIG. 10 depicts process 1000 as including a specific ordering of steps, it should be appreciated that process 1000 may include a different ordering of steps in other embodiments.

Turning back to FIG. 6B, if it is determined in step 670 that the CoAP message (e.g., received in step 640) is valid, then at least one operation associated with the CoAP message may be performed in step 680. In one embodiment, step 680 may involve performing at least one operation using an operation component (e.g., 116 of computer system 110, 126 of computer system 120, etc.).

In one embodiment, the at least one operation performed in step 680 may include at least one operation associated with a method code (e.g., associated with data of portion 340 as shown in FIG. 3) in the CoAP message (e.g., 200, 500A, 500B, etc.) and/or at least one operation associated with an option (e.g., associated with data of portion 230 as shown in FIG. 2) of the CoAP message (e.g., 200, 500A, 500B, etc.). For example, where a CoAP message (e.g., 500A) is associated with a request to get a temperature (e.g., with a method code of "GET" and a "Uri-Path" option of "temperature" as depicted in FIG. 5A), the at least one operation performed in step 680 may include accessing a temperature (e.g., reading a temperature, accessing a stored temperature, etc.). In one embodiment, where the at least one operation is performed in step 680 using an operation component (e.g., 116 of computer system 110, 126 of computer system 120, etc.), the operation component may include a temperature sensor.

The at least one operation performed in step 680 may include communication of a second CoAP message (e.g., 500B) in one embodiment. For example, responsive to determining that a first CoAP message (e.g., 200, 500A, etc.) is valid (e.g., in step 670), the second CoAP message may be communicated in step 680 from the recipient of the first CoAP message to the sender of the first CoAP message.

The at least one operation performed in step 680 may include an operation associated with a request code (e.g., associated with data of portion 340 as shown in FIG. 3) of the CoAP message (e.g., 200, 500A, 500B, etc.) in one embodiment. For example, where a CoAP message (e.g., 500B) is associated with a response including data and/or content (e.g., with a response code of "Content" and a payload including data associated with a temperature as depicted in FIG. 5B), the at least one operation performed in step 680 may include processing of the data (e.g., to generate business intelligence, for charting, for analytics, etc.), performing one or more other operations, etc.

Alternatively, if it is determined in step 670 that the CoAP message (e.g., received in step 640) is not valid, then at least one other operation associated with the CoAP message may be performed in step 690. In one embodiment, step 690 may involve performing at least one other operation using an operation component (e.g., 116 of computer system 110, 126 of computer system 120, etc.).

In one embodiment, step 690 may involve acting responsive to a message validation failure such as a triggering of a message invalidity condition (e.g., corresponding to one or more steps of process 1100), another message validation failure (e.g., determined in step 660 and/or 670, determined in step 1070, etc.), etc. And in one embodiment, step 690 may involve acting on a suspected or detected replay attack.

In one embodiment, the at least one other operation performed in step 690 may include ignoring the received CoAP message (e.g., not sending a reply to the received CoAP message, performing no further processing related to the received CoAP message, etc.). In one embodiment, the at least one other operation performed in step 690 may include limiting access to the recipient (e.g., to computer system 110 where the CoAP message is received at computer system 110, to computer system 120 where the CoAP message is received at computer system 120, etc.) of the sender (e.g., computer system 110, computer system 120, at least one other system or device, etc.).

In one embodiment, one or more steps of process 600 may be repeated with respect to at least one other CoAP message. For example, where a first CoAP message is generated and communicated (e.g., in accordance with one or more steps of process 600), at least one other CoAP message may be generated and communicated (e.g., in accordance with one or more steps of process 600). In one embodiment, the first CoAP message may be a request, and the at least one other CoAP message may be at least one response (e.g., related to the request of the first CoAP message).

Although FIGS. 6A and 6B depict process 600 as including a specific number of steps, it should be appreciated that process 600 may include a different number of steps in other embodiments. Although FIGS. 6A and 6B depict process 600 as including a specific ordering of steps, it should be appreciated that process 600 may include a different ordering of steps in other embodiments.

Figure 12:
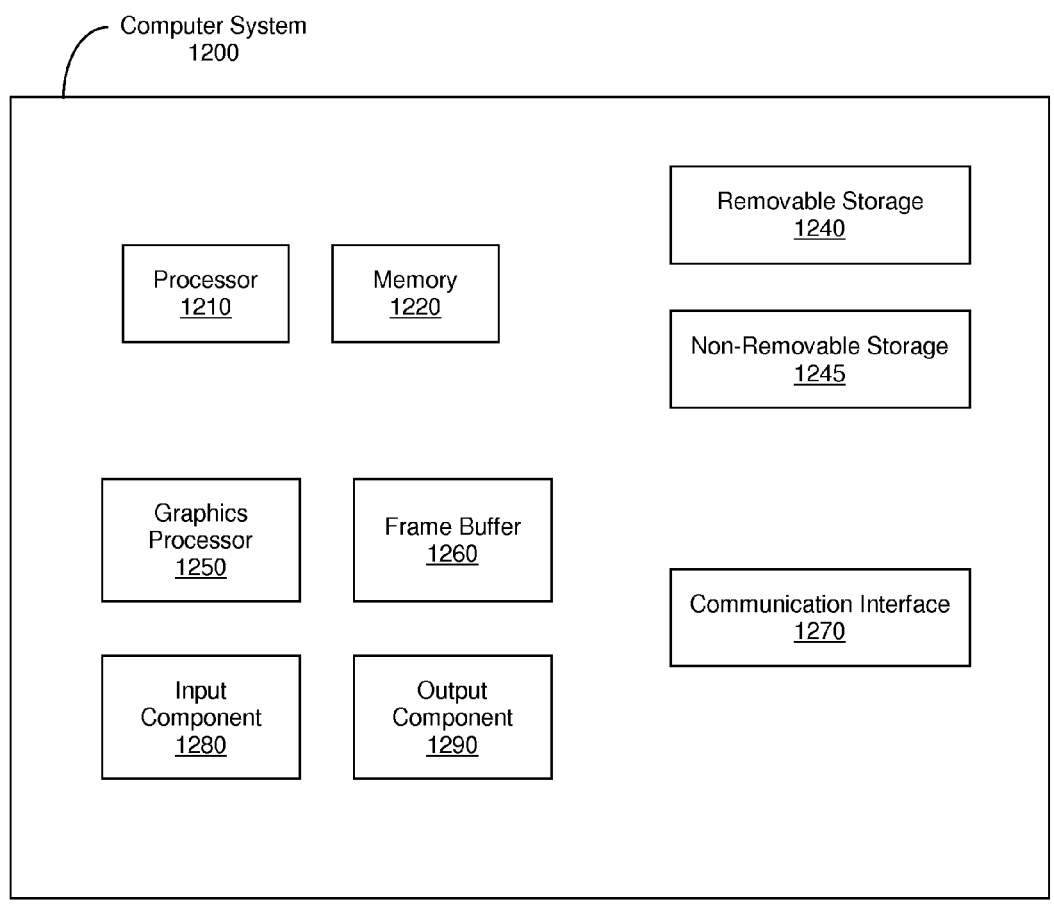
FIG. 12 shows a computer system upon which one or more embodiments may be implemented.

FIG. 12 shows computer system 1200 upon which one or more embodiments may be implemented. As shown in FIG. 12, computer system 1200 may include processor 1210, memory 1220, removable storage 1240, non-removable storage 1245, graphics processor 1250, frame buffer 1260, communication interface 1270, input component 1280, and output component 1290. One or more embodiments may be implemented by execution of computer-readable instructions or computer-executable instructions that may reside in at least one component of computer system 1200 and which may be used as a part of a general purpose computer network. In one embodiment, computer system 1200 may be a general-purpose computer system, an embedded computer system, a laptop computer system, a hand-held computer system, a portable computer system and/or portable electronic device, a stand-alone computer system, etc.

Figure 14:
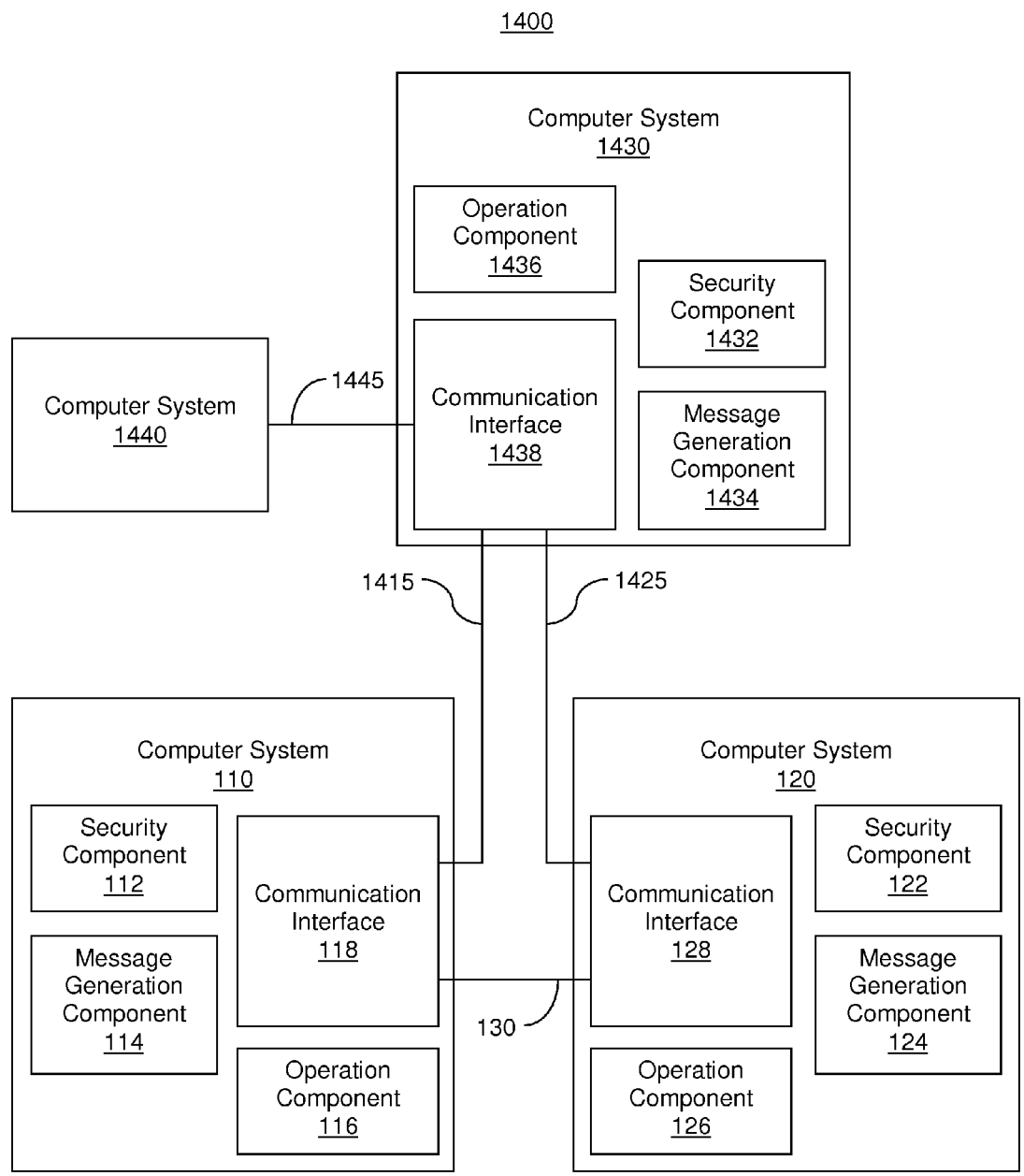
FIG. 14 shows a system for increasing communication security in accordance with one embodiment.

In one embodiment, computer system 1200 may be used to implement computer system 110, computer system 120, computer system 1430 of FIG. 14, computer system 1440 of FIG. 14, another system or device configured to communicate messages (e.g., CoAP messages, other types of messages, etc.), some combination thereof, etc. And in one embodiment, one or more components of computer system 1200 may be disposed in and/or coupled with a housing or enclosure.

In one embodiment, computer system 1200 may include at least one processor (e.g., 1210) and at least one memory (e.g., 1220). Processor 1210 may be or include a central processing unit (CPU) or other type of processor. Depending on the configuration and/or type of computer system environment, memory 1220 may be or include volatile memory (e.g., RAM), non-volatile memory (e.g., ROM, flash memory, etc.), some combination thereof, etc. Additionally, memory 1220 may be removable, non-removable, etc.

In one embodiment, computer system 1200 may include additional storage (e.g., removable storage 1240, non-removable storage 1245, etc.). Removable storage 1240 and/or non-removable storage 1245 may include volatile memory, non-volatile memory, some combination thereof, etc. Additionally, removable storage 1240 and/or non-removable storage 1245 may include CD-ROM, digital versatile disks (DVD), other optical storage, magnetic cassettes, magnetic tape, magnetic disk storage, other magnetic storage devices, or any other medium which can be used to store information for access by computer system 1200.

As shown in FIG. 12, computer system 1200 may communicate with other systems, components, or devices via communication interface 1270. Communication interface 1270 may be used to implement at least one communication interface (e.g., 118, 128, etc.) of one or more components of system 100 in one embodiment.

Communication interface 1270 may embody computer-readable instructions, data structures, program modules or other data in a modulated data signal (e.g., a carrier wave) or other transport mechanism By way of example, and not limitation, communication interface 1270 may couple to and/or communicate over wired media (e.g., a wired network, direct-wired connection, etc.) and/or wireless media (e.g., a wireless network, a wireless connection utilizing acoustic, RF, infrared, or other wireless signaling, etc.).

Communication interface 1270 may also couple computer system 1200 to one or more external input components (e.g., a keyboard, a mouse, a trackball, a joystick, a pen, a voice input device, a touch input device, etc.). In one embodiment, communication interface 1270 may couple computer system 1200 to one or more external output components (e.g., a display, a speaker, a printer, etc.). And in one embodiment, communication interface 1270 may include a plug, receptacle, cable, slot or any other component capable of coupling to and/or communicating with another component, device, system, etc.

Input component 1280 may include any component capable of receiving or allowing the input of information. For example, input component 1280 may be or include a keyboard, at least one button or key, a mouse, a trackball, a joystick, a pen, a voice input device, a touch input device, another type of input component, etc. Output component 1290 may include any component capable of transmitting or allowing the output of information. For example, output component 1290 may be or include a display, a speaker, a printer, another type of output component, etc.

As shown in FIG. 12, graphics processor 1250 may perform graphics processing operations on graphical data stored in frame buffer 1260 or another memory (e.g., 1220, 1240, 1245, etc.) of computer system 1200. Graphical data stored in frame buffer 1260 may be accessed, processed, and/or modified by components (e.g., graphics processor 1250, processor 1210, some combination thereof, etc.) of computer system 1200 and/or components of other systems, other devices, etc. Additionally, the graphical data may be accessed (e.g., by graphics processor 1250) and displayed on an output device coupled to computer system 1200 in one embodiment.

In one embodiment, a memory of computer system 1200 (e.g., memory 1220, removable storage 1240, non-removable storage 1245, frame buffer 1260, some combination thereof, etc.) may be a computer-readable medium (or computer-usable medium, or computer-readable storage medium, etc.) and may include instructions that when executed by a processor (e.g., 1210, 1250, etc.) implement a method of increasing communication security (e.g., in accordance with process 600 of FIGS. 6A and 6B, process 1300 of FIGS. 13A and 13B, process 3000 of FIGS. 30A, 30B, and 30C, etc.), generating a CoAP message (e.g., in accordance with process 800 of FIG. 8), processing a CoAP message (e.g., in accordance with process 900 of FIG. 9), performing message validation (e.g., in accordance with process 1000 of FIG. 10, process 2800 of FIG. 28, etc.), determining whether at least one condition for message invalidity is met (e.g., in accordance with process 1100 of FIG. 11), configuring permissions (e.g., in accordance with process 1500 of FIG. 15), generating a message associated with communication between a plurality of computer systems (e.g., in accordance with process 1800 of FIG. 18), performing processing associated with a message (e.g., in accordance with process 2000 of FIGS. 20A and 20B, process 2200 of FIG. 22, process 2600 of FIGS. 26A and 26B, etc.), generating a message including a data portion associated with a security token (e.g., in accordance with process 2500 of FIG. 25), generating a message associated with successful access of a session key (e.g., in accordance with process 2900 of FIG. 29), some combination thereof, etc. And in one embodiment, a computer-readable medium of computer system 1200 may be implemented in and/or using at least one die of at least one integrated circuit (e.g., at least one application-specific integrated circuit (ASIC), at least one system-on-a-chip (SOC), at least one programmable system-on-a-chip (PSOC), another type of integrated circuit, etc.).

Figure 13A:
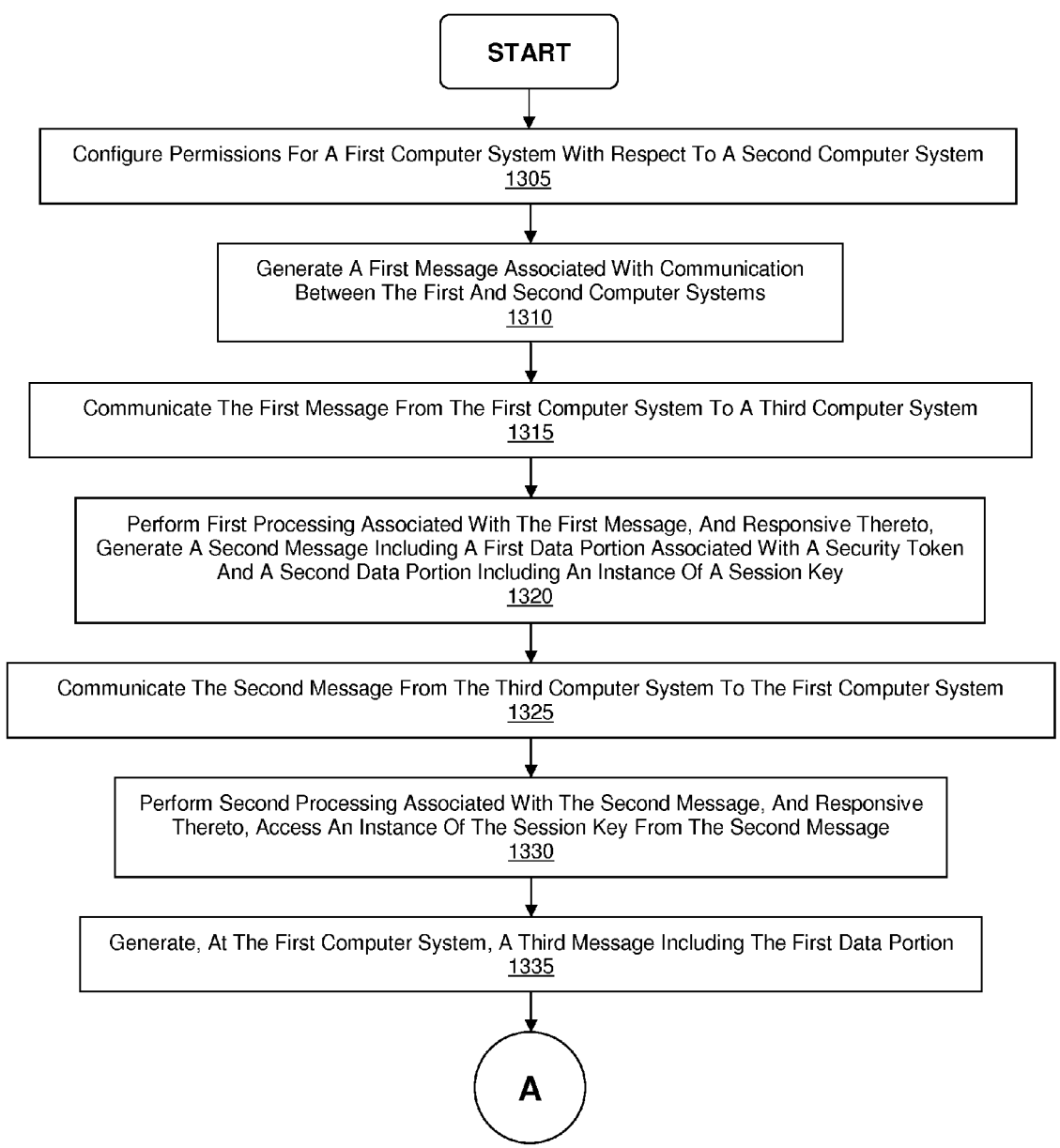
FIG. 13A shows a first portion of a flowchart of a process for increasing communication security in accordance with one embodiment.
Figure 13B:
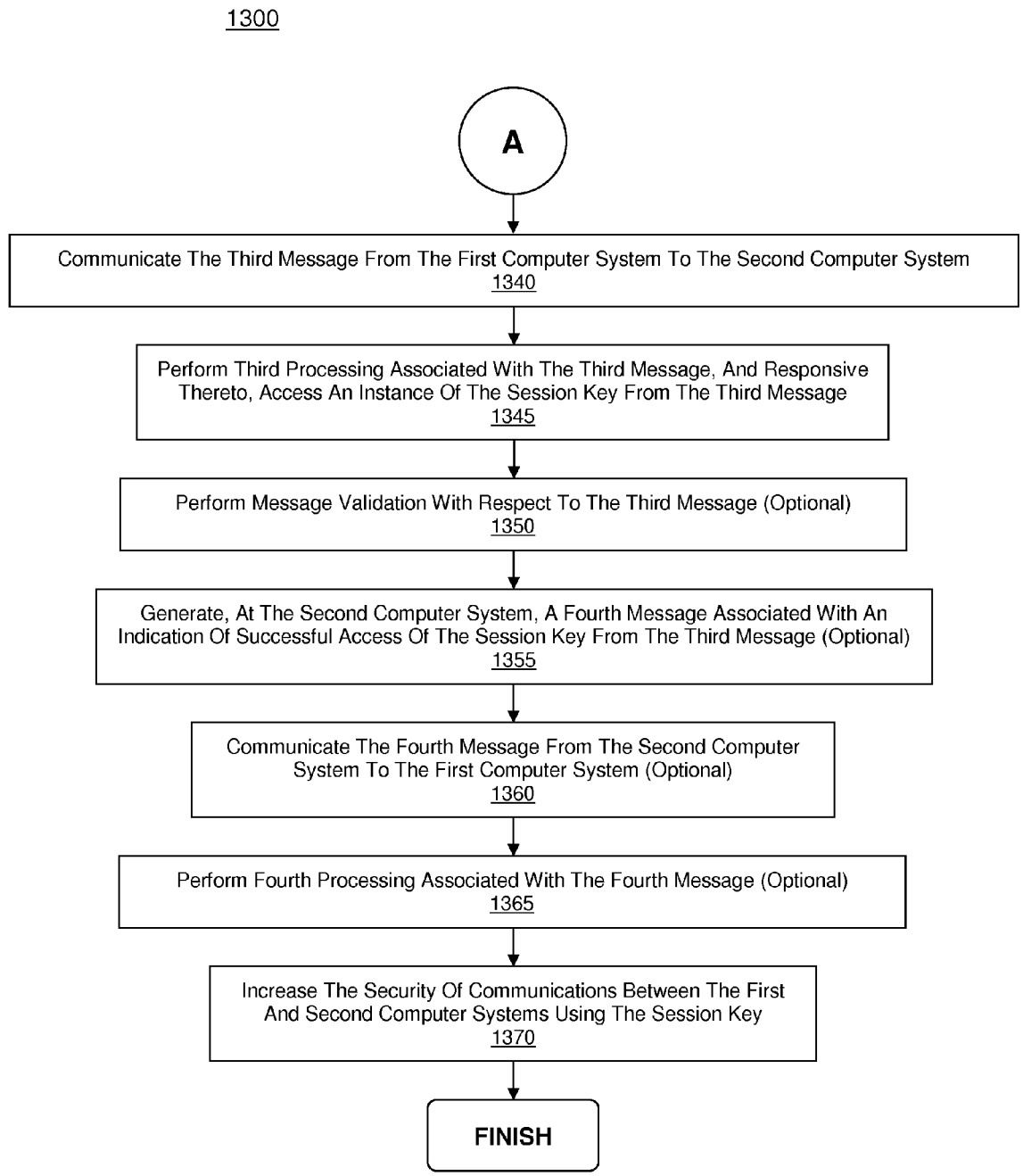
FIG. 13B shows a second portion of a flowchart of a process for increasing communication security in accordance with one embodiment.

FIGS. 13A and 13B show a flowchart of process 1300 for increasing communication security in accordance with one embodiment. FIG. 14 will be described in conjunction with FIGS. 13A and 13B.

As shown in FIG. 13A, step 1305 involves configuring permissions for a first computer system with respect to a second computer system. In one embodiment, step 1305 may involve configuring permissions for a first computer system (e.g., 110 as shown in FIG. 14) with respect to a second computer system (e.g., 120 as shown in FIG. 14) using a third computer system (e.g., computer system 1430 of FIG. 14). Step 1305 may be performed using a security component (e.g., 1432 of computer system 1430) in one embodiment. And in one embodiment, step 1305 may be performed in accordance with one or more steps of process 1500 of FIG. 15.

Figure 15:
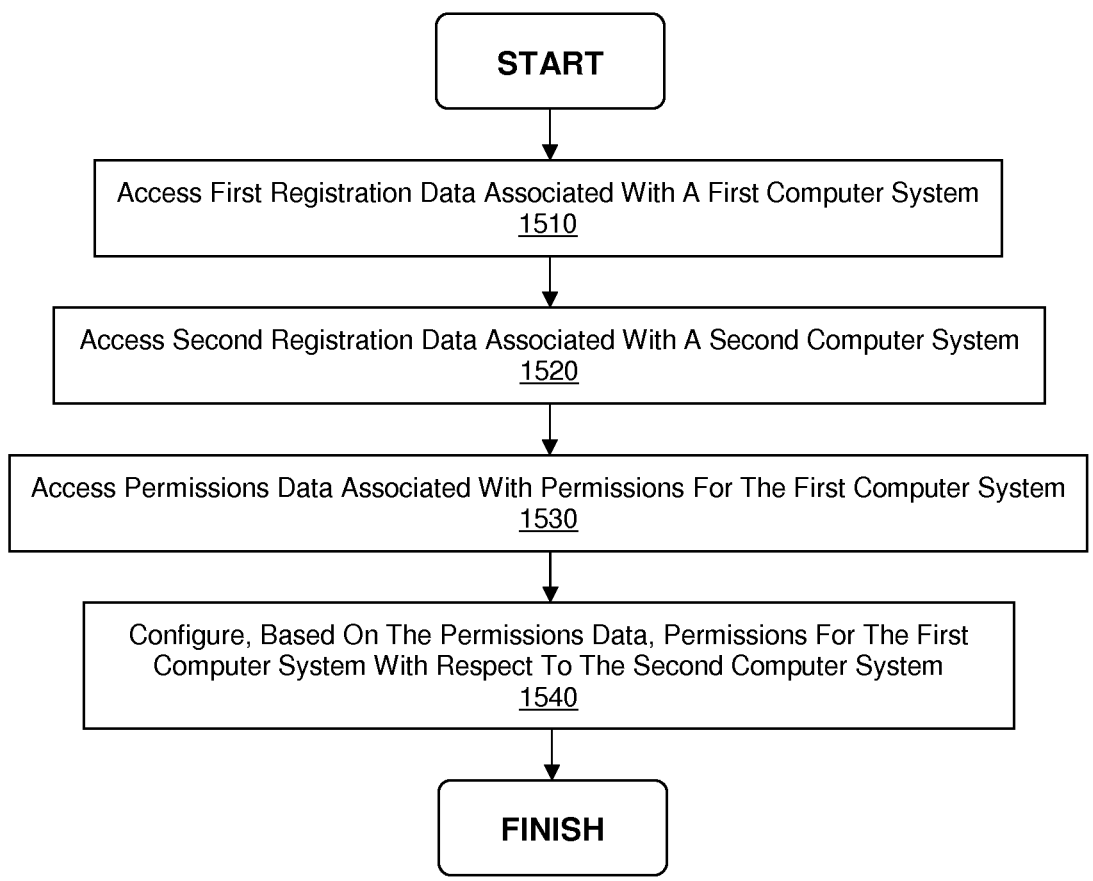
FIG. 15 shows a flowchart of a process for configuring permissions in accordance with one embodiment.

FIG. 15 shows a flowchart of process 1500 for configuring permissions in accordance with one embodiment. As shown in FIG. 15, step 1510 involves accessing first registration data associated with a first computer system. For example, first registration data associated with the first computer system (e.g., 110) may be accessed by the third computer system (e.g., 1430) in step 1510. The first registration data may include a unique identifier associated with the first computer system, credentials or other information associated with the first computer system, etc.

Step 1510 may involve communicating the first registration data from the computer system being registered in one embodiment. For example, first registration data associated with the first computer system may be communicated from the first computer system (e.g., 110) to the third computer system (e.g., 1430). In one embodiment, registration data may be communicated between the first and third computer systems over connection 1415.

Alternatively, step 1510 may involve communicating the first registration data from a computer system other than the computer system being registered. For example, first registration data associated with the first computer system may be communicated from a fourth computer system (e.g., computer system 1440) to the third computer system (e.g., 1430). The fourth computer system (e.g., 1440) may be operated by the owner of, or a user associated with, the first computer system (e.g., 110) in one embodiment. In one embodiment, registration data may be communicated in step 1510 between the third and fourth computer systems over connection 1445. And in one embodiment, step 1510 may be performed using a security component (e.g., 1432), a communication interface (e.g., 1438), some combination thereof, etc.

As shown in FIG. 15, step 1520 involves accessing second registration data associated with a second computer system. For example, second registration data associated with the second computer system (e.g., 120) may be accessed by the third computer system (e.g., 1430) in step 1520. The second registration data may include a unique identifier associated with the second computer system, credentials or other information associated with the second computer system, etc.

Step 1520 may involve communicating the second registration data from the computer system being registered in one embodiment. For example, second registration data associated with the second computer system may be communicated from the second computer system (e.g., 120) to the third computer system (e.g., 1430). In one embodiment, registration data may be communicated between the second and third computer systems over connection 1425.

Alternatively, step 1520 may involve communicating the second registration data from a computer system other than the computer system being registered. For example, second registration data associated with the second computer system may be communicated from the fourth computer system (e.g., 1440) to the third computer system (e.g., 1430). The fourth computer system (e.g., 1440) may be operated by the owner of, or a user associated with, the second computer system (e.g., 120) in one embodiment. In one embodiment, registration data may be communicated in step 1520 between the third and fourth computer systems over connection 1445. And in one embodiment, step 1520 may be performed using a security component (e.g., 1432), a communication interface (e.g., 1438), some combination thereof, etc.

In one embodiment, the registration data (e.g., the first registration data accessed in step 1510, the second registration data accessed in step 1520, some combination thereof, etc.) may be manually input by a user. For example, the registration data may be manually input using the first computer system (e.g., 110), where the first computer system may communicate the registration data to the third computer system (e.g., 1430). As another example, the registration data may be manually input using the second computer system (e.g., 120), where the second computer system may communicate the registration data to the third computer system (e.g., 1430). As another example, the registration data may be manually input using a fourth computer system (e.g., 1440), where the fourth computer system may communicate the registration data to the third computer system (e.g., 1430). In this example, the fourth computer system (e.g., 1440) may be operated by the owner of, or a user associated with, the first computer system (e.g., 110) and/or the second computer system (e.g., 120). And as yet another example, the registration data may be manually input using the third computer system (e.g., 1430).

In one embodiment, step 1510 and/or step 1520 may involve performing a registration of at least one computer system. For example, registration of a first computer system (e.g., 110) may be performed (e.g., using the third computer system or computer system 1430) in step 1510 by accessing and/or communicating registration data associated with the first computer system. As another example, registration of a second computer system (e.g., 120) may be performed (e.g., using the third computer system or computer system 1430) in step 1520 by accessing and/or communicating registration data associated with the second computer system.

As shown in FIG. 15, step 1530 involves accessing permissions data associated with permissions for the first computer system (e.g., 110). The permissions data may be accessed in step 1530 at the third computer system (e.g., 1430) in one embodiment. And in one embodiment, step

1530 may be performed using a security component (e.g., 1432), a communication interface (e.g., 1438), some combination thereof, etc.

The permissions data accessed in step 1530 may be associated with a request to allow the first computer system to communicate with the second computer system in one embodiment. The request may be from the second computer system (e.g., 120), from another computer system or device associated therewith, etc.

In one embodiment, the permissions data accessed in step 1530 may be associated with an approval of access provided responsive to a request for access. For example, responsive to a request for access of the first computer system (e.g., 110) to the second computer system (e.g., 120), the permissions data accessed in step 1530 may be associated with an approval of access to the second computer system (e.g., 120) by the first computer system (e.g., 110). In one embodiment, the request for access may be from the first computer system (e.g., 110) or from another computer system associated therewith, while the approval of access may be from the second computer system (e.g., 120) or from another computer system associated therewith.

As shown in FIG. 15, step 1540 involves configuring, based on the permissions data, permissions for the first computer system with respect to the second computer system. Configuration of permissions may be performed in step 1540 at the third computer system (e.g., 1430) in one embodiment. And in one embodiment, step 1540 may be performed using a security component (e.g., 1432).

For example, the third computer system (e.g., 1430) may configure permissions for the first computer system in step 1540, thereby allowing the first computer system to communicate with and/or connect to the second computer system. In this case, the permissions data (e.g., used to configure permissions for the first computer system) may be a request to allow the first computer system to communicate with the second computer system, or alternatively, the permissions data may be an approval of access (e.g., to the second computer system by the first computer system) provided responsive to a request for access (e.g., of the first computer system to the second computer system). In this manner, the third computer system (e.g., 1430) may handle permissions management or access control for the first computer system (e.g., 110), the second computer system (e.g., 120), at least one other computer system, etc.

The permissions data (e.g., accessed in step 1530 and/or used to configure permissions for the first computer system in step 1540) may be manually input by a user in one embodiment. For example, the permissions data may be manually input using the third computer system (e.g., 1430). As another example, the permissions data may be manually input using a fourth computer system (e.g., 1440), where the fourth computer system may communicate the permissions data to the third computer system (e.g., 1430). In this example, the fourth computer system (e.g., 1440) may be operated by the owner of, or a user associated with, the second computer system (e.g., 120). And as yet another example, the permissions data may be manually input using the second computer system (e.g., 120), where the second computer system may communicate the permissions data to the third computer system (e.g., 1430).

FIG. 16 shows permissions configuration data 1600 in accordance with one embodiment. Permissions configuration data (e.g., 1600) may be stored at or accessible to the third computer system (e.g., 1430) in one embodiment.

As shown in FIG. 16, permissions configuration data 1600 may include a correlation or mapping of at least one computer system (e.g., in column 1620) that is authorized to communicate with and/or connect to at least one other computer system (e.g., in column 1610). For example, a first set of computer systems (e.g., corresponding to the unique identifiers of "cs110," "cs130," and "cs140") may be authorized to communicate with and/or connect to at least one other computer system (e.g., corresponding to the unique identifier of "cs120"). As another example, a second set of computer systems (e.g., corresponding to the unique identifiers of "cs110" and "cs160") may be authorized to communicate with and/or connect to at least one other computer system (e.g., corresponding to the unique identifier of "cs150"). And as yet another example, a particular computer system (e.g., corresponding to the unique identifier of "cs110") may be authorized to communicate with and/or connect to at least one other computer system (e.g., corresponding to the unique identifier of "cs170").

In one embodiment, the unique identifiers in column 1610 may be associated with target systems, and the unique identifiers in column 1620 may be associated with caller systems. In this manner, permissions configuration data 1600 may include a correlation or mapping of at least one caller system (e.g., in column 1620) that is authorized to communicate with and/or connect to at least one target system (e.g., in column 1610).

Permissions configuration data (e.g., 1600) may be generated or updated as a result of permission configuration in step 1540 of process 1500 in one embodiment. For example, where permission configuration data already exists for the second computer system (e.g., corresponding to the unique identifier "cs120"), a unique identifier (e.g., "cs110") corresponding to the first computer system (e.g., 110) may be added in step 1540 to a list of at least one other unique identifier (e.g., "cs130," "cs140," etc.) corresponding to at least one other computer system that is authorized to communicate with and/or connect to the second computer system (e.g., 120). As another example, where permission configuration data does not yet exist for the second computer system (e.g., 120), permission configuration data may be generated in step 1540 that includes a correlation or mapping between at least a first unique identifier (e.g., "cs110") corresponding to the first computer system (e.g., 110) and a second unique identifier (e.g., "cs120") corresponding to the second computer system (e.g., 120).

Although FIG. 16 shows permissions configuration data 1600 as including a particular amount of data, it should be appreciated that a different amount of data may be included in permissions configuration data 1600 in other embodiments. Additionally, although FIG. 16 shows permissions configuration data 1600 as including a particular arrangement and type of data, it should be appreciated that a different arrangement and/or type of data may be included in permissions configuration data 1600 in other embodiments.

Although FIG. 15 depicts process 1500 as including a specific number of steps, it should be appreciated that process 1500 may include a different number of steps in other embodiments. Although FIG. 15 depicts process 1500 as including a specific ordering of steps, it should be appreciated that process 1500 may include a different ordering of steps in other embodiments.

Turning back to FIG. 14, communication interface 1438 may be used to implement at least one connection (e.g., 1415, 1425, 1445, etc.). Communication interface 1438 may include hardware and/or software allowing at least one connection (e.g., 1415, 1425, 1445, etc.) to be established and allowing communication of at least one message over the at least one connection. Communication interface 1438 may allow unidirectional communication and/or bidirectional communication over at least one connection (e.g., 1415, 1425, 1445, etc.) with at least one other computer system (e.g., 110, 120, 1440, etc.) in one embodiment. And in one embodiment, communication interface 1438 may allow contemporaneous (or simultaneous) bidirectional communication (e.g. "full-duplex" communication) over at least one connection (e.g., 1415, 1425, 1445, etc.) with at least one other computer system (e.g., 110, 120, 1440, etc.).

At least one connection of system 1400 (e.g., connection 130, connection 1415, connection 1425, connection 1445, some combination thereof, etc.) may be or include a wired connection in one embodiment. For example, at least one connection (e.g., 130, 1415, 1425, 1445, some combination thereof, etc.) may be or include a IEEE 1394 or FireWire® connection, PCI Express® connection, Ethernet connection, SATA connection, eSATA connection, RS-232 connection, I2C connection, etc. In one embodiment, at least one connection of system 1400 (e.g., connection 130, connection 1415, connection 1425, connection 1445, some combination thereof, etc.) may be or include a wireless connection such as a Bluetooth® connection, Near Field Communication (NFC) connection, infrared (IR) connection, IEEE 802.XX connection, cellular connection, etc. And in one embodiment, at least one connection of system 1400 (e.g., connection 130, connection 1415, connection 1425, connection 1445, some combination thereof, etc.) may be or include the Internet.

In one embodiment, the first computer system (e.g., 110) may be a client within system 1400, and the second computer system (e.g., 120) may be a server within system 1400. And in one embodiment, the first computer system (e.g., 110) may be the "caller" system within system 1400, and the second computer system (e.g., 120) may be the "target" system within system 1400.

Turning back to FIG. 13A, step 1310 involves generating a first message associated with communication between the first computer system (e.g., 110) and the second computer system (e.g., 120). For example, the first message may include data associated with a request from the first computer system (e.g., 110) to communicate with and/or connect to the second computer system (e.g., 120). As another example, the first message may include data associated with a request by the first computer system (e.g., 110) for a security token and/or session key (or at least one instance thereof) from the third computer system (e.g., 1430), where the security token and/or session key (or at least one instance thereof) may relate to communication between the first and second computer systems. And in one embodiment, the first message may include data associated with a target system (e.g., the second computer system or computer system 120) corresponding to the request of the first message, where the data associated with the target system may be or include a unique identifier associated with the target system.

In one embodiment, step 1310 may involve generating the first message at the first computer system (e.g., 110). And in one embodiment, step 1310 may be performed using a message generation component (e.g., 114 of computer system 110), a security component (e.g., 112 of computer system 110), some combination thereof, etc.

The first message may be a CoAP message (e.g., 1700A of FIG. 17A) in one embodiment. The CoAP message (e.g., 1700A) may include data associated with a request from the first computer system (e.g., 110) to communicate with and/or connect to the second computer system (e.g., 120), a request by the first computer system (e.g., 110) for a security token and/or session key (or at least one instance thereof) from the third computer system (e.g., 1430), some combination thereof, etc. For example, the data associated with the request may be included in the CoAP message as an option associated with a query (e.g., a "Uri-Query" option with an option value of "communicationrequest" as depicted in FIG. 17A).

In one embodiment, the CoAP message (e.g., 1700A) may include data associated with a target system (e.g., a unique identifier associated with the target system) corresponding to the data associated with the request. For example, the data associated with the target system (e.g., the second computer system or computer system 120) may be included in the CoAP message as an option associated with a query (e.g., a "Uri-Query" option with an option value of "tid=cs120" as depicted in FIG. 17A). As such, where "cs120" is a unique identifier associated with the second computer system (e.g., 120), the CoAP message (e.g., 1700A) may indicate a request from the first computer system (e.g., 110) to communicate with the second computer system (e.g., 120), a request from the first computer system (e.g., 110) to connect to the second computer system (e.g., 120), a request from the first computer system (e.g., 110) for a security token associated with communication with the second computer system (e.g., 120), a request from the first computer system (e.g., 110) for a session key (or at least one instance thereof) associated with communication with the second computer system (e.g., 120), some combination thereof, etc.

FIG. 17A shows CoAP message 1700A associated with communication between a first computer system (e.g., 110) and a second computer system (e.g., 120) in accordance with one embodiment. As shown in FIG. 17A, CoAP message 1700A may include data associated with a header, where the data associated with the header includes data associated with a version (e.g., "1"), a message type (e.g., "CON" or confirmable), a token length (e.g., "1" associated with a length of 1 byte), a code (e.g., a method code of "GET"), and a message identifier (e.g., "0x7d34"). Data associated with a token (e.g., "0x72") may also be included in CoAP message 1700A.

CoAP message 1700A may include data associated with at least one option. For example, CoAP message 1700A may include data associated with a host (e.g., an option value of "www.example.com"), data associated with a port (e.g., an option value of "5683"), data associated with a path (e.g., an option value of "communicationrequest"), some combination thereof, etc. In this case, at least one option associated with CoAP message 1700A may correspond to a URI of "coap://www.example.com:5683/communicationrequest", "coap://www.example.com/communicationrequest", "coaps://www.example.com:5683/communicationrequest", "coaps://www.example.com/communicationrequest", some combination thereof, etc.

The URI corresponding to at least one option associated with CoAP message 1700A may be specific or unique to the third computer system (e.g., 1430) in one embodiment. And in one embodiment, data associated with a path (e.g., an option value of "communicationrequest", at least one other option value, etc.) of CoAP message 1700A may be specific or unique to the third computer system (e.g., 1430).

As another example, CoAP message 1700A may include data associated with a max-age value (e.g., an option value of "0"). In this case, a max-age value of "0" may be used to indicate that CoAP message 1700A is not to be cached by an intermediary system or device (e.g., situated between the sender of the CoAP message 1700A and the ultimate recipient of the CoAP message 1700A) such as a proxy server or other type of computer system or device.

As a further example, CoAP message 1700A may include data associated with a query (e.g., including one or more parameters). An option value of "tid=cs120" (e.g., associated with a first parameter) may be associated with a unique identifier (e.g., "cs120") of a target system (e.g., the second computer system or computer system 120). An option value of "uid=cs110" (e.g., associated with a second parameter) may be associated with a unique identifier (e.g., "cs110") of a sender of CoAP message 1700A and/or a caller system (e.g., the first computer system or computer system 110). An option value of "hs256=1" (e.g., associated with a third parameter) may be associated with an authentication mechanism (e.g., HMAC utilizing a hash function of SHA256) used to generate the authentication data (e.g., "Authentication Data A") included in CoAP message 1700A. An option value of "nonce=1" (e.g., associated with a fourth parameter) may be associated with a nonce (e.g., with a value of "1") included in CoAP message 1700A.

In one embodiment, one or more portions of CoAP message 1700A may be associated with a URI including at least one parameter of a query. For example, CoAP message 1700A may be associated with a URI of "coap://www.example.com:5683/communicationrequest?tid=cs120&uid=cs110&hs256=1&nonce=1", "coap://www.example.com/communicationrequest?tid=cs120&uid=cs110&hs256=1&nonce=1", "coaps://www.example.com:5683/communicationrequest?tid=cs120&uid=cs110&hs256=1&nonce=1", "coaps://www.example.com/communicationrequest?tid=cs120&uid=cs110&hs256=1&nonce=1", some combination thereof, etc.

CoAP message 1700A may include data associated with at least one option length. For example, CoAP message 1700A may include data associated with a first option length (e.g., 15 bytes) corresponding to data associated with a first option value (e.g., "www.example.com"), a second option length (e.g., 2 bytes) corresponding to data associated with a second option value (e.g., "5683"), a third option length (e.g., 20 bytes) corresponding to data associated with a third option value (e.g., "communicationrequest"), etc.

As shown in FIG. 17A, CoAP message 1700A may include data associated with at least one option identifier. The at least one option identifier may include data associated with an option number and/or an option delta in one embodiment. For example, CoAP message 1700A may include data associated with a first numerical value (e.g., "3") as a first option identifier corresponding to a first option (e.g., associated with a host), where the first numerical value (e.g., "3") may be the delta or difference between the current option number (e.g., "3") and the option number of the preceding option (e.g., "0" in this case since this is the first option). As such, the first numerical value of "3" may correspond to an option number of "3."

As another example, CoAP message 1700A may include data associated with a second numerical value (e.g., "4") as a second option identifier corresponding to a second option (e.g., associated with a port), where the second numerical value (e.g., "4") may be the delta or difference between the current option number (e.g., "7") and the option number of the preceding option (e.g., "3"). As such, the second numerical value of "4" may correspond to an option number of "7."

As a further example, CoAP message 1700A may include data associated with a third numerical value (e.g., "4") as a third option identifier corresponding to a third option (e.g., associated with a path), where the third numerical value (e.g., "4") may be the delta or difference between the current option number (e.g., "11") and the option number of the preceding option (e.g., "7"). As such, the third numerical value of "4" may correspond to an option number of "11."

As shown in FIG. 17A, CoAP message 1700A may include data associated with a payload marker (e.g., "0xFF"). CoAP message 1700A may include data associated with a payload, where the data associated with a payload may include authentication data (e.g., "Authentication Data A").

Although FIG. 17A shows CoAP message 1700A with a specific number and type of portions, it should be appreciated that CoAP message 1700A may include a different number and/or type of portions in other embodiments. For example, CoAP message 1700A may include fewer portions or at least one additional portion. As another example, a plurality of portions of CoAP message 1700A may be combined into a smaller number of portions. Although FIG. 17A shows CoAP message 1700A with a specific organization of portions, it should be appreciated that CoAP message 1700A may include a different organization of portions in other embodiments.

In one embodiment, data associated with at least one option may be excluded from CoAP message 1700A. For example, data (e.g., associated with a host, a port, a path, a max-age value, or some combination thereof) used by intermediary systems or devices (e.g., situated between the sender of CoAP message 1700A and the ultimate recipient of CoAP message 1700A) such as a proxy server or other type of computer system or device may be excluded in one or more embodiments where intermediary systems or devices do not exist or are unlikely to exist.

Turning back to FIG. 13A, the first message may include authentication data in one embodiment. In this case, step 1310 may be performed in accordance with process 1800 of FIG. 18.

Figure 18:
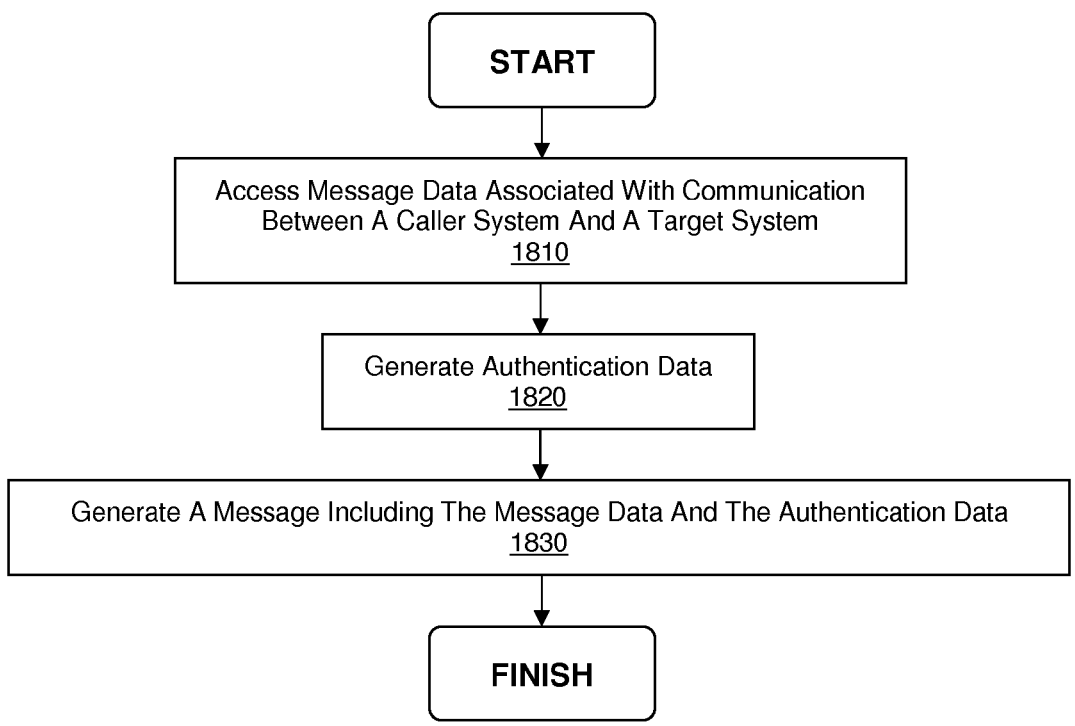
FIG. 18 shows a flowchart of a process for generating a message associated with communication between a plurality of computer systems in accordance with one embodiment.

FIG. 18 shows a flowchart of process 1800 for generating a message associated with communication between a plurality of computer systems in accordance with one embodiment. One or more steps of process 1800 may be performed at or by a caller system (e.g., the first computer system or computer system 110) in one embodiment.

As shown in FIG. 18, step 1810 involves accessing message data associated with communication between a caller system (e.g., the first computer system or computer system 110) and a target system (e.g., the second computer system or computer system 120). In one embodiment, step 1810 may be performed using a message generation component (e.g., 114 of computer system 110).

In one embodiment, the message data may include data associated with a request from the caller system (e.g., the first computer system or computer system 110) to communicate with and/or connect to the target system (e.g., the second computer system or computer system 120), a request by the caller system (e.g., the first computer system or computer system 110) for a security token and/or session key (or at least one instance thereof) from the third computer system (e.g., 1430), some combination thereof, etc. For example, where the first message is a CoAP message (e.g., 1700A), the message data accessed in step 1810 may include data associated with an option (e.g., a "Uri-Query" option with an option value of "communicationrequest") that identifies the request.

The message data may include data associated with a target system (e.g., a unique identifier associated with the target system) corresponding to the request in one embodiment. For example, where the first message is a CoAP message (e.g., 1700A), the message data accessed in step 1810 may include data associated with an option (e.g., a "Uri-Query" option with an option value of "tid=cs120") that identifies the target system corresponding to the data associated with the request.

In one embodiment, the message data accessed in step 1810 may include data other than authentication data. For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), data other than the authentication data (e.g., "Authentication Data A" of CoAP message 1700A), some combination thereof, etc.

As shown in FIG. 18, step 1820 involves generating authentication data. In one embodiment, step 1820 may be performed using a security component (e.g., 112 of computer system 110).

In one embodiment, the authentication data may be generated in step 1820 using an authentication mechanism such as HMAC, OAuth, OAuth 2.0, OpenID, etc. The authentication data may be generated in step 1820 using a key in one embodiment. For example, where the authentication mechanism used to generate the authentication data in step 1820 is HMAC, the authentication data may be generated by performing a hash function (e.g., MD5, SHA-1, SHA256, SHA512, etc.) on message data (e.g., accessed in step 1810) using a key. And in one embodiment, the message data may be free of the key used to generate the authentication data in step 1820.

A key associated with the caller system (e.g., the first computer system or computer system 110) may be used to generate the authentication data in step 1820 in one embodiment. For example, the key may be a secret key or private key that is unique to the caller system (e.g., the first computer system or computer system 110). The key may be stored locally at the first computer system (e.g., 110) in one embodiment. For example, the key may be stored locally in a security component (e.g., 112 of computer system 110), in a memory (e.g., of computer system 110), in a database (e.g., of computer system 110), etc. Alternatively, the key may be stored remotely (e.g., at another system or device) and accessed by the first computer system (e.g., 110) in a secure manner in one embodiment. Accordingly, a key associated with the caller system (e.g., the first computer system or computer system 110) may be securely accessed and used by the caller system to generate the authentication data in step 1820 in one embodiment.

As shown in FIG. 18, step 1830 involves generating a message including the message data (e.g., accessed in step 1810) and the authentication data (e.g., generated in step 1820). In one embodiment, step 1830 may be performed using a message generation component (e.g., 114 of computer system 110).

In one embodiment, where the message generated in step 1830 is a CoAP message (e.g., 1700A), step 1830 may involve formatting the message data (e.g., accessed in step 1810) in accordance with CoAP (e.g., into one or more portions of CoAP message 200). The authentication data (e.g., generated in step 1820) may be included in or as the payload (e.g., associated with portion 250 of CoAP message 200) of the CoAP message in one embodiment. For example, as shown in FIG. 17A, authentication data (e.g., "Authentication Data A") may be included in or as the payload of CoAP message 1700A.

Step 1830 may involve including a payload marker as part of the message in one embodiment. For example, where the message data (e.g., accessed in step 1810) is free of data or content to be included as a payload (e.g., and therefore is also free of a payload marker), a payload marker may be included as part of the message in step 1830 since the authentication data (e.g., generated in step 1820) may be included as the payload (e.g., the entire payload) of the message.

In one embodiment, step 1830 may involve generating a bit stream or byte stream including the message data (e.g., accessed in step 1810) and the authentication data (e.g., generated in step 1820). The bit stream or byte stream may be formatted in accordance with CoAP in one embodiment.

Although FIG. 18 depicts process 1800 as including a specific number of steps, it should be appreciated that process 1800 may include a different number of steps in other embodiments. Although FIG. 18 depicts process 1800 as including a specific ordering of steps, it should be appreciated that process 1800 may include a different ordering of steps in other embodiments.

Turning back to FIG. 13A, step 1315 involves communicating the first message (e.g., generated in step 1310 and/or in accordance with one or more steps of process 1800 of FIG. 18) from the first computer system (e.g., 110) to a third computer system (e.g., 1430). In one embodiment, the first message may be communicated in step 1315 over a connection (e.g., 1415 between computer system 110 and computer system 1430). The first message may be communicated in step 1315 as a bit stream or a byte stream in one embodiment. And in one embodiment, step 1315 may involve communicating the first message using at least one communication interface (e.g., 118 of computer system 110, 1438 of computer system 1430, etc.).

In one embodiment, step 1315 may involve communicating the first message using Datagram Transport Layer Security (DTLS). For example, where the first message is a CoAP message (e.g., 1700A), step 1315 may involve communicating the first message over CoAP using DTLS.

As shown in FIG. 13A, step 1320 involves performing first processing associated with the first message, and responsive thereto, generating a second message including a first data portion associated with a security token and a second data portion including an instance of a session key. In one embodiment, step 1320 may involve performing the first processing associated with the first message at the third computer system (e.g., 1430). For example, responsive to receiving the first message (e.g., generated in step 1310 and communicated in step 1315), the third computer system (e.g., 1430) may determine whether the first computer system (e.g., 110) is authorized to communicate with and/or connect to the second computer system (e.g., 120). As another example, responsive to receiving the first message (e.g., generated in step 1310 and communicated in step 1315), the third computer system (e.g., 1430) may perform message validation. And in one embodiment, the first processing may be performed using a security component (e.g., 1432).

Determination of whether the first computer system (e.g., 110) is authorized to communicate with and/or connect to the second computer system (e.g., 120) may be performed in step 1320 based on permissions configuration data (e.g., 1600 of FIG. 16, generated and/or updated in step 1305, generated and/or updated in step 1540 of process 1500, etc.) in one embodiment. For example, permissions configuration data may be accessed (e.g., using data included in the first message such as a unique identifier associated with the first computer system, a unique identifier associated with the second computer system, etc.) to determine whether the first computer system (e.g., 110) is authorized to communicate with and/or connect to the second computer system (e.g., 120). In one embodiment, the permissions configuration data may be stored at the third computer system (e.g., 1430), stored remotely and accessible to the third computer system (e.g., 1430), etc.

Where the first message includes authentication data, message validation may be performed in step 1320 based on the authentication data. For example, the third computer system (e.g., 1430) may generate second authentication data based on at least a portion of the first message (e.g., a header, a token, at least one option, a payload marker, a payload, some combination thereof, etc.). The second authentication data may be compared to the authentication data (e.g., included in the first message) to verify the authenticity of the first computer system (e.g., 110), verify the integrity of the first message, detect and/or act on a replay attack, some combination thereof, etc.

In one embodiment, the second authentication data may be generated in step 1320 using an authentication mechanism such as HMAC, OAuth, OAuth 2.0, OpenID, etc. The second authentication data may be generated in step 1320 using a key in one embodiment. For example, where the authentication mechanism used to generate the second authentication data in step 1320 is HMAC, the second authentication data may be generated by performing a hash function (e.g., MD5, SHA-1, SHA256, SHA512, etc.) on at least a portion of the first message (e.g., a header, a token, at least one option, a payload marker, a payload, some combination thereof, etc.) using a key. And in one embodiment, the first message may be free of the key used to generate the second authentication data in step 1320.

A key associated with the first computer system (e.g., 110) may be used to generate the second authentication data in step 1320 in one embodiment. For example, the key may be a secret key or private key that is unique to the first computer system (e.g., 110). The key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the first computer system (e.g., 110) may be securely accessed and used by the third computer system (e.g., 1430) to generate the second authentication data in step 1320 in one embodiment.

Step 1320 may involve generating the second message (e.g., including a first data portion associated with a security token and a second data portion including an instance of a session key) at the third computer system (e.g., 1430) in one embodiment. In one embodiment, the second message may be generated using a message generation component (e.g., 1434) alone or in combination with at least one other component (e.g., security component 1432, etc.).

The second message may be generated based on the results of the first processing in one embodiment. For example, if the first computer system (e.g., 110) is authorized to communicate with and/or connect to the second system (e.g., 120) and/or if the first message is valid, then the second message may be generated in step 1320.

In one embodiment, the first data portion of the second message may include a first instance of a session key, and the second data portion of the second message may include a second instance of the session key. The session key and/or a plurality of instances thereof may be generated in step 1320 at the third computer system (e.g., 1430) in one embodiment. In one embodiment, the session key and/or a plurality of instances thereof may be generated using a security component (e.g., 1432). In one embodiment, the session key may be generated in step 1320 based on a random number, pseudorandom number, other data, some combination thereof, etc. A third instance of the session key may be stored at the third computer system (e.g., 1430) in one embodiment.

FIG. 19 shows data portion 1900 associated with a security token in accordance with one embodiment. In one embodiment, data portion 1900 may be, or be used to implement, the first data portion included in the second message generated in step 1320.

As shown in FIG. 19, data portion 1900 may include portion 1910 associated with a unique identifier of a caller system (e.g., the first computer system or computer system 110), portion 1920 associated with a unique identifier of a target system (e.g., the second computer system or computer system 120), portion 1930 associated with expiration data, portion 1940 associated with an instance of a session key, some combination thereof, etc.

In one embodiment, the unique identifier of the first computer system (e.g., 110) may be included in or otherwise associated with portion 1910, and the unique identifier of the second computer system (e.g., 120) may be included in or otherwise associated with portion 1920. In one embodiment, expiration data associated with portion 1930 may include a timestamp (e.g., associated with creation of the security token and/or session key), a duration or lifetime (e.g., of the security token and/or session key), other data, some combination thereof, etc. Where the expiration data includes a timestamp, the timestamp may be a UTC timestamp, unix timestamp, epoch timestamp, another type of timestamp, etc. Where the expiration data includes a duration or lifetime, the duration or lifetime may include a timeout.

The duration or lifetime may be set or determined by the second computer system (e.g., 120) or another computer system associated therewith in one embodiment. For example, the second computer system (e.g., 120) or another computer system associated therewith may communicate information about the duration or lifetime to the third computer system (e.g., 1430), where the third computer system may access and/or store the information about the duration or lifetime (e.g., for generation of and/or inclusion in portion 1930).

In one embodiment, portion 1940 may be associated with an instance (e.g., a first instance) of the session key generated by the third computer system (e.g., 1430) which may correspond to at least one other instance of the session key (e.g., a second instance included in the second data portion of the second message, a third instance stored at the third computer system, etc.). And in one embodiment, the expiration data (e.g., associated with portion 1930) may correspond to the instance of the session key associated with portion 1940 (and/or at least one other instance of the session key).

Data portion 1900 may form the security token in one embodiment. For example, portion 1910, portion 1920, portion 1930, and portion 1940 may form the security token. Alternatively, one or more portions of data portion 1900 may form the security token in one embodiment. For example, portion 1910, portion 1920, and portion 1930 may form the security token. As another example, portion 1920, portion 1930, and portion 1940 may form the security token. As yet another example, another combination of portions, or any one portion alone, may form the security token. In this manner, one or more portions of data portion 1900 may be separate from the security token in one embodiment.

Although FIG. 19 shows data portion 1900 as including a particular amount of data, it should be appreciated that a different amount of data may be included in data portion 1900 in other embodiments. Additionally, although FIG. 19 shows data portion 1900 as including a particular arrangement and type of data, it should be appreciated that a different arrangement and/or type of data may be included in data portion 1900 in other embodiments.

Turning back to FIG. 13A, step 1320 may involve encrypting data to generate the first data portion associated with the security token in one embodiment. The data may include a first instance of the session key and/or other data (e.g., associated with the security token such as a first unique identifier associated with the caller system, a second unique identifier associated with the target system, expiration data associated with the security token and/or session key, etc.). And in one embodiment, the first data portion may be generated by encrypting the data in step 1320 using AES, Blowfish, RC4, the Extended Tiny Encryption Algorithm (XTEA) scheme, another symmetric-key algorithm, etc.

In one embodiment, a key associated with the second computer system (e.g., 120) may be used to encrypt the data to generate the first data portion in step 1320. For example, the key may be a secret key or private key that is unique to the second computer system (e.g., 120). The key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the second computer system (e.g., 120) may be securely accessed and used by the third computer system (e.g., 1430) to encrypt data to generate the first data portion in step 1320 in one embodiment.

In one embodiment, step 1320 may involve encrypting data to generate the second data portion in one embodiment. The data may include a second instance of the session key. And in one embodiment, the second data portion may be generated by encrypting the data in step 1320 using AES, Blowfish, RC4, the Extended Tiny Encryption Algorithm (XTEA) scheme, another symmetric-key algorithm, etc.

In one embodiment, a key associated with the first computer system (e.g., 110) may be used to encrypt the data to generate the second data portion in step 1320. For example, the key may be a secret key or private key that is unique to the first computer system (e.g., 110). The key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the first computer system (e.g., 110) may be securely accessed and used by the third computer system (e.g., 1430) to encrypt data to generate the second data portion in step 1320 in one embodiment.

The first data portion and/or the second data portion may be included in or as the payload of the second message in step 1320 in one embodiment. And in one embodiment, the first data portion and/or the second data portion may be included in or as another portion of the second message in step 1320.

Step 1320 may involve generating authentication data to be included in the second message in one embodiment. The authentication data may be generated in step 1320 at the third computer system (e.g., 1430) in one embodiment. And in one embodiment, the authentication data may be generated in step 1320 using a security component (e.g., 1432 of computer system 1430).

In one embodiment, the authentication data may be generated in step 1320 using an authentication mechanism such as HMAC, OAuth, OAuth 2.0, OpenID, etc. The authentication data may be generated in step 1320 using a key in one embodiment. For example, where the authentication mechanism used to generate the authentication data in step 1320 is HMAC, the authentication data may be generated by performing a hash function (e.g., MD5, SHA-1, SHA256, SHA512, etc.) on message data (e.g., a header, a token, at least one option, a payload marker, a payload, the first data portion associated with a security token, the second data portion including an instance of a session key, some combination thereof, etc.) using a key. And in one embodiment, the message data may be free of the key used to generate the authentication data in step 1320.

A key associated with the first computer system (e.g., 110) may be used to generate the authentication data in step 1320 in one embodiment. For example, the key may be a secret key or private key that is unique to the first computer system (e.g., 110). The key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the first computer system (e.g., 110) may be securely accessed and used by the third computer system (e.g., 1430) to generate the authentication data in step 1320 in one embodiment.

In one embodiment, the authentication data may be included in or as the payload of the second message in step 1320. And in one embodiment, the authentication data may be included in or as another portion of the second message in step 1320.

The second message may be a CoAP message (e.g., 1700B of FIG. 17B) in one embodiment. As shown in FIG. 17B, CoAP message 1700B may include data associated with a header, where the data associated with the header includes data associated with a version (e.g., "1"), a message type (e.g., "ACK" or acknowledgement), a token length (e.g., "1" associated with a length of 1 byte), a code (e.g., a response code of "Content"), and a message identifier (e.g., "0x7d34"). Data associated with a token (e.g., "0x72") may also be included in CoAP message 1700B.

CoAP message 1700B may include data associated with at least one option. For example, CoAP message 1700B may include data associated with a max-age value (e.g., an option value of "0"). In this case, a max-age value of "0" may be used to indicate that CoAP message 1700B is not to be cached by an intermediary system or device (e.g., situated between the sender of the CoAP message 1700B and the ultimate recipient of the CoAP message 1700B) such as a proxy server or other type of computer system or device.

As another example, CoAP message 1700B may include data associated with a query (e.g., including one or more parameters). An option value of "uid=cs1430" (e.g., associated with a first parameter) may be associated with a unique identifier (e.g., "cs1430") of a sender of CoAP message 1700B (e.g., computer system 1430). An option value of "hs256=1" (e.g., associated with a second parameter) may be associated with an authentication mechanism (e.g., HMAC utilizing a hash function of SHA256) used to generate the authentication data (e.g., "Authentication Data B") included in CoAP message 1700B. An option value of "nonce=1" (e.g., associated with a third parameter) may be associated with a nonce (e.g., with a value of "1") included in CoAP message 1700B.

CoAP message 1700B may include data associated with at least one option length. For example, CoAP message 1700B may include data associated with a first option length (e.g., 1 byte) corresponding to data associated with a first option value (e.g., "0"), a second option length (e.g., 10 bytes) corresponding to data associated with a second option value (e.g., "uid=cs1430"), a third option length (e.g., 7 bytes) corresponding to data associated with a third option value (e.g., "hs256=1"), etc.

As shown in FIG. 17B, CoAP message 1700B may include data associated with at least one option identifier. The at least one option identifier may include data associated with an option number and/or an option delta in one embodiment. For example, CoAP message 1700B may include data associated with a first numerical value (e.g., "14") as a first option identifier corresponding to a first option (e.g., associated with a max-age value), where the first numerical value (e.g., "14") may be the delta or difference between the current option number (e.g., "14") and the option number of the preceding option (e.g., "0" in this case since this is the first option). As such, the first numerical value of "14" may correspond to an option number of "14."

As another example, CoAP message 1700B may include data associated with a second numerical value (e.g., "1") as a second option identifier corresponding to a second option (e.g., associated with a query), where the second numerical value (e.g., "1") may be the delta or difference between the current option number (e.g., "15") and the option number of the preceding option (e.g., "14"). As such, the second numerical value of "1" may correspond to an option number of "15."

As a further example, CoAP message 1700B may include data associated with a third numerical value (e.g., "0") as a third option identifier corresponding to a third option (e.g., associated with a query), where the third numerical value (e.g., "0") may be the delta or difference between the current option number (e.g., "15") and the option number of the preceding option (e.g., "15"). As such, the third numerical value of "0" may correspond to an option number of "15."

As shown in FIG. 17B, CoAP message 1700B may include data associated with a payload marker (e.g., "0xFF"). CoAP message 1700B may include data associated with a payload, where the data associated with a payload may include authentication data (e.g., "Authentication Data B") and/or other data. In one embodiment, the other data may be or include a first data portion associated with a security token (e.g., "First Data Portion Associated With Security Token"), a second data portion including an instance of a session key (e.g., "Second Data Portion Including Instance Of Session Key"), other data, some combination thereof, etc.

CoAP message 1700A and CoAP message 1700B may share a common message identifier (e.g., "0x7d34") in one embodiment. CoAP message 1700A and CoAP message 1700B may share a common token (e.g., "0x72") in one embodiment.

In one embodiment, a message type associated with CoAP message 1700B (e.g., "ACK" or acknowledgement) may correspond to and/or be determined by a message type associated with CoAP message 1700A (e.g., "CON" or confirmable). And in one embodiment, a response code associated with CoAP message 1700B (e.g., "Content") may correspond to and/or be determined by a method code associated with CoAP message 1700A (e.g., "GET"). In this case, CoAP message 1700B may include data (e.g., a first data portion associated with a security token, a second data portion including an instance of a session key, etc.) associated with the request of CoAP message 1700A (e.g., a request for data associated with a security token, data associated with a session key and/or at least one instance thereof, etc.).

Although FIG. 17B shows CoAP message 1700B with a specific number and type of portions, it should be appreciated that CoAP message 1700B may include a different number and/or type of portions in other embodiments. For example, CoAP message 1700B may include fewer portions or at least one additional portion. As another example, a plurality of portions of CoAP message 1700B may be combined into a smaller number of portions. Although FIG. 17B shows CoAP message 1700B with a specific organization of portions, it should be appreciated that CoAP message 1700B may include a different organization of portions in other embodiments.

In one embodiment, data associated with at least one option may be excluded from CoAP message 1700B. For example, data (e.g., associated with a host, a port, a path, a max-age value, or some combination thereof) used by intermediary systems or devices (e.g., situated between the sender of CoAP message 1700B and the ultimate recipient of CoAP message 1700B) such as a proxy server or other type of computer system or device may be excluded in one or more embodiments where intermediary systems or devices do not exist or are unlikely to exist.

Turning back to FIG. 13A, step 1320 may involve formatting at least one data portion (e.g., a first data portion associated with a security token, a second data portion including an instance of a session key, etc.) of the second message in accordance with JSON (JavaScript Object Notation) in one embodiment. Alternatively, at least one data portion (e.g., a first data portion associated with a security token, a second data portion including an instance of a session key, etc.) of the second message may be formatted in step 1320 in accordance with another format (e.g., UTF-8 plain text, link format, XML, octet-stream, etc.). Where the second message is a CoAP message (e.g., 1700B), the second message may include data associated with a content format (e.g., a "Content-Format" option with an option value corresponding to a format of a payload of CoAP message 1700B, a format of a first data portion associated with a security token, a format of a second data portion including an instance of a session key, etc.) in one embodiment.

Figure 20A:
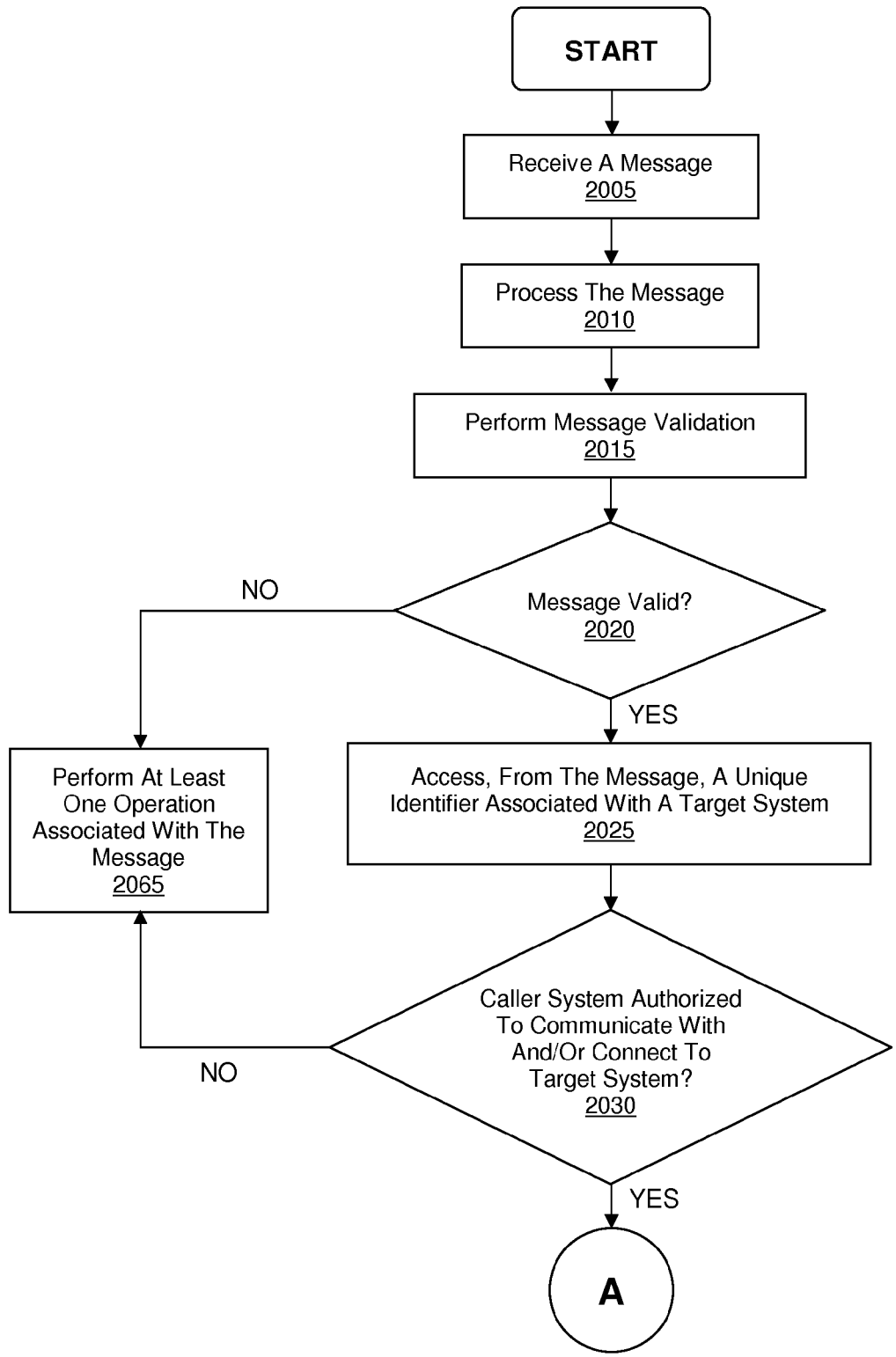
FIG. 20A shows a first portion of a flowchart of a process for performing processing associated with a message in accordance with one embodiment.
Figure 20B:
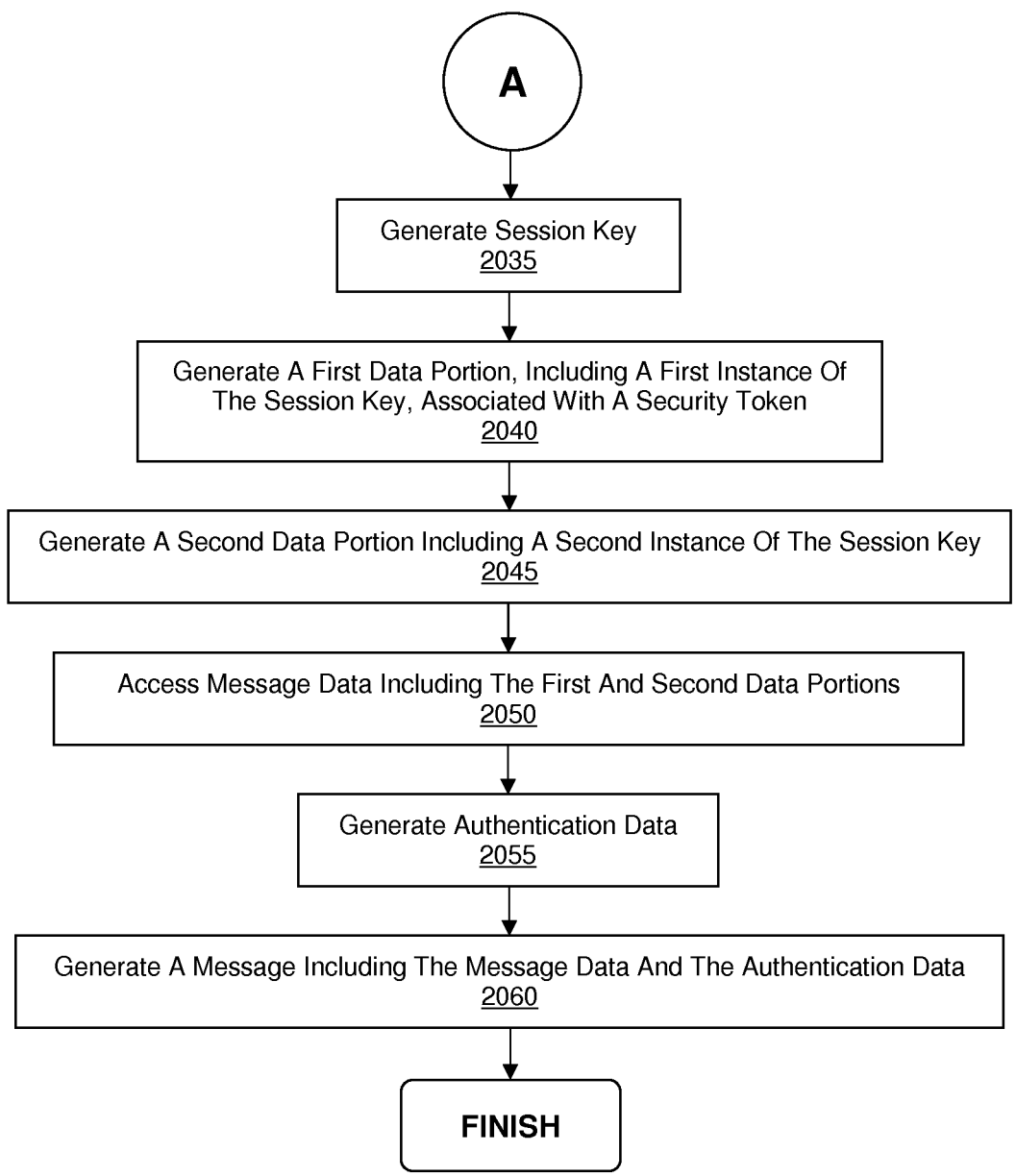
FIG. 20B shows a second portion of a flowchart of a process for performing processing associated with a message in accordance with one embodiment.

Step 1320 may be performed in accordance with one or more steps of process 2000 of FIGS. 20A and 20B in one embodiment. FIGS. 20A and 20B show a flowchart of process 2000 for performing processing associated with a message in accordance with one embodiment. One or more steps of process 2000 may be performed at or by a third computer system (e.g., 1430) in one embodiment.

As shown in FIG. 20A, step 2005 involves receiving a message. In one embodiment, the message received in step 2005 may be the message generated in step 1310, generated in step 1830, communicated in step 1315, some combination thereof, etc. Step 2005 may involve receiving the message at the third computer system (e.g., 1430) from another computer system (e.g., 110, another system or device, etc.) in one embodiment.

In one embodiment, the message may be received in step 2005 over a connection (e.g., 1415). The message may be received in step 2005 as a bit stream or a byte stream in one embodiment. And in one embodiment, step 2005 may involve receiving the message using a communication interface (e.g., 1438).

As shown in FIG. 20A, step 2010 involves processing the message (e.g., received in step 2005). Authentication data may be accessed from the message in step 2010 in one embodiment. A unique identifier associated with the caller system (e.g., the first computer system or computer system 110) may be accessed from the message in step 2010 in one embodiment. In one embodiment, step 2010 may involve processing the message using a security component (e.g., 1432 of computer system 1430). And in one embodiment, where the message is a CoAP message, step 2010 may be performed in accordance with step 650 and/or one or more steps of process 900 of FIG. 9.

Step 2015 involves performing message validation (e.g., with respect to the message received in step 2005). The message validation may be used to verify the authenticity of the sender of the message and/or the integrity of the message. Where the message includes a nonce, the message validation may be used to detect a replay attack.

In one embodiment, message validation may be performed in step 2015 based on authentication data (e.g., accessed from the message in step 2010). And in one embodiment, message validation may be performed in step 2015 using at least one message invalidity condition.

Where message validation is performed based on authentication data, message validation may be performed in step 2015 by comparing second authentication data to the authentication data in one embodiment. For example, the third computer system (e.g., 1430) may generate second authentication data based on at least a portion of the message (e.g., a header, a token, at least one option, a payload marker, a payload, some combination thereof, etc.). The second authentication data may be compared to the authentication data (e.g., included in the message and/or accessed in step 2010) to verify the authenticity of the sender of the message (e.g., the first computer system or computer system 110), verify the integrity of the message, detect and/or act on a replay attack, some combination thereof, etc.

In one embodiment, the second authentication data may be generated in step 2015 using an authentication mechanism such as HMAC, OAuth, OAuth 2.0, OpenID, etc. The second authentication data may be generated in step 2015 using a key in one embodiment. For example, where the authentication mechanism used to generate the second authentication data in step 2015 is HMAC, the second authentication data may be generated by performing a hash function (e.g., MD5, SHA-1, SHA256, SHA512, etc.) on at least a portion of the message (e.g., a header, a token, at least one option, a payload marker, a payload, some combination thereof, etc.) using a key. And in one embodiment, the message may be free of the key used to generate the second authentication data in step 2015.

A key associated with the caller system (e.g., the first computer system or computer system 110) may be used to generate the second authentication data in step 2015 in one embodiment. For example, the key may be a secret key or private key that is unique to the caller system (e.g., the first computer system or computer system 110). The key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the caller system (e.g., the first computer system or computer system 110) may be securely accessed and used by the third computer system (e.g., 1430) to generate the second authentication data in step 2015 in one embodiment.

Where message validation is performed using at least one message invalidity condition, the message may be determined to be invalid in step 2015 if any of the at least one message invalidity condition is triggered in one embodiment. For example, the message may be determined to be invalid in step 2015 responsive to a failure to access a unique identifier associated with the sender of the message (e.g., the first computer system or computer system 110). As another example, the message may be determined to be invalid in step 2015 responsive to a failure to access a nonce from the message. As a further example, the message may be determined to be invalid in step 2015 responsive to determining that a nonce accessed from the message is not different from another nonce accessed from a previous message. As yet another example, the message may be determined to be invalid in step 2015 responsive to determining that a payload of the message is not at least a predetermined size. And as another example, the message may be determined to be invalid in step 2015 responsive to a failure to access a key (e.g., associated with the first computer system or computer system 110) used to generate the second authentication data or otherwise perform the message validation.

The message validation may be performed in step 2015 using a security component (e.g., 1432 of computer system 1430) in one embodiment. And in one embodiment, where the message is a CoAP message, step 2015 may be performed in accordance with step 660, one or more steps of process 1000 of FIG. 10, one or more steps of process 1100 of FIG. 11, some combination thereof, etc.

As shown in FIG. 20A, step 2020 involves determining whether the message (e.g., received in step 2005) is valid (e.g., based on the results of the message validation performed in step 2015). Step 2020 may be performed using a security component (e.g., 1432 of computer system 1430) in one embodiment. If it is determined in step 2020 that the message (e.g., received in step 2005) is valid, then step 2025 may be performed.

Step 2025 involves accessing, from the message, a unique identifier associated with a target system (e.g., the second computer system or computer system 120). Step 2025 may be performed using a security component (e.g., 1432 of computer system 1430) in one embodiment.

As shown in FIG. 20A, step 2030 involves determining whether the caller system is authorized to communicate with and/or connect to the target system. The caller system may be the sender of the message (e.g., the first computer system or computer system 110), and the target system may be the system or device associated with the unique identifier accessed in step 2025 (e.g., the second computer system or computer system 120). In one embodiment, step 2030 may be performed using a security component (e.g., 1432 of computer system 1430).

Determination of whether the caller system is authorized to communicate with and/or connect to the target system may be performed in step 2030 based on permissions configuration data (e.g., 1600 of FIG. 16, generated and/or updated in step 1305, generated and/or updated in step 1540 of process 1500, etc.) in one embodiment. For example, permissions configuration data may be accessed to determine whether the first computer system (e.g., 110) is authorized to communicate with and/or connect to the second computer system (e.g., 120).

In one embodiment, the permissions configuration data may be accessed in step 2030 using a unique identifier associated with the target system (e.g., accessed in step 2025), using a unique identifier associated with the caller system (e.g., accessed from the message in step 2010, in step 2015 as part of message validation, etc.), some combination thereof, etc. And in one embodiment, the permissions configuration data may be stored at the third computer system (e.g., 1430), stored remotely and accessible to the third computer system (e.g., 1430), etc.

If it is determined in step 2030 that the caller system is authorized to communicate with the target system, then step 2035 may be performed. As shown in FIG. 20B, step 2035 involves generating a session key. In one embodiment, step 2035 may involve generating a plurality of instances of the session key.

The session key and/or a plurality of instances thereof may be generated in step 2035 using a security component (e.g., 1432) in one embodiment. In one embodiment, the session key and/or a plurality of instances thereof may be generated in step 2035 based on a random number, pseudo-random number, other data, some combination thereof, etc. And in one embodiment, at least one instance of the session key may be stored at the third computer system (e.g., 1430).

In one embodiment, the session key and/or a plurality of instances thereof may be stored in step 2035. For example, data associated with the session key and/or a plurality of instances thereof (e.g., data 2100 of FIG. 21) may be stored at the third computer system (e.g., 1430).

FIG. 21 shows data 2100 associated with at least one session key in accordance with one embodiment. As shown in FIG. 21, each session key in column 2130 may correspond to respective computer systems associated with respective unique identifiers in columns 2110 and 2120. For example, a first session key (e.g., "Session Key 1") may correspond to a first computer system (e.g., associated with the unique identifier of "cs110" in column 2120) and a second computer system (e.g., associated with the unique identifier of "cs120" in column 2110). As another example, a second session key (e.g., "Session Key 2") may correspond to another computer system (e.g., associated with the unique identifier of "cs130" in column 2120) and the second computer system (e.g., associated with the unique identifier of "cs120" in column 2110).

Each session key in column 2130 may correspond to computer systems (e.g., associated with unique identifiers in columns 2110 and 2120) that are authorized to communicate with and/or connect to one another (e.g., responsive to configuration of permissions in step 1305 of process 1300 and/or one or more steps of process 1500 of FIG. 15) in one embodiment. For example, a first session key (e.g., "Session Key 1") may correspond to a first computer system (e.g., associated with the unique identifier of "cs110" in column 2120) and a second computer system (e.g., associated with the unique identifier of "cs120" in column 2110) that are authorized to communicate with and/or connect to one another (e.g., responsive to configuration of permissions in step 1305 of process 1300 and/or one or more steps of process 1500 of FIG. 15). As another example, a second session key (e.g., "Session Key 2") may correspond to another computer system (e.g., associated with the unique identifier of "cs130" in column 2120) and the second computer system (e.g., associated with the unique identifier of "cs120" in column 2110) that are authorized to communicate with and/or connect to one another (e.g., responsive to configuration of permissions in step 1305 of process 1300 and/or one or more steps of process 1500 of FIG. 15).

In one embodiment, the unique identifiers in column 2110 may be associated with target systems, and the unique identifiers in column 2120 may be associated with caller systems. In this manner, data 2100 may include a correlation or mapping of at least one caller system (e.g., in column 2120) that is authorized to communicate with and/or connect to at least one target system (e.g., in column 2110).

At least a portion of data 2100 may correlate to and/or be the same as permissions configuration data (e.g., 1600 of FIG. 16) in one embodiment. For example, column 2110 may correlate to and/or be the same as column 1610 of permissions configuration data 1600. As another example, column 2120 may correlate to and/or be the same as column 1620 of permissions configuration data 1600. As such, in one embodiment, data of column 2130 may be added to permissions configuration data (e.g., 1600) responsive to generation of and/or updating of a session key (or at least one instance thereof).

In one embodiment, data 2100 may be stored locally at the third computer system (e.g., 1430). For example, data 2100 may be stored locally in a security component (e.g., 1432 of computer system 1430), in a memory (e.g., of computer system 1430), in a database (e.g., of computer system 1430), etc. Alternatively, data 2100 may be stored remotely (e.g., at another system or device) and accessed by the third computer system (e.g., 1430) in a secure manner in one embodiment. Accordingly, a session key and/or at least one instance thereof may be securely accessed (e.g., from or using data 2100) and included in at least one portion (e.g., a first data portion associated with a security token, a second data portion including an instance of a session key, etc.) of a message (e.g., the second message generated in step 2060 of process 2000).

Data 2100 may be changed or updated in one embodiment. For example, data 2100 may be changed or updated based on expiration data (e.g., associated with portion 1930 of data portion 1900) such as a timestamp (e.g., associated with creation of the security token and/or session key), a duration or lifetime (e.g., of the security token and/or session key), etc. In this case, a portion of data 2100 associated with at least one session key may be removed from data 2100 and/or updated (e.g., with new data corresponding to at least one new session key) responsive to expiration of the security token and/or the at least one session key.

Although FIG. 21 shows data 2100 as including a particular amount of data, it should be appreciated that a different amount of data may be included in data 2100 in other embodiments. Additionally, although FIG. 21 shows data 2100 as including a particular arrangement and type of data, it should be appreciated that a different arrangement and/or type of data may be included in data 2100 in other embodiments.

Turning back to FIG. 20B, step 2040 involves generating a first data portion, including a first instance of the session key, associated with a security token. In one embodiment, step 2040 may be performed using a security component (e.g., 1432) alone or in combination with at least one other component (e.g., message generation component 1434, etc.).

In one embodiment, the first data portion generated in step 2040 may include one or more portions of data portion 1900. For example, the first data portion may include a plurality of portions of data portion 1900 (e.g., portion 1940 associated with an instance of the session key and at least one other portion such as portion 1910 associated with a unique identifier of a caller system, portion 1920 associated with a unique identifier of a target system, portion 1930 associated with expiration data, some combination thereof, etc.). As another example, the first data portion may include only one portion of data portion 1900 (e.g., portion 1940 associated with an instance of the session key).

The first data portion may include the first instance of the session key as part of the security token in one embodiment. Alternatively, the first data portion may include the first instance of the session key separate from the security token.

In one embodiment, a key associated with the target system (e.g., the second computer system or computer system 120) may be used to encrypt the data to generate the first data portion in step 2040. For example, the key may be a secret key or private key that is unique to the target system (e.g., the second computer system or computer system 120). In one embodiment, the first data portion may be generated by encrypting the data in step 2040 using AES, Blowfish, RC4, the Extended Tiny Encryption Algorithm (XTEA) scheme, another symmetric-key algorithm, etc.

Where a key is used to encrypt the data to generate the first data portion, the key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the target system (e.g., the second computer system or computer system 120) may be securely accessed and used by the third computer system (e.g., 1430) to encrypt data to generate the first data portion in step 2040 in one embodiment.

As shown in FIG. 20B, step 2045 involves generating a second data portion including a second instance of the session key. In one embodiment, step 2045 may be performed using a security component (e.g., 1432) alone or in combination with at least one other component (e.g., message generation component 1434, etc.).

Step 2045 may involve encrypting data to generate the second data portion in one embodiment. The data may include a second instance of the session key.

In one embodiment, a key associated with the caller system (e.g., the first computer system or computer system 110) may be used to encrypt the data to generate the second data portion in step 2045. For example, the key may be a secret key or private key that is unique to the caller system (e.g., the first computer system or computer system 110). In one embodiment, the second data portion may be generated by encrypting the data in step 2045 using AES, Blowfish, RC4, the Extended Tiny Encryption Algorithm (XTEA) scheme, another symmetric-key algorithm, etc.

Where a key is used to encrypt the data to generate the second data portion, the key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the caller system (e.g., the first computer system or computer system 110) may be securely accessed and used by the third computer system (e.g., 1430) to encrypt data to generate the second data portion in step 2045 in one embodiment.

As shown in FIG. 20B, step 2050 involves accessing message data including the first data portion (e.g., generated in step 2040) and the second data portion (e.g., generated in step 2045). In one embodiment, step 2050 may be performed using a message generation component (e.g., 1434).

In one embodiment, the message data accessed in step 2050 may include data other than authentication data. For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), data other than the authentication data (e.g., "Authentication Data B" of CoAP message 1700B), some combination thereof, etc.

As shown in FIG. 20B, step 2055 involves generating authentication data. In one embodiment, step 2055 may be performed using a security component (e.g., 1432 of computer system 1430).

In one embodiment, the authentication data may be generated in step 2055 using an authentication mechanism such as HMAC, OAuth, OAuth 2.0, OpenID, etc. The authentication data may be generated in step 2055 using a key in one embodiment. For example, where the authentication mechanism used to generate the authentication data in step 2055 is HMAC, the authentication data may be generated by performing a hash function (e.g., MD5, SHA-1, SHA256, SHA512, etc.) on message data (e.g., accessed in step 2050) using a key. And in one embodiment, the message data may be free of the key used to generate the authentication data in step 2055.

A key associated with the caller system (e.g., the first computer system or computer system 110) may be used to generate the authentication data in step 2055 in one embodiment. For example, the key may be a secret key or private key that is unique to the caller system (e.g., the first computer system or computer system 110). The key may be stored locally at the third computer system (e.g., 1430) in one embodiment. For example, the key may be stored locally in a security component (e.g., 1432 of computer system 1430), in a memory (e.g., of computer system 1430), in a database (e.g., of computer system 1430), etc. Alternatively, the key may be stored remotely (e.g., at another system or device) and accessed by the third computer system (e.g., 1430) in a secure manner in one embodiment. Accordingly, a key associated with the caller system (e.g., the first computer system or computer system 110) may be securely accessed and used by the third computer system (e.g., 1430) to generate the authentication data in step 2055 in one embodiment.

As shown in FIG. 20B, step 2060 involves generating a message including the message data (e.g., accessed in step 2050) and the authentication data (e.g., generated in step 2055). In one embodiment, step 2060 may be performed using a message generation component (e.g., 1434 of computer system 1430).

In one embodiment, where the message generated in step 2060 is a CoAP message (e.g., 1700B), step 2060 may involve formatting the message data (e.g., accessed in step 2050) in accordance with CoAP (e.g., into one or more portions of CoAP message 200). The authentication data (e.g., generated in step 2055) may be included in or as the payload (e.g., associated with portion 250 of CoAP message 200) of the CoAP message in one embodiment. For example, as shown in FIG. 17B, authentication data (e.g., "Authentication Data B") may be included in or as the payload of CoAP message 1700B.

The first data portion (e.g., generated in step 2040) and/or the second data portion (e.g., generated in step 2045) may be included in or as the payload of the message (e.g., generated in step 2060) in one embodiment. For example, as shown in FIG. 17B, the first data portion (e.g., "First Data Portion Associated With Security Token") and/or the second data portion (e.g., "Second Data Portion Including Instance Of Session Key") may be included in or as the payload of CoAP message 1700B in step 2060. And in one embodiment, the first data portion and/or the second data portion may be included in or as another portion of the message in step 2060.

Step 2060 may involve generating a bit stream or byte stream including the message data (e.g., accessed in step 2050) and the authentication data (e.g., generated in step 2055) in one embodiment. The bit stream or byte stream may be formatted in accordance with CoAP in one embodiment.

In one embodiment, step 2060 may involve formatting at least one data portion (e.g., a first data portion associated with a security token, a second data portion including an instance of a session key, etc.) of the message in accordance with JSON (JavaScript Object Notation). Alternatively, at least one data portion (e.g., a first data portion associated with a security token, a second data portion including an instance of a session key, etc.) of the message may be formatted in step 2060 in accordance with another format (e.g., UTF-8 plain text, link format, XML, octet-stream, etc.). Where the message generated in step 2060 is a CoAP message (e.g., 1700B), the message may include data associated with a content format (e.g., a "Content-Format" option with an option value corresponding to a format of a payload of CoAP message 1700B, a format of a first data portion associated with a security token, a format of a second data portion including an instance of a session key, etc.) in one embodiment.

Turning back to FIG. 20A, step 2065 involves performing at least one operation associated with the message. In one embodiment, the at least one operation may be performed in step 2065 if the message (e.g., received in step 2005) is determined to be invalid in step 2020. And in one embodiment, the at least one operation may be performed in step 2065 if it is determined that the caller system (e.g., the first computer system or computer system 110) is not authorized to communicate with and/or connect to the target system (e.g., the second computer system or computer system 120) in step 2030. And in one embodiment, step 2065 may involve performing at least one operation using an operation component (e.g., 1436 of computer system 1430).

In one embodiment, step 2065 may involve acting responsive to a message validation failure such as a triggering of a message invalidity condition (e.g., corresponding to one or more steps of process 1100, a failure to access a unique identifier associated with the sender of the message, a failure to access a nonce from the message, determining that a nonce accessed from the message is not different from another nonce accessed from a previous message, determining that a payload of the message is not at least a predetermined size, a failure to access a key used to generate the second authentication data or otherwise perform the message validation, some combination thereof, etc.), another message validation failure (e.g., determining that the second authentication data generated based on at least a portion of the message does not correlate to authentication data accessed from the message, another message validation failure, etc.), etc. And in one embodiment, step 2065 may involve acting on a suspected or detected replay attack.

The at least one operation performed in step 2065 may include ignoring the message (e.g., received in step 2005) in one embodiment. For example, another message may not be generated and/or communicated in reply to the message (e.g., received in step 2005) in step 2065. As another example, no further processing related to the message (e.g., received in step 2005) may be performed in step 2065. And in one embodiment, the at least one operation performed in step 2065 may include limiting access to the recipient (e.g., the third computer system or computer system 1430) of the sender (e.g., the first computer system or computer system 110).

Although FIGS. 20A and 20B depict process 2000 as including a specific number of steps, it should be appreciated that process 2000 may include a different number of steps in other embodiments. Although FIGS. 20A and 20B depict process 2000 as including a specific ordering of steps, it should be appreciated that process 2000 may include a different ordering of steps in other embodiments. For example, steps 2015 and 2020 may be performed after steps 2025 and 2030 in one embodiment.

Turning back to FIG. 13A, step 1325 involves communicating the second message (e.g., generated in step 1320 and/or in accordance with one or more steps of process 2000 of FIGS. 20A and 20B) from the third computer system (e.g., 1430) to the first computer system (e.g., 110). In one embodiment, the second message may be communicated in step 1325 over a connection (e.g., 1415 between computer system 1430 and computer system 110). The second message may be communicated in step 1325 as a bit stream or a byte stream in one embodiment. And in one embodiment, step 1325 may involve communicating the second message using at least one communication interface (e.g., 1438 of computer system 1430, 118 of computer system 110, etc.).

In one embodiment, step 1325 may involve communicating the second message using DTLS. For example, where the second message is a CoAP message (e.g., 1700B), step 1325 may involve communicating the second message over CoAP using DTLS.

As shown in FIG. 13A, step 1330 involves performing second processing associated with the second message, and responsive thereto, accessing an instance of the session key from the second message. In one embodiment, step 1330 may involve performing the second processing associated with the second message at the first computer system (e.g., 110). For example, responsive to receiving the second message (e.g., generated in step 1320 and communicated in step 1325), the first computer system (e.g., 110) may perform the second processing. And in one embodiment, the second processing may be performed using a security component (e.g., 112).

The second processing may involve performing message validation with respect to the second message in one embodiment. Message validation may be performed in step 1330 based on authentication data accessed from the second message in one embodiment. For example, the first computer system (e.g., 110) may generate second authentication data based on at least a portion of the second message (e.g., a header, a token, at least one option, a payload marker, a payload, the first data portion associated with a security token, the second data portion including an instance of a session key, some combination thereof, etc.). The second authentication data may be compared to the authentication data (e.g., included in the second message) to verify the authenticity of the third computer system (e.g., 1430), verify the integrity of the second message, detect and/or act on a replay attack, some combination thereof, etc.

In one embodiment, the second authentication data may be generated in step 1330 using an authentication mechanism such as HMAC, OAuth, OAuth 2.0, OpenID, etc. The second authentication data may be generated in step 1330 using a key in one embodiment. For example, where the authentication mechanism used to generate the second authentication data in step 1330 is HMAC, the second authentication data may be generated by performing a hash function (e.g., MD5, SHA-1, SHA256, SHA512, etc.) on at least a portion of the second message (e.g., a header, a token, at least one option, a payload marker, a payload, the first data portion associated with a security token, the second data portion including an instance of a session key, some combination thereof, etc.) using a key. And in one embodiment, the second message may be free of the key used to generate the second authentication data in step 1330.

A key associated with the first computer system (e.g., 110) may be used to generate the second authentication data in step 1330 in one embodiment. For example, the key may be a secret key or private key that is unique to the first computer system (e.g., 110). The key may be stored locally at the first computer system (e.g., 110) in one embodiment. For example, the key may be stored locally in a security component (e.g., 112 of computer system 110), in a memory (e.g., of computer system 110), in a database (e.g., of computer system 110), etc. Alternatively, the key may be stored remotely (e.g., at another system or device) and accessed by the first computer system (e.g., 110) in a secure manner in one embodiment. Accordingly, a key associated with the first computer system (e.g., 110) may be securely accessed and used by the first computer system (e.g., 110) to generate the second authentication data in step 1330 in one embodiment.

In one embodiment, the session key (or an instance thereof) may be accessed from the second message in step 1330 based on the results of the second processing. For example, where the second processing includes performing message validation, the session key (or an instance thereof) may be accessed in step 1330 if the second message is valid. In one embodiment, the session key (or an instance thereof) may be accessed in step 1330 from the second data portion (e.g., including an instance of the session key, generated in step 1320, generated in step 2045, some combination thereof, etc.) of the second message.

Accessing the instance of the session key in step 1330 may involve decrypting the second data portion (e.g., including an instance of the session key, generated in step 1320, generated in step 2045, some combination thereof, etc.) of the second message in one embodiment. The second data portion of the second message may be decrypted in step 1330 using AES, Blowfish, RC4, the Extended Tiny Encryption Algorithm (XTEA) scheme, another symmetric-key algorithm, etc.

In one embodiment, a key associated with the first computer system (e.g., 110) may be used to decrypt the second data portion (e.g., including an instance of the session key, generated in step 1320, generated in step 2045, some combination thereof, etc.) of the second message in step 1330. The key may be a secret key or private key that is unique to the first computer system (e.g., 110) in one embodiment. The key may be stored locally at the first computer system (e.g., 110) in one embodiment. For example, the key may be stored locally in a security component (e.g., 112 of computer system 110), in a memory (e.g., of computer system 110), in a database (e.g., of computer system 110), etc. Alternatively, the key may be stored remotely (e.g., at another system or device) and accessed by the first computer system (e.g., 110) in a secure manner in one embodiment. Accordingly, in one embodiment, a key associated with the first computer system (e.g., 110) may be securely accessed and used by the first computer system (e.g., 110) to decrypt the second data portion to access an instance of the session key in step 1330.

The key used to decrypt (e.g., in step 1330) the second data portion of the second message at the first computer system (e.g., 110) may be the same key used to encrypt (e.g., in step 1320, in step 2045, etc.) data to form the second data portion at the third computer system (e.g., 1430) in one embodiment. For example, where a key associated with the first computer system (e.g., a secret key or private key that is unique to the first computer system) is used by the third computer system to encrypt the data to form the second data portion of the second message (e.g., in step 1320, in step 2045, etc.), the same key associated with the first computer system may be used by the first computer system to decrypt the second data portion (e.g., in step 1330). In this manner, a symmetric-key algorithm may be used to secure a session key (or at least one instance thereof) communicated using one or more messages.

Figure 22:
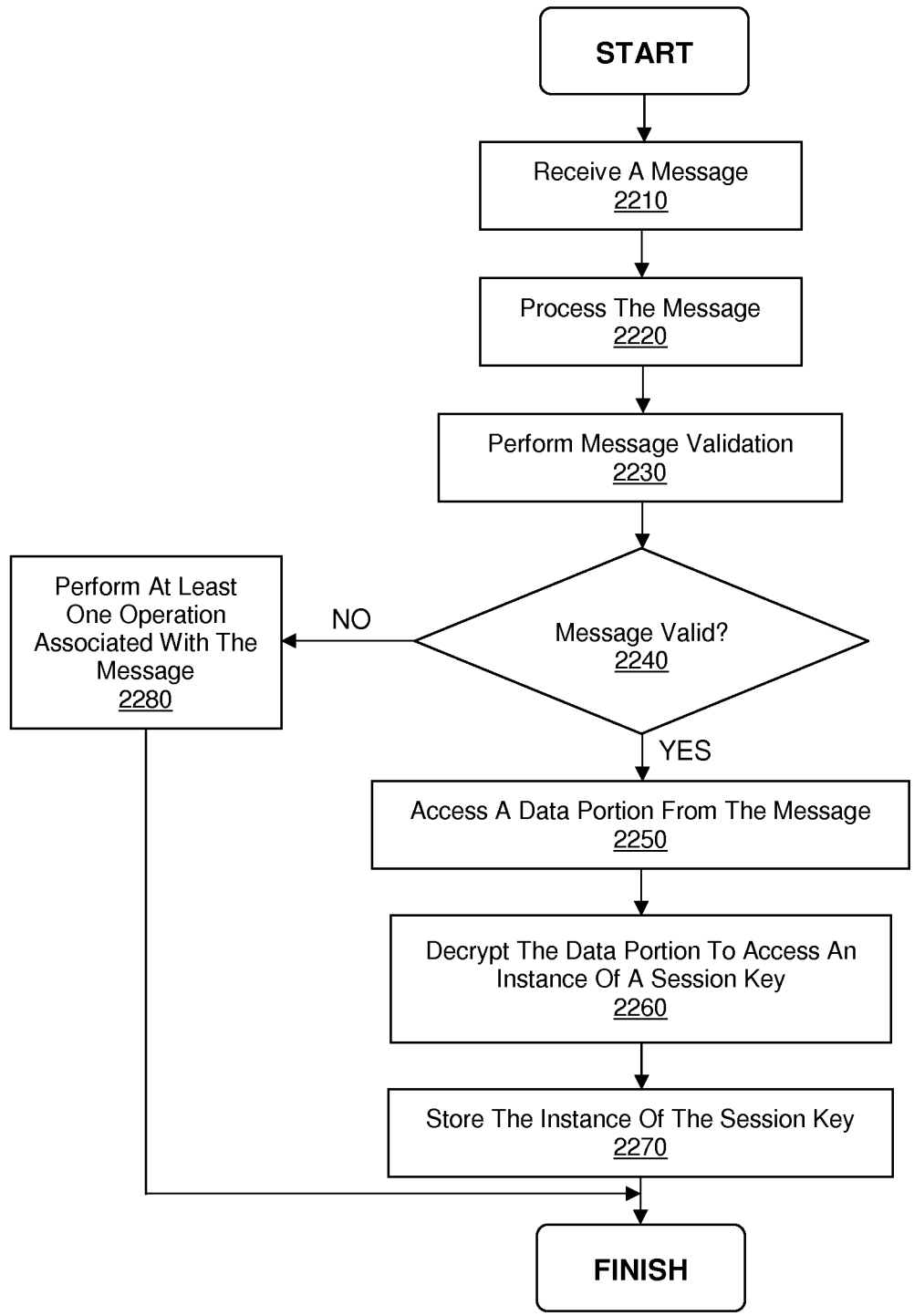
FIG. 22 shows a flowchart of a process for performing processing associated with a message in accordance with one embodiment.

In one embodiment, step 1330 may be performed in accordance with one or more steps of process 2200 of FIG. 22. FIG. 22 shows a flowchart of process 2200 for performing processing associated with a message in accordance with one embodiment. One or more steps of process 2200 may be performed at or by a caller system (e.g., the first computer system or computer system 110) in one embodiment.

As shown in FIG. 22, step 2210 involves receiving a message. In one embodiment, the message received in step 2210 may be the message generated in step 1320, generated in step 2060, communicated in step 1325, some combination thereof, etc. Step 2210 may involve receiving the message at the caller system (e.g., the first computer system or computer system 110) from another computer system (e.g., 1430, another system or device, etc.) in one embodiment.

In one embodiment, the message may be received in step 2210 over a connection (e.g., 1415). The message may be received in step 2210 as a bit stream or a byte stream in one embodiment. And in one embodiment, step 2210 may involve receiving the message using a communication interface (e.g., 118).

As shown in FIG. 22, step 2220 involves processing the message (e.g., received in step 2210). Authentication data may be accessed from the message in step 2220 in one embodiment. In one embodiment, step 2220 may involve processing the message using a security component (e.g., 112 of computer system 110). And in one embodiment, where the message is a CoAP message, step 2220 may be performed in accordance with step 650 and/or one or more steps of process 900 of FIG. 9.

Step 2230 involves performing message validation (e.g., with respect to the message received in step 2210). The message validation may be used to verify the authenticity of the sender of the message and/or the integrity of the message. Where the message includes a nonce, the message validation may be used to detect a replay attack.

In one embodiment, message validation may be performed in step 2230 based on authentication data (e.g., accessed from the message in step 2220). And in one embodiment, message validation may be performed in step 2230 using at least one message invalidity condition.

Where message validation is performed based on authentication data, message validation may be performed in step 2230 by comparing second authentication data to the authentication data in one embodiment. For example, the caller system (e.g., the first computer system or computer system 110) may generate second authentication data based on at least a portion of the message (e.g., a header, a token, at least one option, a payload marker, a payload, a first data portion associated with a security token, a second data portion including an instance of a session key, some combination thereof, etc.). The second authentication data may be compared to the authentication data (e.g., included in the message and/or accessed in step 2220) to verify the authenticity of the sender of the message (e.g., the third computer system or computer system 1430), verify the integrity of the message, detect and/or act on a replay attack, some combination thereof, etc.

In one embodiment, the second authentication data may be generated in step 2230 using an authentication mechanism such as HMAC, OAuth, OAuth 2.0, OpenID, etc. The second authentication data may be generated in step 2230 using a key in one embodiment. For example, where the authentication mechanism used to generate the second authentication data in step 2230 is HMAC, the second authentication data may be generated by performing a hash function (e.g., MD5, SHA-1, SHA256, SHA512, etc.) on at least a portion of the message (e.g., a header, a token, at least one option, a payload marker, a payload, a first data portion associated with a security token, a second data portion including an instance of a session key, some combination thereof, etc.) using a key. And in one embodiment, the message may be free of the key used to generate the second authentication data in step 2230.

A key associated with the caller system (e.g., the first computer system or computer system 110) may be used to generate the second authentication data in step 2230 in one embodiment. For example, the key may be a secret key or private key that is unique to the caller system (e.g., the first computer system or computer system 110). The key may be stored locally at the first computer system (e.g., 110) in one embodiment. For example, the key may be stored locally in a security component (e.g., 112 of computer system 110), in a memory (e.g., of computer system 110), in a database (e.g., of computer system 110), etc. Alternatively, the key may be stored remotely (e.g., at another system or device) and accessed by the first computer system (e.g., 110) in a secure manner in one embodiment. Accordingly, a key associated with the caller system (e.g., the first computer system or computer system 110) may be securely accessed and used by the caller system to generate the second authentication data in step 2230 in one embodiment.

Where message validation is performed using at least one message invalidity condition, the message may be determined to be invalid in step 2230 if any of the at least one message invalidity condition is triggered in one embodiment. For example, the message may be determined to be invalid in step 2230 responsive to a failure to access a unique identifier associated with the sender of the message (e.g., the third computer system or computer system 1430). As another example, the message may be determined to be invalid in step 2230 responsive to a failure to access a nonce from the message. As a further example, the message may be determined to be invalid in step 2230 responsive to determining that a nonce accessed from the message is not different from another nonce accessed from a previous message. As yet another example, the message may be determined to be invalid in step 2230 responsive to determining that a payload of the message is not at least a predetermined size. And as another example, the message may be determined to be invalid in step 2230 responsive to a failure to access a key (e.g., associated with the caller system) used to generate the second authentication data or otherwise perform the message validation.

The message validation may be performed in step 2230 using a security component (e.g., 112 of computer system 110) in one embodiment. And in one embodiment, where the message is a CoAP message, step 2230 may be performed in accordance with step 660, one or more steps of process 1000 of FIG. 10, one or more steps of process 1100 of FIG. 11, some combination thereof, etc.

As shown in FIG. 22, step 2240 involves determining whether the message (e.g., received in step 2210) is valid (e.g., based on the results of the message validation performed in step 2230). Step 2240 may be performed using a security component (e.g., 112 of computer system 110) in one embodiment. If it is determined in step 2240 that the message (e.g., received in step 2210) is valid, then step 2250 may be performed.

Step 2250 involves accessing a data portion from the message (e.g., received in step 2210). The data portion may include an instance of a session key. For example, the data portion accessed in step 2250 may be or include the second data portion generated in step 1320 and/or step 2045. And in one embodiment, the data portion accessed in step 2250 may be encrypted (e.g., ciphertext).

As shown in FIG. 22, step 2260 involves decrypting the data portion (e.g., accessed in step 2250) to access an instance of a session key. Decryption of the data portion in step 2260 may involve generating a plaintext version or unencrypted version of the data portion, where the plaintext version or unencrypted version of the data portion may include the instance of the session key. Step 2260 may be performed using a security component (e.g., 112 of computer system 110) in one embodiment. The data portion may be decrypted in step 2260 using AES, Blowfish, RC4, the Extended Tiny Encryption Algorithm (XTEA) scheme, another symmetric-key algorithm, etc.

In one embodiment, the data portion (e.g., accessed in step 2250) may be decrypted in step 2260 using a key associated with the caller system (e.g., the first computer system or computer system 110). The key may be a secret key or private key that is unique to the first computer system (e.g., 110) in one embodiment. The key may be stored locally at the first computer system (e.g., 110) in one embodiment. For example, the key may be stored locally in a security component (e.g., 112 of computer system 110), in a memory (e.g., of computer system 110), in a database (e.g., of computer system 110), etc. Alternatively, the key may be stored remotely (e.g., at another system or device) and accessed by the first computer system (e.g., 110) in a secure manner in one embodiment. Accordingly, a key associated with the caller system (e.g., the first computer system or computer system 110) may be securely accessed and used by the caller system in step 2260 to decrypt the data portion (e.g., accessed in step 2250) to access the instance of the session key in one embodiment.

As shown in FIG. 22, step 2070 involves storing the instance of the session key (e.g., accessed in step 2260). In one embodiment, the instance of the session key may be stored locally at a caller system (e.g., the first computer system or computer system 110) in step 2070. For example, the instance of the session key may be stored locally in a security component (e.g., 112 of computer system 110), in a memory (e.g., of computer system 110), in a database (e.g., of computer system 110), etc. Alternatively, the instance of the session key may be stored remotely (e.g., at another system or device) in step 2070 such that the instance of the session key may be accessed by a caller system (e.g., the first computer system or computer system 110) in a secure manner in one embodiment. And in one embodiment, the instance of the session key may be stored in step 2070 as data 2300 of FIG. 23.

FIG. 23 shows data 2300 associated with at least one session key accessible to a caller system (e.g., the first computer system or computer system 110) in accordance with one embodiment. As shown in FIG. 23, each unique identifier in column 2310 may be associated with a respective target system that the caller system is authorized to communicate with and/or connect to (e.g., responsive to configuration of permissions in step 1305 of process 1300 and/or one or more steps of process 1500 of FIG. 15). Each unique identifier (e.g., associated with a respective target system) in column 2310 may correspond to a respective key in column 2320, where each key in column 2320 may be a session key and/or an instance of a session key (e.g., associated with communication between the caller system and a respective target system). As such, a first key (e.g., "Session Key 1") may be associated with communication between the caller system and a first target system (e.g., associated with the unique identifier of "cs120"), a second key (e.g., "Session Key 4") may be associated with communication between the caller system and a second target system (e.g., associated with the unique identifier of "cs150"), etc.

At least a portion of data 2300 may correlate to and/or be the same as permissions configuration data (e.g., 1600 of FIG. 16) in one embodiment. For example, the first row of column 2310 of data 2300 may correlate to and/or be the same as the first row of permissions configuration data 1600 (e.g., including the unique identifier of "cs120" in column 1610 and the unique identifier of "cs110" in column 1620). As another example, the second row of column 2310 of data 2300 may correlate to and/or be the same as the fourth row of permissions configuration data 1600 (e.g., including the unique identifier of "cs150" in column 1610 and the unique identifier of "cs 110" in column 1620). And as yet another example, the third row of column 2310 of data 2300 may correlate to and/or be the same as the sixth row of permissions configuration data 1600 (e.g., including the unique identifier of "cs170" in column 1610 and the unique identifier of "cs110" in column 1620).

In one embodiment, data 2300 may be stored locally at a caller system (e.g., the first computer system or computer system 110). For example, data 2300 may be stored locally in a security component (e.g., 112 of computer system 110), in a memory (e.g., of computer system 110), in a database (e.g., of computer system 110), etc. Alternatively, data 2300 may be stored remotely (e.g., at another system or device) and accessed by a caller system (e.g., the first computer system or computer system 110) in a secure manner in one embodiment.

Data 2300 may be changed or updated in one embodiment. For example, data 2300 may be changed or updated based on expiration data (e.g., associated with portion 1930 of data portion 1900) such as a timestamp (e.g., associated with creation of the security token and/or session key), a duration or lifetime (e.g., of the security token and/or session key), etc. In this case, a portion of data 2300 associated with at least one session key may be removed from data 2300 and/or updated (e.g., with new data corresponding to at least one new session key) responsive to expiration of the security token and/or the at least one session key.

Although FIG. 23 shows data 2300 as including a particular amount of data, it should be appreciated that a different amount of data may be included in data 2300 in other embodiments. Additionally, although FIG. 23 shows data 2300 as including a particular arrangement and type of data, it should be appreciated that a different arrangement and/or type of data may be included in data 2300 in other embodiments.

Turning back to FIG. 22, step 2280 involves performing at least one operation associated with the message. In one embodiment, step 2280 may be performed if the message (e.g., received in step 2210) is determined to be invalid in step 2240. And in one embodiment, step 2280 may involve performing at least one operation using an operation component (e.g., 116 of computer system 110).

In one embodiment, step 2280 may involve acting responsive to a message validation failure such as a triggering of a message invalidity condition (e.g., corresponding to one or more steps of process 1100, a failure to access a unique identifier associated with the sender of the message, a failure to access a nonce from the message, determining that a nonce accessed from the message is not different from another nonce accessed from a previous message, determining that a payload of the message is not at least a predetermined size, a failure to access a key used to generate the second authentication data or otherwise perform the message validation, some combination thereof, etc.), another message validation failure (e.g., determining that the second authentication data generated based on at least a portion of the message does not correlate to authentication data accessed from the message, another message validation failure, etc.), etc. And in one embodiment, step 2280 may involve acting on a suspected or detected replay attack.

The at least one operation performed in step 2280 may include ignoring the message (e.g., received in step 2210) in one embodiment. For example, another message may not be generated and/or communicated in reply to the message (e.g., received in step 2210) in step 2280. As another example, no further processing related to the message (e.g., received in step 2210) may be performed in step 2280. And in one embodiment, the at least one operation performed in step 2280 may include limiting access to the recipient (e.g., the first computer system or computer system 110) of the sender (e.g., the third computer system or computer system 1430).

Although FIG. 22 depicts process 2200 as including a specific number of steps, it should be appreciated that process 2200 may include a different number of steps in other embodiments. Although FIG. 22 depicts process 2200 as including a specific ordering of steps, it should be appreciated that process 2200 may include a different ordering of steps in other embodiments.

Turning back to FIG. 13A, step 1335 involves generating, at the first computer system (e.g., 110), a third message including the first data portion (e.g., associated with a security token, including an instance of the session key, including at least a portion of data portion 1900, generated in step 1320, generated in step 2040, some combination thereof, etc.). In one embodiment, the third message may be generated using a message generation component (e.g., 114) alone or in combination with at least one other component (e.g., security component 112, etc.).

In one embodiment, the third message may be generated (e.g., in step 1335) without decrypting the first data portion. For example, the first data portion may be accessed from the second message as ciphertext and included in the third message (e.g., as ciphertext) without decryption of the first data portion (e.g., at the first computer system).

The third message may be generated in step 1335 based on the results of the second processing (e.g., performed in step 1330) in one embodiment. For example, if the second message is valid, then the third message may be generated in step 1335.

In one embodiment, the first data portion may be included in or as the payload of the third message in step 1335. And in one embodiment, the first data portion may be included in or as another portion of the third message in step 1335.

Step 1335 may involve generating authentication data to be included in the third message in one embodiment. The authentication data may be generated in step 1335 at the first computer system (e.g., 110) in one embodiment. And in one embodiment, the authentication data may be generated in step 1335 using a security component (e.g., 112 of computer system 110).

In one embodiment, the authentication data may be generated in step 1335 using an authentication mechanism such as HMAC, OAuth, OAuth 2.0, OpenID, etc. The authentication data may be generated in step 1335 using a key in one embodiment. For example, where the authentication mechanism used to generate the authentication data in step 1335 is HMAC, the authentication data may be generated by performing a hash function (e.g., MD5, SHA-1, SHA256, SHA512, etc.) on message data (e.g., a header, a token, at least one option, a payload marker, a payload, the first data portion associated with a security token, some combination thereof, etc.) using a key. And in one embodiment, the message data may be free of the key used to generate the authentication data in step 1335.

An instance of the session key (e.g., accessed and/or stored in step 1330, accessed in step 2260, stored in step 2270, etc.) may be used to generate the authentication data in step 1335 in one embodiment. The instance of the session key may be stored locally at the first computer system (e.g., 110) in one embodiment. For example, the instance of the session key may be stored locally in a security component (e.g., 112 of computer system 110), in a memory (e.g., of computer system 110), in a database (e.g., of computer system 110), etc. Alternatively, the instance of the session key may be stored remotely (e.g., at another system or device) and accessed by the first computer system (e.g., 110) in a secure manner in one embodiment. Accordingly, an instance of the session key may be securely accessed and used by the first computer system (e.g., 110) to generate the authentication data in step 1335 in one embodiment.

In one embodiment, the authentication data may be included in or as the payload of the third message in step 1335. And in one embodiment, the authentication data may be included in or as another portion of the third message in step 1335.

The third message may be a CoAP message (e.g., 2400A of FIG. 24A) in one embodiment. As shown in FIG. 24A, CoAP message 2400A may include data associated with a header, where the data associated with the header includes data associated with a version (e.g., "1"), a message type (e.g., "CON" or confirmable), a token length (e.g., "1" associated with a length of 1 byte), a code (e.g., a method code of "GET"), and a message identifier (e.g., "0x7a10"). Data associated with a token (e.g., "0x73") may also be included in CoAP message 2400A.

CoAP message 2400A may include data associated with at least one option. For example, CoAP message 2400A may include data associated with a host (e.g., an option value of "www.example.com"), data associated with a port (e.g., an option value of "5683"), data associated with a path (e.g., an option value of "keytransfer"), some combination thereof, etc. In this case, at least one option associated with CoAP message 2400A may correspond to a URI of "coap://www.example.com:5683/keytransfer", "coap://www.example.com/keytransfer", "coaps://www.example.com:5683/keytransfer", "coaps://www.example.com/keytransfer", some combination thereof, etc.

The URI corresponding to at least one option associated with CoAP message 2400A may be specific or unique to a target system (e.g., the second computer system or computer system 120) in one embodiment. And in one embodiment, at least one option (e.g., corresponding to an option value of "keytransfer", corresponding to at least one other option value, etc.) associated with CoAP message 2400A may be specific or unique to a target system (e.g., the second computer system or computer system 120).

As another example, CoAP message 2400A may include data associated with a max-age value (e.g., an option value of "0"). In this case, a max-age value of "0" may be used to indicate that CoAP message 2400A is not to be cached by an intermediary system or device (e.g., situated between the sender of the CoAP message 2400A and the ultimate recipient of the CoAP message 2400A) such as a proxy server or other type of computer system or device.

As a further example, CoAP message 2400A may include data associated with a query (e.g., including one or more parameters). An option value of "uid=cs110" (e.g., associated with a first parameter) may be associated with a unique identifier (e.g., "cs110") of a sender of CoAP message 2400A and/or a caller system (e.g., the first computer system or computer system 110). An option value of "hs256=1" (e.g., associated with a second parameter) may be associated with an authentication mechanism (e.g., HMAC utilizing a hash function of SHA256) used to generate the authentication data (e.g., "Authentication Data C") included in CoAP message 2400A. An option value of "nonce=1" (e.g., associated with a third parameter) may be associated with a nonce (e.g., with a value of "1") included in CoAP message 2400A.

In one embodiment, one or more portions of CoAP message 2400A may be associated with a URI including at least one parameter of a query. For example, CoAP message 2400A may be associated with a URI of "coap://www.example.com:5683/keytransfer?uid=cs110&hs256=1&nonce=1", "coap://www.example.com/keytransfer?uid=cs110&hs256=1&nonce=1", "coaps://www.example.com:5683/keytransfer?uid=cs110&hs256=1nonce=1", "coaps:// www.example.com/keytransfer?uid=cs110&ths256=1&nonce=1", some combination thereof, etc.

CoAP message 2400A may include data associated with at least one option length. For example, CoAP message 2400A may include data associated with a first option length (e.g., 15 bytes) corresponding to data associated with a first option value (e.g., "www.example.com"), a second option length (e.g., 2 bytes) corresponding to data associated with a second option value (e.g., "5683"), a third option length (e.g., 11 bytes) corresponding to data associated with a third option value (e.g., "keytransfer"), etc.

As shown in FIG. 24A, CoAP message 2400A may include data associated with at least one option identifier. The at least one option identifier may include data associated with an option number and/or an option delta in one embodiment. For example, CoAP message 2400A may include data associated with a first numerical value (e.g., "3") as a first option identifier corresponding to a first option (e.g., associated with a host), where the first numerical value (e.g., "3") may be the delta or difference between the current option number (e.g., "3") and the option number of the preceding option (e.g., "0" in this case since this is the first option). As such, the first numerical value of "3" may correspond to an option number of "3."

As another example, CoAP message 2400A may include data associated with a second numerical value (e.g., "4") as a second option identifier corresponding to a second option (e.g., associated with a port), where the second numerical value (e.g., "4") may be the delta or difference between the current option number (e.g., "7") and the option number of the preceding option (e.g., "3"). As such, the second numerical value of "4" may correspond to an option number of "7."

As a further example, CoAP message 2400A may include data associated with a third numerical value (e.g., "4") as a third option identifier corresponding to a third option (e.g., associated with a path), where the third numerical value (e.g., "4") may be the delta or difference between the current option number (e.g., "11") and the option number of the preceding option (e.g., "7"). As such, the third numerical value of "4" may correspond to an option number of "11."

As shown in FIG. 24A, CoAP message 2400A may include data associated with a payload marker (e.g., "0xFF"). CoAP message 2400A may include data associated with a payload, where the data associated with a payload may include authentication data (e.g., "Authentication Data C") and/or other data. In one embodiment, the other data may be or include the first data portion (e.g., associated with a security token, including an instance of the session key, including at least a portion of data portion 1900, generated in step 1320, generated in step 2040, some combination thereof, etc.) of the second message (e.g., "Data Portion Associated With Security Token").

Although FIG. 24A shows CoAP message 2400A with a specific number and type of portions, it should be appreciated that CoAP message 2400A may include a different number and/or type of portions in other embodiments. For example, CoAP message 2400A may include fewer portions or at least one additional portion. As another example, a plurality of portions of CoAP message 2400A may be combined into a smaller number of portions. Although FIG. 24A shows CoAP message 2400A with a specific organization of portions, it should be appreciated that CoAP message 2400A may include a different organization of portions in other embodiments.

CoAP message 2400A may be free of authentication data (e.g., "Authentication Data C") in one embodiment. Where CoAP message 2400A is free of authentication data, CoAP message 2400A may also be free of data associated with a max-age value. Where CoAP message 2400A is free of authentication data, CoAP message 2400A may be free of data associated with one or more query parameters. For example, CoAP message 2400A may be free of a query parameter associated with a unique identifier of a sender of CoAP message 2400A and/or a caller system, a query parameter associated with an authentication mechanism used to generate authentication data, a query parameter associated with a nonce, some combination thereof, etc.

In one embodiment, data associated with at least one option may be excluded from CoAP message 2400A. For example, data (e.g., associated with a host, a port, a path, a max-age value, or some combination thereof) used by intermediary systems or devices (e.g., situated between the sender of CoAP message 2400A and the ultimate recipient of CoAP message 2400A) such as a proxy server or other type of computer system or device may be excluded in one or more embodiments where intermediary systems or devices do not exist or are unlikely to exist.

Turning back to FIG. 13A, step 1335 may involve formatting at least one data portion (e.g., a data portion associated with a security token) of the third message in accordance with JSON (JavaScript Object Notation) in one embodiment. Alternatively, at least one data portion (e.g., a data portion associated with a security token) of the third message may be formatted in step 1335 in accordance with another format (e.g., UTF-8 plain text, link format, XML, octet-stream, etc.). Where the third message is a CoAP message (e.g., 2400A), the third message may include data associated with a content format (e.g., a "Content-Format" option with an option value corresponding to a format of a payload of CoAP message 2400A, a format of a data portion associated with a security token, etc.) in one embodiment.

Figure 25:
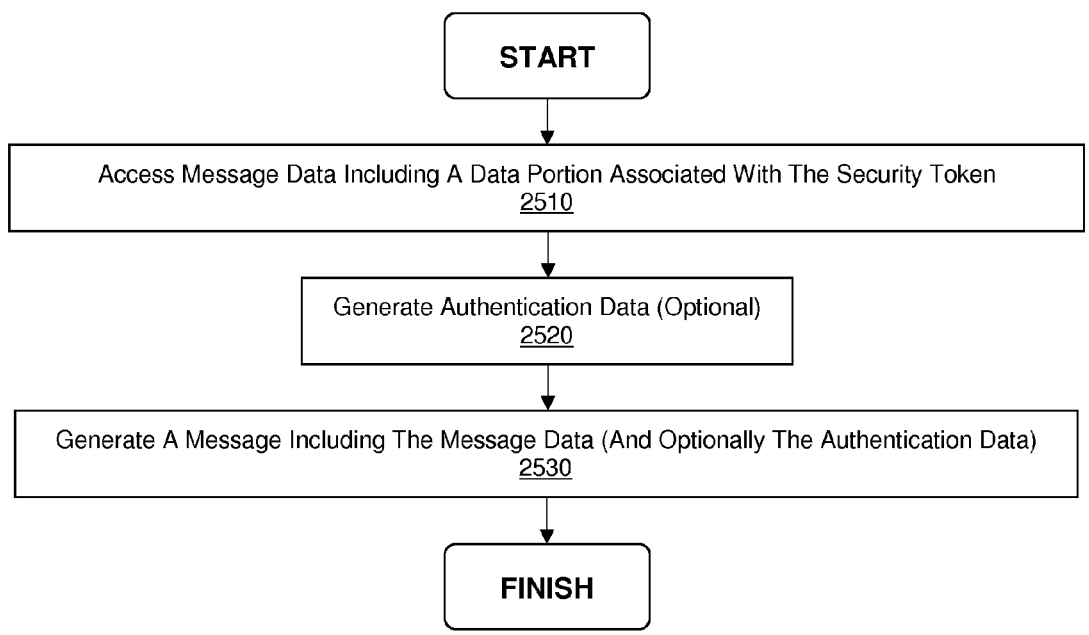
FIG. 25 shows a flowchart of a process for generating a message including a data portion associated with a security token in accordance with one embodiment.

Step 1335 may be performed in accordance with one or more steps of process 2500 of FIG. 25 in one embodiment. FIG. 25 shows a flowchart of process 2500 for generating a message including a data portion associated with a security token in accordance with one embodiment. One or more steps of process 2500 may be performed at or by a caller system (e.g., the first computer system or computer system 110) in one embodiment.

As shown in FIG. 25, step 2510 involves accessing message data including a data portion associated with a security token. In one embodiment, the data portion accessed in step 2510 (e.g., as at least part of the message data) may be or include the first data portion (e.g., associated with a security token, including an instance of the session key, including at least a portion of data portion 1900, generated in step 1320, generated in step 2040, some combination thereof, etc.) of the second message (e.g., received in step 1330, step 2210, etc.). Step 2510 may involve accessing the data portion as ciphertext without decryption of the data portion in one embodiment. And in one embodiment, step 2510 may be performed using a message generation component (e.g., 114).

In one embodiment, the message data accessed in step 2510 may include data other than authentication data. For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), data other than the authentication data (e.g., "Authentication Data C" of CoAP message 2400A), some combination thereof, etc.

As shown in FIG. 25, step 2520 involves optionally generating authentication data. In one embodiment, step 2520 may be performed using a security component (e.g., 112 of computer system 110).

In one embodiment, the authentication data may be generated in step 2520 using an authentication mechanism such as HMAC, OAuth, OAuth 2.0, OpenID, etc. The authentication data may be generated in step 2520 using a key in one embodiment. For example, where the authentication mechanism used to generate the authentication data in step 2520 is HMAC, the authentication data may be generated by performing a hash function (e.g., MD5, SHA-1, SHA256, SHA512, etc.) on message data (e.g., accessed in step 2510) using a key. And in one embodiment, the message data may be free of the key used to generate the authentication data in step 2520.

An instance of a session key (e.g., accessed and/or stored in step 1330, accessed in step 2260, stored in step 2270, etc.) may be used to generate the authentication data in step 2520 in one embodiment. The instance of the session key may be stored locally at a caller system (e.g., the first computer system or computer system 110) in one embodiment. For example, the instance of the session key may be stored locally in a security component (e.g., 112 of computer system 110), in a memory (e.g., of computer system 110), in a database (e.g., of computer system 110), etc. Alternatively, the instance of the session key may be stored remotely (e.g., at another system or device) and accessed by a caller system (e.g., the first computer system or computer system 110) in a secure manner in one embodiment. Accordingly, an instance of the session key may be securely accessed and used by a caller system (e.g., the first computer system or computer system 110) to generate the authentication data in step 2520 in one embodiment.

As shown in FIG. 25, step 2530 involves generating a message including the message data (e.g., accessed in step 2510). In one embodiment, step 2530 may involve generating a message including the message data (e.g., accessed in step 2510) and the authentication data (e.g., generated in step 2520). In one embodiment, step 2530 may be performed using a message generation component (e.g., 114 of computer system 110).

In one embodiment, where the message generated in step 2530 is a CoAP message (e.g., 2400A), step 2530 may involve formatting the message data (e.g., accessed in step 2510) in accordance with CoAP (e.g., into one or more portions of CoAP message 200). The authentication data (e.g., generated in step 2520) may be included in or as the payload (e.g., associated with portion 250 of CoAP message 200) of the CoAP message in one embodiment. For example, as shown in FIG. 24A, authentication data (e.g., "Authentication Data C") may be included in or as the payload of CoAP message 2400A.

Step 2530 may involve including the data portion associated with a security token (e.g., accessed in step 2510 as at least part of the message data) in or as the payload of the message in one embodiment. For example, as shown in FIG. 24A, a data portion associated with a security token (e.g., "Data Portion Associated With Security Token") may be included in or as the payload of CoAP message 2400A in step 2530. And in one embodiment, a data portion associated with a security token (e.g., "Data Portion Associated With Security Token") may be included in or as another portion of the message in step 2530.

In one embodiment, the message may be generated (e.g., in step 2530) without decrypting the data portion associated with a security token (e.g., accessed in step 2510 as at least part of the message data). For example, where the data portion (e.g., associated with a security token) is accessed (e.g., from the message received in step 2210) as ciphertext, the data portion may be included in the message (e.g., as ciphertext) without decryption of the data portion in step 2530.

Step 2530 may involve generating a bit stream or byte stream including the message data (e.g., accessed in step 2510) in one embodiment. In one embodiment, step 2530 may involve generating a bit stream or byte stream including the message data (e.g., accessed in step 2510) and the authentication data (e.g., generated in step 2520). The bit stream or byte stream may be formatted in accordance with CoAP in one embodiment.

In one embodiment, step 2530 may involve formatting at least one data portion (e.g., a data portion associated with a security token) of the message in accordance with JSON (JavaScript Object Notation). Alternatively, at least one data portion (e.g., a data portion associated with a security token) of the message may be formatted in step 2530 in accordance with another format (e.g., UTF-8 plain text, link format, XML, octet-stream, etc.). Where the message generated in step 2530 is a CoAP message (e.g., 2400A), the message may include data associated with a content format (e.g., a "Content-Format" option with an option value corresponding to a format of a payload of CoAP message 2400A, a format of a data portion associated with a security token, etc.) in one embodiment.

Although FIG. 25 depicts process 2500 as including a specific number of steps, it should be appreciated that process 2500 may include a different number of steps in other embodiments. Although FIG. 25 depicts process 2500 as including a specific ordering of steps, it should be appreciated that process 2500 may include a different ordering of steps in other embodiments.

As shown in FIG. 13B, step 1340 involves communicating the third message (e.g., generated in step 1335 and/or in accordance with one or more steps of process 2500 of FIG. 25) from the first computer system (e.g., 110) to the second computer system (e.g., 120). In one embodiment, the third message may be communicated in step 1340 over a connection (e.g., 130) between computer system 110 and computer system 120). The third message may be communicated in step 1340 as a bit stream or a byte stream in one embodiment. And in one embodiment, step 1340 may involve communicating the third message using at least one communication interface (e.g., 118 of computer system 110, 128 of computer system 120, etc.).

In one embodiment, step 1340 may involve communicating the third message using DTLS. For example, where the third message is a CoAP message (e.g., 2400A), step 1340 may involve communicating the third message over CoAP using DTLS.

Step 1345 involves performing third processing associated with the third message, and responsive thereto, accessing an instance of the session key from the third message. In one embodiment, step 1345 may involve performing the third processing associated with the third message at the second computer system (e.g., 120). For example, responsive to receiving the third message (e.g., communicated in step 1340), the second computer system (e.g., 120) may perform the third processing. And in one embodiment, the third processing may be performed using a security component (e.g., 122).

In one embodiment, the third processing may involve determining whether a first unique identifier associated with a caller system (e.g., the first computer system or computer system 110) correlates to a second unique identifier associated with the caller system. The first unique identifier associated with the caller system may be accessed from a data portion (e.g., associated with a security token, including an instance of the session key, including at least a portion of data portion 1900, generated in step 1320, generated in step 2040, some combination thereof, etc.) of the third message. For example, the first unique identifier associated with the caller system may be accessed from a portion of the data portion associated with the caller system (e.g., portion 1910 of data portion 1900). The second unique identifier associated with the caller system (e.g., the first computer system or computer system 110) may be accessed from a portion of the third message other than the data portion. For example, where the data portion is included in a payload of the third message, the second unique identifier may be accessed from a portion of the third message other than the payload. As another example, where the third message is a CoAP message (e.g., 2400A), the second unique identifier may be accessed from data associated with an option (e.g., a "Uri-Query" option with an option value of "uid=cs110").

The third processing may involve determining whether a third unique identifier associated with the target system (e.g., the second computer system or computer system 120) correlates to a fourth unique identifier associated with registration of the target system. The third unique identifier associated with the target system may be accessed from a data portion (e.g., associated with a security token, including an instance of the session key, including at least a portion of data portion 1900, generated in step 1320, generated in step 2040, some combination thereof, etc.) of the third message. The fourth unique identifier associated with registration of the target system may correspond to registration data (e.g., accessed in step 1520 of process 1500) associated with the target system in one embodiment. For example, the fourth unique identifier (or data correlating thereto) may be provided, by the target system (e.g., the second computer system or computer system 120) or another computer system associated therewith, to the third computer system (e.g., 1430) as part of registering the target system with the third computer system.

In one embodiment, the third processing may involve determining whether a security token (e.g., associated with a data portion of the third message) and/or a session key (e.g., corresponding to an instance of the session key included in the data portion of the third message) is valid. In one embodiment, expiration data (e.g., portion 1930 of data portion 1900) may be used to determine whether the security token and/or session key is valid. For example, a timestamp (e.g., associated with creation of the security token and/or session key) and a duration or lifetime (e.g., of the security token and/or session key) may be used to determine an expiration time of the security token and/or session key, where the expiration time may be compared to a current time to determine if the security token and/or session key is valid (e.g., not expired). In one embodiment, the expiration data may be accessed from a data portion (e.g., associated with a security token, including an instance of the session key, including at least a portion of data portion 1900, generated in step 1320, generated in step 2040, some combination thereof, etc.) of the third message.

The session key (or an instance thereof) may be accessed from the third message in step 1345 based on the results of the third processing in one embodiment. For example, where the third processing includes evaluating at least one condition associated with the third message (e.g., whether a first unique identifier associated with the first computer system correlates to a second unique identifier associated with the first computer system, whether a third unique identifier associated with the second computer system correlates to a fourth unique identifier associated with the second computer system, whether the security token and/or session key is valid, some combination thereof, etc.), the session key (or an instance thereof) may be accessed in step 1345 if the at least one condition is met. In one embodiment, the session key (or an instance thereof) may be accessed in step 1345 from a data portion (e.g., associated with a security token, including an instance of the session key, including at least a portion of data portion 1900, generated in step 1320, generated in step 2040, some combination thereof, etc.) of the third message.

In one embodiment, accessing the instance of the session key in step 1345 may involve decrypting a data portion (e.g., associated with a security token, including an instance of the session key, including at least a portion of data portion 1900, generated in step 1320, generated in step 2040, some combination thereof, etc.) of the third message to access the instance of the session key. The data portion of the third message may be decrypted in step 1345 using AES, Blowfish, RC4, the Extended Tiny Encryption Algorithm (XTEA) scheme, another symmetric-key algorithm, etc.

In one embodiment, a key associated with the second computer system (e.g., 120) may be used to decrypt the data portion of the third message in step 1345. The key may be a secret key or private key that is unique to the second computer system (e.g., 120) in one embodiment. The key may be stored locally at the second computer system (e.g., 120) in one embodiment. For example, the key may be stored locally in a security component (e.g., 122 of computer system 120), in a memory (e.g., of computer system 120), in a database (e.g., of computer system 120), etc. Alternatively, the key may be stored remotely (e.g., at another system or device) and accessed by the second computer system (e.g., 120) in a secure manner in one embodiment. Accordingly, in one embodiment, a key associated with the second computer system (e.g., 120) may be securely accessed and used by the second computer system (e.g., 120) to decrypt a data portion (e.g., associated with a security token, including an instance of the session key, including at least a portion of data portion 1900, generated in step 1320, generated in step 2040, some combination thereof, etc.) of the third message to access the instance of the session key in step 1345.

The key used to decrypt (e.g., in step 1345) the data portion of the third message at the second computer system (e.g., 120) may be the same key used to encrypt (e.g., in step 1320, in step 2040, etc.) data to form the first data portion (e.g., included in the second message) at the third computer system (e.g., 1430) in one embodiment. For example, where a key associated with the second computer system (e.g., a secret key or private key that is unique to the second computer system) is used by the third computer system to encrypt the data to form the first data portion of the second message (e.g., in step 1320, in step 2040, etc.), the same key associated with the second computer system may be used by the second computer system to decrypt the data portion of the third message (e.g., in step 1345). In this manner, a symmetric-key algorithm may be used to secure a data portion (e.g., associated with a security token, including an instance of the session key, including at least a portion of data portion 1900, generated in step 1320, generated in step 2040, some combination thereof, etc.) communicated using one or more messages.

Figure 26A:
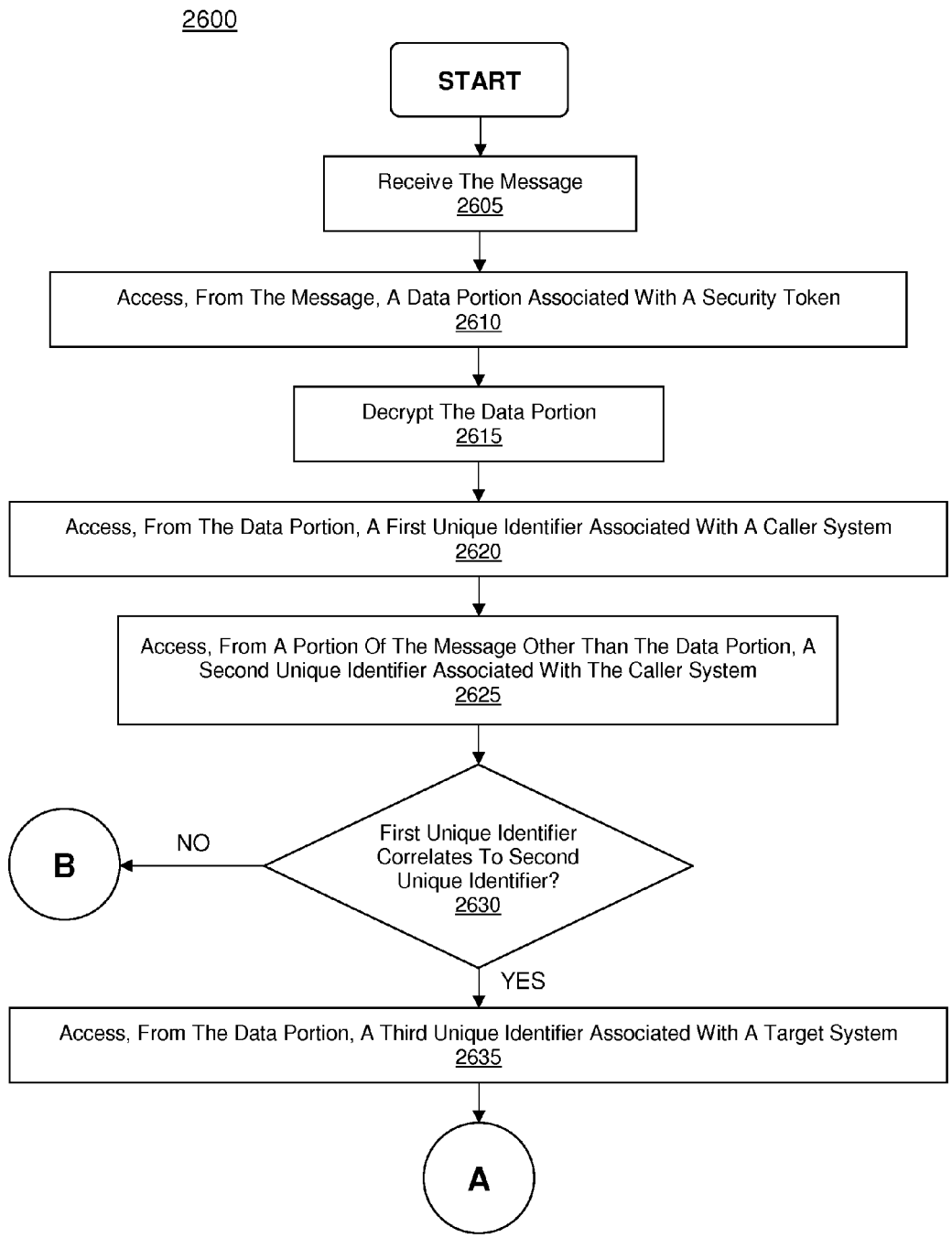
FIG. 26A shows a first portion of a flowchart of a process for performing processing associated with a message in accordance with one embodiment.
Figure 26B:
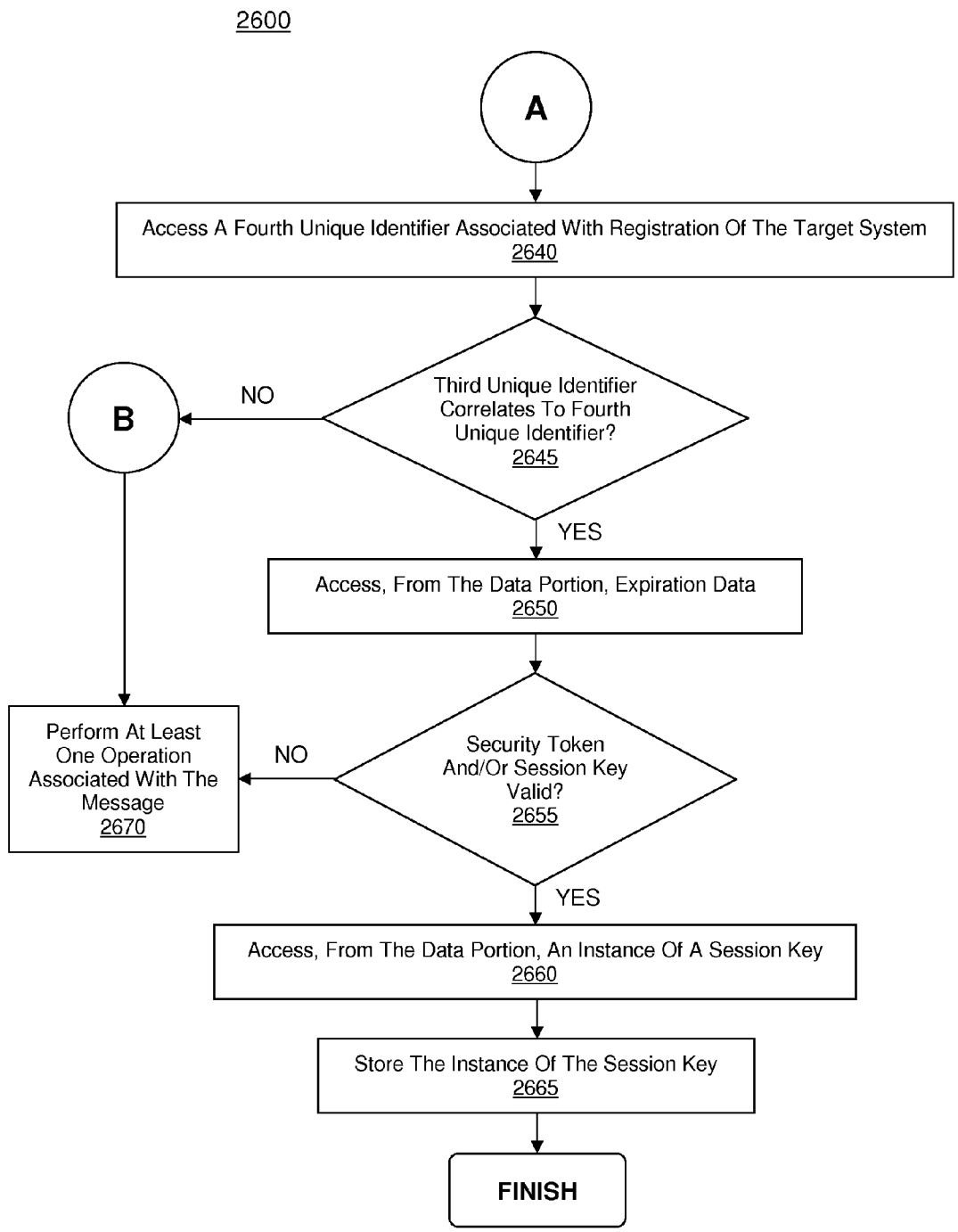
FIG. 26B shows a second portion of a flowchart of a process for performing processing associated with a message in accordance with one embodiment.

In one embodiment, step 1345 may be performed in accordance with one or more steps of process 2600 of FIGS. 26A and 26B. FIGS. 26A and 26B show a flowchart of process 2600 for performing processing associated with a message in accordance with one embodiment. One or more steps of process 2600 may be performed at or by a target system (e.g., the second computer system or computer system 120) in one embodiment.

As shown in FIG. 26A, step 2605 involves receiving a message. In one embodiment, the message received in step 2605 may be the message generated in step 1335, generated in step 2530, communicated in step 1340, some combination thereof, etc. Step 2605 may involve receiving the message at the target system (e.g., the second computer system or computer system 120) from another computer system (e.g., 110, another system or device, etc.) in one embodiment.

In one embodiment, the message may be received in step 2605 over a connection (e.g., 130). The message may be received in step 2605 as a bit stream or a byte stream in one embodiment. And in one embodiment, step 2605 may involve receiving the message using a communication interface (e.g., 128).

As shown in FIG. 26A, step 2610 involves accessing, from the message (e.g., received in step 2605), a data portion associated with a security token. In one embodiment, the data portion accessed in step 2610 may include an instance of the session key, include at least a portion of data portion 1900, be generated in step 1320, be generated in step 2040, some combination thereof, etc. And in one embodiment, step 2610 may be performed using a security component (e.g., 122).

Step 2615 involves decrypting the data portion (e.g., accessed in step 2610). Decryption of the data portion in step 2615 may involve generating a plaintext version or unencrypted version of the data portion. Step 2615 may be performed using a security component (e.g., 122 of computer system 120) in one embodiment. The data portion may be decrypted in step 2615 using AES, Blowfish, RC4, the Extended Tiny Encryption Algorithm (XTEA) scheme, another symmetric-key algorithm, etc.

In one embodiment, the data portion (e.g., accessed in step 2610) may be decrypted in step 2615 using a key associated with the target system (e.g., the second computer system or computer system 120). For example, the key may be a secret key or private key that is unique to the second computer system (e.g., 120). The key may be stored locally at the second computer system (e.g., 120) in one embodiment. For example, the key may be stored locally in a security component (e.g., 122 of computer system 120), in a memory (e.g., of computer system 120), in a database (e.g., of computer system 120), etc. Alternatively, the key may be stored remotely (e.g., at another system or device) and accessed by the second computer system (e.g., 120) in a secure manner in one embodiment. Accordingly, a key associated with the target system (e.g., the second computer system or computer system 120) may be securely accessed and used by the target system in step 2615 to decrypt the data portion (e.g., accessed in step 2610) in one embodiment.

As shown in FIG. 26A, step 2620 involves accessing, from the data portion (e.g., accessed in step 2610), a first unique identifier associated with a caller system (e.g., the first computer system or computer system 110). Step 2620 may be performed using a security component (e.g., 122 of computer system 120) in one embodiment. In one embodiment, step 2620 may involve accessing the first unique identifier from a plaintext version or unencrypted version of the data portion (e.g., generated responsive to decryption of the data portion in step 2615). And in one embodiment, the first unique identifier may be accessed in step 2620 from a portion of the data portion associated with the caller system (e.g., portion 1910 of data portion 1900).

Step 2625 involves accessing, from a portion of the message (e.g., received in step 2605) other than the data portion (e.g., accessed in step 2610), a second unique identifier associated with the caller system (e.g., the first computer system or computer system 110). For example, where the data portion (e.g., accessed in step 2610) is included in a payload of the message, the second unique identifier may be accessed in step 2625 from a portion of the message other than the payload. As another example, where the message is a CoAP message (e.g., 2400A), the second unique identifier may be accessed in step 2625 from data associated with an option (e.g., a "Uri-Query" option with an option value of "uid=cs110"). In one embodiment, step 2625 may be performed using a security component (e.g., 122 of computer system 120).

As shown in FIG. 26A, step 2630 involves determining whether the first unique identifier (e.g., accessed in step 2620) correlates to the second unique identifier (e.g., accessed in step 2625). In one embodiment, step 2630 may be performed using a security component (e.g., 122 of computer system 120). If the first unique identifier correlates to the second unique identifier, then step 2635 may be performed.

Step 2635 involves accessing, from the data portion (e.g., accessed in step 2610), a third unique identifier associated with a target system (e.g., the second computer system or computer system 120). Step 2635 may be performed using a security component (e.g., 122 of computer system 120) in one embodiment. In one embodiment, step 2635 may involve accessing the third unique identifier from a plaintext version or unencrypted version of the data portion (e.g., generated responsive to decryption of the data portion in step 2615). And in one embodiment, the third unique identifier may be accessed in step 2635 from a portion of the data portion associated with the target system (e.g., portion 1920 of data portion 1900).

As shown in FIG. 26B, step 2640 involves accessing a fourth unique identifier associated with registration of the target system (e.g., the second computer system or computer system 120. The fourth unique identifier associated with registration of the target system may correspond to registration data (e.g., accessed in step 1520 of process 1500) associated with the target system in one embodiment. For example, the fourth unique identifier (or data correlating thereto) may be provided, by the target system (e.g., the second computer system or computer system 120) or another computer system associated therewith, to the third computer system (e.g., 1430) as part of registering the target system with the third computer system.

Step 2640 may involve accessing the fourth unique identifier locally from a component of the target system (e.g., security component 122, a memory of computer system 120, a database of computer system 120, etc.), remotely from another system or device accessible to the target system, from the third computer system (e.g., 1430), etc. In one embodiment, step 2640 may be performed using a security component (e.g., 122 of computer system 120).

As shown in FIG. 26B, step 2645 involves determining whether the third unique identifier (e.g., accessed in step 2635) correlates to the fourth unique identifier (e.g., accessed in step 2640). In one embodiment, step 2645 may be performed using a security component (e.g., 122 of computer system 120). If the third unique identifier correlates to the fourth unique identifier, then step 2650 may be performed.

Step 2650 involves accessing, from the data portion (e.g., accessed in step 2610), expiration data. In one embodiment, step 2650 may be performed using a security component (e.g., 122 of computer system 120). And in one embodiment, the expiration data may be accessed in step 2650 from a portion of the data portion associated with expiration data (e.g., portion 1930 of data portion 1900).

In one embodiment, the expiration data may be associated with a security token (e.g., associated with the data portion accessed in step 2610) and/or a session key (e.g., corresponding to an instance of a session key included in the data portion accessed in step 2610). In one embodiment, the expiration data may include a timestamp (e.g., associated with creation of the security token and/or session key), a duration or lifetime (e.g., of the security token and/or session key), other data, some combination thereof, etc. Where the expiration data includes a timestamp, the timestamp may be a UTC timestamp, unix timestamp, epoch timestamp, another type of timestamp, etc. Where the expiration data includes a duration or lifetime, the duration or lifetime may include a timeout.

The duration or lifetime may be set or determined by the target system (e.g., the second computer system or computer system 120) or another computer system associated therewith in one embodiment. For example, the target system (e.g., the second computer system or computer system 120) or another computer system associated therewith may communicate information about the duration or lifetime to the third computer system (e.g., 1430), where the third computer system may access and/or store the information about the duration or lifetime (e.g., for generation of and/or inclusion in portion 1930).

As shown in FIG. 26B, step 2655 involves determining whether the security token and/or session key are valid. In one embodiment, step 2655 may be performed using a security component (e.g., 122 of computer system 120). In one embodiment, step 2655 may involve determining whether the security token and/or session key are valid based on the expiration data (e.g., accessed in step 2650). If the security token and/or session key are determined to be valid in step 2655, then step 2660 may be performed.

Step 2660 involves accessing, from the data portion (e.g., accessed in step 2610), an instance of a session key. In one embodiment, step 2660 may be performed using a security component (e.g., 122 of computer system 120). And in one embodiment, the instance of the session key may be accessed in step 2660 from a portion of the data portion associated with an instance of a session key (e.g., portion 1940 of data portion 1900).

As shown in FIG. 26B, step 2665 involves storing the instance of the session key (e.g., accessed in step 2660). In one embodiment, the instance of the session key may be stored locally at a target system (e.g., the second computer system or computer system 120) in step 2665. For example, the instance of the session key may be stored locally in a security component (e.g., 122 of computer system 120), in a memory (e.g., of computer system 120), in a database (e.g., of computer system 120), etc. Alternatively, the instance of the session key may be stored remotely (e.g., at another system or device) in step 2665 such that the instance of the session key may be accessed by a target system (e.g., the second computer system or computer system 120) in a secure manner in one embodiment. And in one embodiment, the instance of the session key may be stored in step 2665 as data 2700 of FIG. 27.

FIG. 27 shows data 2700 associated with at least one session key accessible to a target system (e.g., the second computer system or computer system 120) in accordance with one embodiment. As shown in FIG. 27, each unique identifier in column 2710 may be associated with a respective caller system that is authorized to communicate with and/or connect to the target system (e.g., responsive to configuration of permissions in step 1305 of process 1300 and/or one or more steps of process 1500 of FIG. 15). Each unique identifier (e.g., associated with a respective caller system) in column 2710 may correspond to a respective key in column 2720, where each key in column 2720 may be a session key and/or an instance of a session key (e.g., associated with communication between the target system and a respective caller system). As such, a first key (e.g., "Session Key 1") may be associated with communication between the target system and a first caller system (e.g., associated with the unique identifier of "cs110"), a second key (e.g., "Session Key 2") may be associated with communication between the target system and a second caller system (e.g., associated with the unique identifier of "cs130"), etc.

At least a portion of data 2700 may correlate to and/or be the same as permissions configuration data (e.g., 1600 of FIG. 16) in one embodiment. For example, the first row of column 2710 of data 2700 may correlate to and/or be the same as the first row of permissions configuration data 1600 (e.g., including the unique identifier of "cs120" in column 1610 and the unique identifier of "cs110" in column 1620). As another example, the second row of column 2710 of data 2700 may correlate to and/or be the same as the second row of permissions configuration data 1600 (e.g., including the unique identifier of "cs120" in column 1610 and the unique identifier of "cs130" in column 1620). And as yet another example, the third row of column 2710 of data 2700 may correlate to and/or be the same as the third row of permissions configuration data 1600 (e.g., including the unique identifier of "cs120" in column 1610 and the unique identifier of "cs140" in column 1620).

In one embodiment, data 2700 may be stored locally at a target system (e.g., the second computer system or computer system 120). For example, data 2700 may be stored locally in a security component (e.g., 122 of computer system 120), in a memory (e.g., of computer system 120), in a database (e.g., of computer system 120), etc. Alternatively, data 2700 may be stored remotely (e.g., at another system or device) and accessed by a target system (e.g., the second computer system or computer system 120) in a secure manner in one embodiment.

Data 2700 may be changed or updated in one embodiment. For example, data 2700 may be changed or updated based on expiration data (e.g., associated with portion 1930 of data portion 1900) such as a timestamp (e.g., associated with creation of the security token and/or session key), a duration or lifetime (e.g., of the security token and/or session key), etc. In this case, a portion of data 2700 associated with at least one session key may be removed from data 2700 and/or updated (e.g., with new data corresponding to at least one new session key) responsive to expiration of the security token and/or the at least one session key.

Although FIG. 27 shows data 2700 as including a particular amount of data, it should be appreciated that a different amount of data may be included in data 2700 in other embodiments. Additionally, although FIG. 27 shows data 2700 as including a particular arrangement and type of data, it should be appreciated that a different arrangement and/or type of data may be included in data 2700 in other embodiments.

Turning back to FIG. 26B, step 2670 involves performing at least one operation associated with the message. In one embodiment, step 2670 may be performed if it is determined in step 2630 that the first unique identifier does not correlate to the second unique identifier. In one embodiment, step 2670 may be performed if it is determined in step 2645 that the third unique identifier does not correlate to the fourth unique identifier. And in one embodiment, step 2670 may be performed if it is determined in step 2655 that the security token and/or the session key are invalid (e.g., expired). And in one embodiment, step 2670 may involve performing at least one operation using an operation component (e.g., 126 of computer system 120).

The at least one operation performed in step 2670 may include ignoring the message (e.g., received in step 2605) in one embodiment. For example, another message may not be generated and/or communicated in reply to the message (e.g., received in step 2605) in step 2670. As another example, no further processing related to the message (e.g., received in step 2605) may be performed in step 2670. And in one embodiment, the at least one operation performed in step 2670 may include limiting access to the recipient (e.g., the second computer system or computer system 120) of the sender (e.g., the first computer system or computer system 110).

Although FIGS. 26A and 26B depict process 2600 as including a specific number of steps, it should be appreciated that process 2600 may include a different number of steps in other embodiments. Although FIGS. 26A and 26B depict process 2600 as including a specific ordering of steps, it should be appreciated that process 2600 may include a different ordering of steps in other embodiments.

Turning back to FIG. 13B, step 1350 involves optionally performing message validation with respect to the third message (e.g., communicated in step 1340). In one embodiment, step 1350 may be performed if the third message includes authentication data, whereas step 1350 may be bypassed or omitted if the third message does not include authentication data. In one embodiment, step 1350 may be performed at the second computer system (e.g., 120). In one embodiment, the message validation may be performed in step 1350 using a security component (e.g., 122). And in one embodiment, step 1350 may be performed in accordance with one or more steps of process 2800 of FIG. 28.

Figure 28:
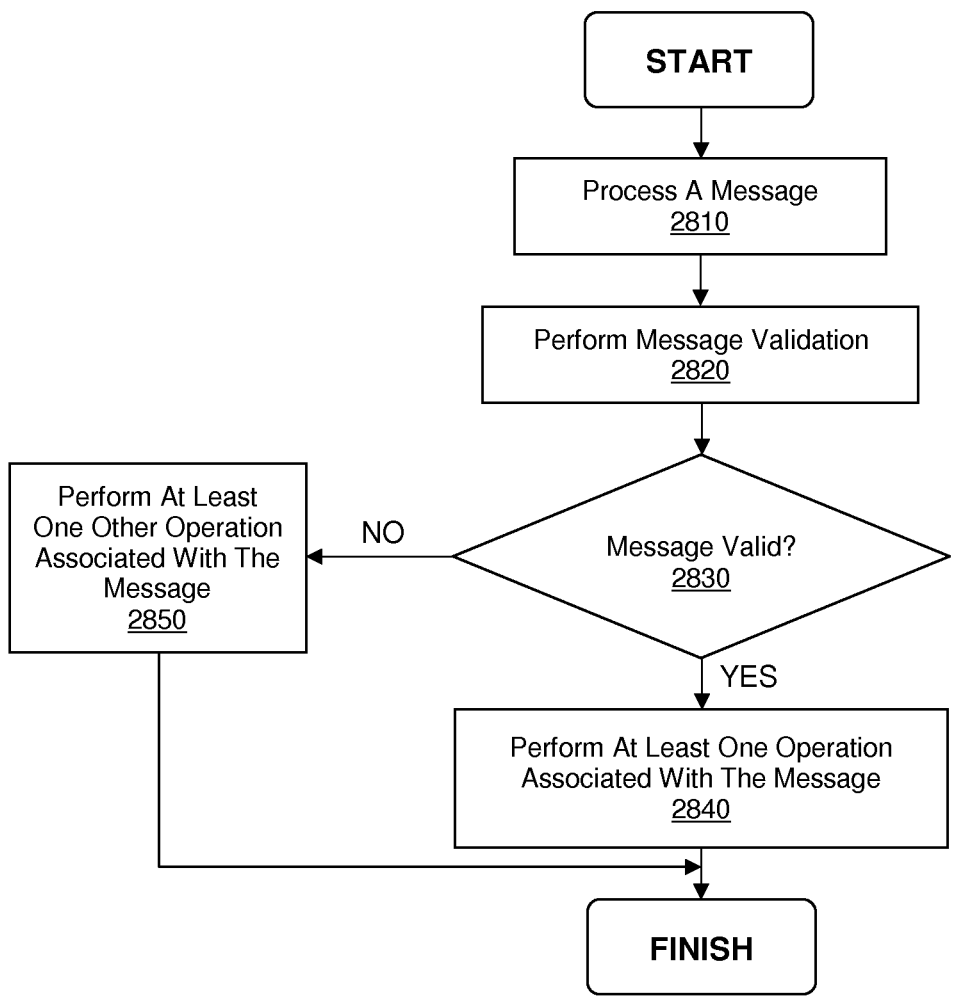
FIG. 28 shows a flowchart of a process for performing message validation in accordance with one embodiment.

FIG. 28 shows a flowchart of process 2800 for performing message validation in accordance with one embodiment. One or more steps of process 2800 may be performed responsive to one or more steps of process 2600 in one embodiment. For example, if an instance of a session key is accessed (e.g., in step 2660) and/or stored (e.g., in step 2665), then one or more steps of process 2800 may be performed. And in one embodiment, one or more steps of process 2800 may be performed at or by a target system (e.g., the second computer system or computer system 120).

As shown in FIG. 28, step 2810 involves processing a message. In one embodiment, the message processed in step 2810 may be the message generated in step 1335, generated in step 2530, communicated in step 1340, received in step 2605, some combination thereof, etc. Processing of the message in step 2810 may involve accessing authentication data from the message in one embodiment. In one embodiment, step 2810 may involve processing the message using a security component (e.g., 122 of computer system 120). And in one embodiment, where the message is a CoAP message, step 2810 may be performed in accordance with step 650 and/or one or more steps of process 900 of FIG. 9.

Step 2820 involves performing message validation (e.g., with respect to the message processed in step 2810). The message validation may be used to verify the authenticity of the sender of the message and/or the integrity of the message. Where the message includes a nonce, the message validation may be used to detect a replay attack.

In one embodiment, message validation may be performed in step 2820 based on authentication data (e.g., accessed from the message in step 2810). And in one embodiment, message validation may be performed in step 2820 using at least one message invalidity condition.

Where message validation is performed based on authentication data, message validation may be performed in step 2820 by comparing second authentication data to the authentication data in one embodiment. For example, the target system (e.g., the second computer system or computer system 120) may generate second authentication data based on at least a portion of the message (e.g., a header, a token, at least one option, a payload marker, a payload, a data portion associated with a security token, some combination thereof, etc.). The second authentication data may be compared to the authentication data (e.g., included in the message and/or accessed in step 2810) to verify the authenticity of the sender of the message (e.g., the first computer system or computer system 110), verify the integrity of the message, detect and/or act on a replay attack, some combination thereof, etc.

In one embodiment, the second authentication data may be generated in step 2820 using an authentication mechanism such as HMAC, OAuth, OAuth 2.0, OpenID, etc. The second authentication data may be generated in step 2820 using a key in one embodiment. For example, where the authentication mechanism used to generate the second authentication data in step 2820 is HMAC, the second authentication data may be generated by performing a hash function (e.g., MD5, SHA-1, SHA256, SHA512, etc.) on at least a portion of the message (e.g., a header, a token, at least one option, a payload marker, a payload, a data portion associated with a security token, some combination thereof, etc.) using a key. And in one embodiment, the message may be free of the key used to generate the second authentication data in step 2820.

An instance of a session key (e.g., accessed and/or stored in step 1345, accessed in step 2660, stored in step 2665, etc.) may be used to generate the second authentication data in step 2820 in one embodiment. The instance of the session key may be stored locally at a target system (e.g., the second computer system or computer system 120) in one embodiment. For example, the instance of the session key may be stored locally in a security component (e.g., 122 of computer system 120), in a memory (e.g., of computer system 120), in a database (e.g., of computer system 120), etc. Alternatively, the instance of the session key may be stored remotely (e.g., at another system or device) and accessed by a target system (e.g., the second computer system or computer system 120) in a secure manner in one embodiment. Accordingly, an instance of a session key may be securely accessed and used by a target system (e.g., the second computer system or computer system 120) to generate the second authentication data in step 2820 in one embodiment.

Where message validation is performed using at least one message invalidity condition, the message may be determined to be invalid in step 2820 if any of the at least one message invalidity condition is triggered in one embodiment. For example, the message may be determined to be invalid in step 2820 responsive to a failure to access a unique identifier associated with the sender of the message (e.g., the first computer system or computer system 110). As another example, the message may be determined to be invalid in step 2820 responsive to a failure to access a nonce from the message. As a further example, the message may be determined to be invalid in step 2820 responsive to determining that a nonce accessed from the message is not different from another nonce accessed from a previous message. As yet another example, the message may be determined to be invalid in step 2820 responsive to determining that a payload of the message is not at least a predetermined size. And as another example, the message may be determined to be invalid in step 2820 responsive to a failure to access a key (e.g., an instance of the session key) used to generate the second authentication data or otherwise perform the message validation.

The message validation may be performed in step 2820 using a security component (e.g., 122 of computer system 120) in one embodiment. And in one embodiment, where the message is a CoAP message, step 2820 may be performed in accordance with step 660, one or more steps of process 1000 of FIG. 10, one or more steps of process 1100 of FIG. 11, some combination thereof, etc.

As shown in FIG. 28, step 2830 involves determining whether the message (e.g., processed in step 2810) is valid (e.g., based on the results of the message validation performed in step 2820). Step 2830 may be performed using a security component (e.g., 122 of computer system 120) in one embodiment. If it is determined in step 2830 that the message (e.g., processed in step 2810) is valid, then step 2840 may be performed.

Step 2840 involves performing at least one operation associated with the message (e.g., processed in step 2810). In one embodiment, step 2840 may involve performing at least one operation associated with communication between the caller system (e.g., the first computer system or computer system 110) and the target system (e.g., the second computer system or computer system 120). And in one embodiment, step 2840 may involve performing one or more steps of process 1300 (e.g., step 1355, step 1360, step 1365, step 1370, another step of process 1300, some combination thereof, etc.).

Alternatively, if it is determined in step 2830 that the message (e.g., processed in step 2810) is not valid, then at least one other operation associated with the message may be performed in step 2850.

2850 involves performing at least one other operation associated with the message. In one embodiment, step 2850 may be performed if the message (e.g., processed in step 2810) is determined to be invalid in step 2830. And in one embodiment, step 2850 may involve performing at least one operation using an operation component (e.g., 126 of computer system 120).

In one embodiment, step 2850 may involve acting responsive to a message validation failure such as a triggering of a message invalidity condition (e.g., corresponding to one or more steps of process 1100, a failure to access a unique identifier associated with the sender of the message, a failure to access a nonce from the message, determining that a nonce accessed from the message is not different from another nonce accessed from a previous message, determining that a payload of the message is not at least a predetermined size, a failure to access a key used to generate the second authentication data or otherwise perform the message validation, some combination thereof, etc.), another message validation failure (e.g., determining that the second authentication data generated based on at least a portion of the message does not correlate to authentication data accessed from the message, another message validation failure, etc.), etc. And in one embodiment, step 2850 may involve acting on a suspected or detected replay attack.

The at least one other operation performed in step 2850 may include ignoring the message (e.g., processed in step 2810) in one embodiment. For example, another message may not be generated and/or communicated in reply to the message (e.g., processed in step 2810) in step 2850. As another example, no further processing related to the message (e.g., processed in step 2810) may be performed in step 2850. And in one embodiment, the at least one other operation performed in step 2850 may include limiting access to the recipient (e.g., the second computer system or computer system 120) of the sender (e.g., the first computer system or computer system 110).

In one embodiment, where step 2850 is performed before the storing of an instance of a session key (e.g., in step 2665 of process 2600), the at least one other operation performed in step 2850 may involve deleting, destroying, and/or taking no further action with respect to the instance of the session key (e.g., accessed in step 2660). In this case, step 2665 may be bypassed or omitted.

Although FIG. 28 depicts process 2800 as including a specific number of steps, it should be appreciated that process 2800 may include a different number of steps in other embodiments. Although FIG. 28 depicts process 2800 as including a specific ordering of steps, it should be appreciated that process 2800 may include a different ordering of steps in other embodiments.

Turning back to FIG. 13B, step 1355 involves optionally generating, at the second computer system (e.g., 120), a fourth message associated with an indication of successful access of the session key from the third message (e.g., in step 1345, in step 2660, etc.). In one embodiment, the fourth message may be generated using a message generation component (e.g., 124) alone or in combination with at least one other component (e.g., security component 122, etc.).

In one embodiment, the third message may be generated in step 1355 based on the results of the third processing (e.g., performed in step 1345) and/or the results of the optional message validation performed with respect to the third message (e.g., in step 1350). For example, if at least one condition associated with the third message is met and/or if the third message is valid, then the fourth message may be generated in step 1355.

In one embodiment, data associated with an indication of successful access of the session key may be included in or as the payload of the fourth message in step 1355. And in one embodiment, data associated with an indication of successful access of the session key may be included in or as another portion of the fourth message in step 1355.

Step 1355 may involve generating authentication data to be included in the fourth message in one embodiment. And in one embodiment, the authentication data may be generated in step 1355 using a security component (e.g., 122 of computer system 120).

In one embodiment, the authentication data may be generated in step 1355 using an authentication mechanism such as HMAC, OAuth, OAuth 2.0, OpenID, etc. The authentication data may be generated in step 1355 using a key in one embodiment. For example, where the authentication mechanism used to generate the authentication data in step 1355 is HMAC, the authentication data may be generated by performing a hash function (e.g., MD5, SHA-1, SHA256, SHA512, etc.) on message data (e.g., a header, a token, at least one option, a payload marker, a payload, data associated with an indication of successful access of the session key, some combination thereof, etc.) using a key. And in one embodiment, the message data may be free of the key used to generate the authentication data in step 1355.

An instance of the session key (e.g., accessed and/or stored in step 1345, accessed in step 2660, stored in step 2665, etc.) may be used to generate the authentication data in step 1355 in one embodiment. The instance of the session key may be stored locally at the second computer system (e.g., 120) in one embodiment. For example, the instance of the session key may be stored locally in a security component (e.g., 122 of computer system 120), in a memory (e.g., of computer system 120), in a database (e.g., of computer system 120), etc. Alternatively, the instance of the session key may be stored remotely (e.g., at another system or device) and accessed by the second computer system (e.g., 120) in a secure manner in one embodiment. Accordingly, an instance of the session key may be securely accessed and used by the second computer system (e.g., 120) to generate the authentication data in step 1355 in one embodiment.

In one embodiment, the authentication data may be included in or as the payload of the fourth message in step 1355. And in one embodiment, the authentication data may be included in or as another portion of the fourth message in step 1355.

The fourth message may be a CoAP message (e.g., 2400B of FIG. 24B) in one embodiment. As shown in FIG. 24B, CoAP message 2400B may include data associated with a header, where the data associated with the header includes data associated with a version (e.g., "1"), a message type (e.g., "ACK" or acknowledgement), a token length (e.g., "1" associated with a length of 1 byte), a code (e.g., a response code of "Content"), and a message identifier (e.g., "0x7a10"). Data associated with a token (e.g., "0x73") may also be included in CoAP message 2400B.

CoAP message 2400B may include data associated with at least one option. For example, CoAP message 2400B may include data associated with a max-age value (e.g., an option value of "0"). In this case, a max-age value of "0" may be used to indicate that CoAP message 2400B is not to be cached by an intermediary system or device (e.g., situated between the sender of the CoAP message 2400B and the ultimate recipient of the CoAP message 2400B) such as a proxy server or other type of computer system or device.

As another example, CoAP message 2400B may include data associated with a query (e.g., including one or more parameters). An option value of "uid=cs120" (e.g., associated with a first parameter) may be associated with a unique identifier (e.g., "cs120") of a sender of CoAP message 2400B (e.g., computer system 120). An option value of "hs256=1" (e.g., associated with a second parameter) may be associated with an authentication mechanism (e.g., HMAC utilizing a hash function of SHA256) used to generate the authentication data (e.g., "Authentication Data D") included in CoAP message 2400B. An option value of "nonce=1" (e.g., associated with a third parameter) may be associated with a nonce (e.g., with a value of "1") included in CoAP message 2400B.

CoAP message 2400B may include data associated with at least one option length. For example, CoAP message 2400B may include data associated with a first option length (e.g., 1 byte) corresponding to data associated with a first option value (e.g., "0"), a second option length (e.g., 9 bytes) corresponding to data associated with a second option value (e.g., "uid=cs120"), a third option length (e.g., 7 bytes) corresponding to data associated with a third option value (e.g., "hs256=1"), etc.

As shown in FIG. 24B, CoAP message 2400B may include data associated with at least one option identifier. The at least one option identifier may include data associated with an option number and/or an option delta in one embodiment. For example, CoAP message 2400B may include data associated with a first numerical value (e.g., "14") as a first option identifier corresponding to a first option (e.g., associated with a max-age value), where the first numerical value (e.g., "14") may be the delta or difference between the current option number (e.g., "14") and the option number of the preceding option (e.g., "0" in this case since this is the first option). As such, the first numerical value of "14" may correspond to an option number of "14."

As another example, CoAP message 2400B may include data associated with a second numerical value (e.g., "1") as a second option identifier corresponding to a second option (e.g., associated with a query), where the second numerical value (e.g., "1") may be the delta or difference between the current option number (e.g., "15") and the option number of the preceding option (e.g., "14"). As such, the second numerical value of "1" may correspond to an option number of "15."

As a further example, CoAP message 2400B may include data associated with a third numerical value (e.g., "0") as a third option identifier corresponding to a third option (e.g., associated with a query), where the third numerical value (e.g., "0") may be the delta or difference between the current option number (e.g., "15") and the option number of the preceding option (e.g., "15"). As such, the third numerical value of "0" may correspond to an option number of "15."

As shown in FIG. 24B, CoAP message 2400B may include data associated with a payload marker (e.g., "0xFF"). CoAP message 2400B may include data associated with a payload, where the data associated with a payload may include authentication data (e.g., "Authentication Data D") and/or other data. In one embodiment, the other data may include data associated with an indication of successful access of the session key (e.g., depicted in FIG. 24B as the data or content of "Key Transfer Successful").

CoAP message 2400A and CoAP message 2400B may share a common message identifier (e.g., "0x7a10") in one embodiment. CoAP message 2400A and CoAP message 2400B may share a common token (e.g., "0x73") in one embodiment.

In one embodiment, a message type associated with CoAP message 2400B (e.g., "ACK" or acknowledgement) may correspond to and/or be determined by a message type associated with CoAP message 2400A (e.g., "CON" or confirmable). And in one embodiment, a response code associated with CoAP message 2400B (e.g., "Content") may correspond to and/or be determined by a method code associated with CoAP message 2400A (e.g., "GET"). In this case, CoAP message 2400B may include data associated with the request of CoAP message 2400A (e.g., data associated with an indication of successful access of the session key).

Although FIG. 24B shows CoAP message 2400B with a specific number and type of portions, it should be appreciated that CoAP message 2400B may include a different number and/or type of portions in other embodiments. For example, CoAP message 2400B may include fewer portions or at least one additional portion. As another example, a plurality of portions of CoAP message 2400B may be combined into a smaller number of portions. Although FIG.

24B shows CoAP message 2400B with a specific organization of portions, it should be appreciated that CoAP message 2400B may include a different organization of portions in other embodiments.

CoAP message 2400B may be free of authentication data (e.g., "Authentication Data D") in one embodiment. Where CoAP message 2400B is free of authentication data, CoAP message 2400B may also be free of data associated with a max-age value. Where CoAP message 2400B is free of authentication data, CoAP message 2400B may be free of data associated with one or more query parameters. For example, CoAP message 2400B may be free of a query parameter associated with a unique identifier of a sender of CoAP message 2400B and/or a target system, a query parameter associated with an authentication mechanism used to generate authentication data, a query parameter associated with a nonce, some combination thereof, etc.

In one embodiment, data associated with at least one option may be excluded from CoAP message 2400B. For example, data (e.g., associated with a host, a port, a path, a max-age value, or some combination thereof) used by intermediary systems or devices (e.g., situated between the sender of CoAP message 2400B and the ultimate recipient of CoAP message 2400B) such as a proxy server or other type of computer system or device may be excluded in one or more embodiments where intermediary systems or devices do not exist or are unlikely to exist.

Figure 29:
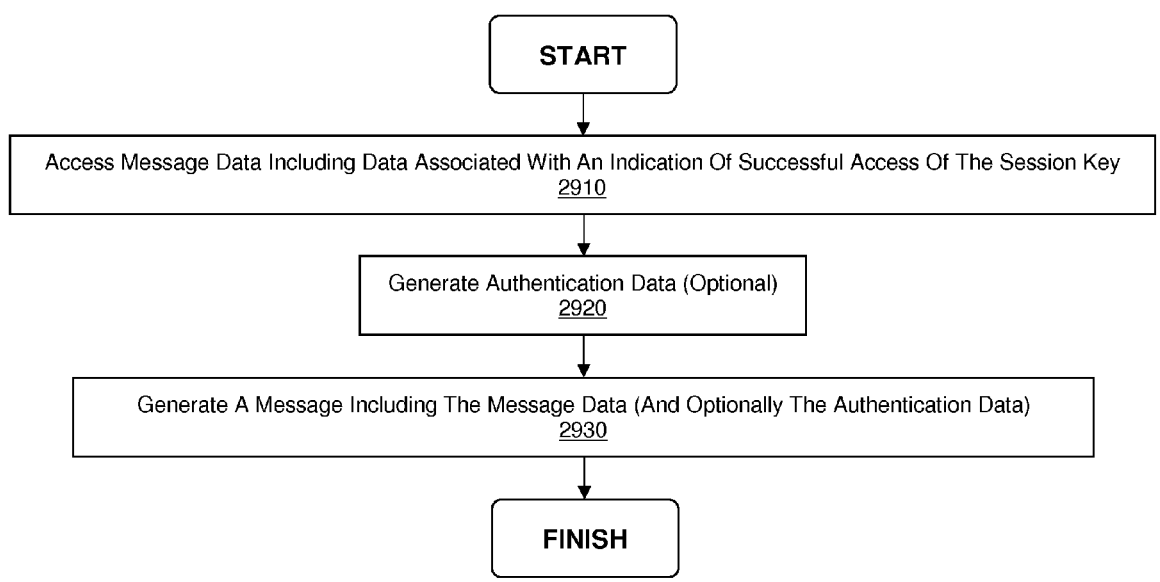
FIG. 29 shows a flowchart of a process for generating a message associated with successful access of a session key in accordance with one embodiment.

Turning back to FIG. 13B, step 1355 may be performed in accordance with one or more steps of process 2900 of FIG. 29 in one embodiment. FIG. 29 shows a flowchart of process 2900 for generating a message associated with successful access of a session key in accordance with one embodiment. In one embodiment, one or more steps of process 2900 may be performed at or by a target system (e.g., the second computer system or computer system 120).

As shown in FIG. 29, step 2910 involves accessing message data including data associated with an indication of successful access of the session key. In one embodiment, step 2510 may be performed using a message generation component (e.g., 124).

In one embodiment, the message data accessed in step 2910 may include data other than authentication data. For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), data other than the authentication data (e.g., "Authentication Data D" of CoAP message 2400B), some combination thereof, etc.

As shown in FIG. 29, step 2920 involves optionally generating authentication data. In one embodiment, step 2920 may be performed using a security component (e.g., 122 of computer system 120).

In one embodiment, the authentication data may be generated in step 2920 using an authentication mechanism such as HMAC, OAuth, OAuth 2.0, OpenID, etc. The authentication data may be generated in step 2920 using a key in one embodiment. For example, where the authentication mechanism used to generate the authentication data in step 2920 is HMAC, the authentication data may be generated by performing a hash function (e.g., MD5, SHA-1, SHA256, SHA512, etc.) on message data (e.g., accessed in step 2910) using a key. And in one embodiment, the message data may be free of the key used to generate the authentication data in step 2920.

An instance of a session key (e.g., accessed and/or stored in step 1345, accessed in step 2660, stored in step 2665, etc.) may be used to generate the authentication data in step 2920 in one embodiment. The instance of the session key may be stored locally at a target system (e.g., the second computer system or computer system 120) in one embodiment. For example, the instance of the session key may be stored locally in a security component (e.g., 122 of computer system 120), in a memory (e.g., of computer system 120), in a database (e.g., of computer system 120), etc. Alternatively, the instance of the session key may be stored remotely (e.g., at another system or device) and accessed by a target system (e.g., the second computer system or computer system 120) in a secure manner in one embodiment. Accordingly, an instance of the session key may be securely accessed and used by a target system (e.g., the second computer system or computer system 120) to generate the authentication data in step 2920 in one embodiment.

As shown in FIG. 29, step 2930 involves generating a message including the message data (e.g., accessed in step 2910). In one embodiment, step 2930 may involve generating a message including the message data (e.g., accessed in step 2910) and the authentication data (e.g., generated in step 2920). In one embodiment, step 2930 may be performed using a message generation component (e.g., 124 of computer system 120).

In one embodiment, where the message generated in step 2930 is a CoAP message (e.g., 2400B), step 2930 may involve formatting the message data (e.g., accessed in step 2910) in accordance with CoAP (e.g., into one or more portions of CoAP message 200). The authentication data (e.g., generated in step 2920) may be included in or as the payload (e.g., associated with portion 250 of CoAP message 200) of the CoAP message in one embodiment. For example, as shown in FIG. 24B, authentication data (e.g., "Authentication Data D") may be included in or as the payload of CoAP message 2400B.

Step 2930 may involve including the data associated with an indication of successful access of the session key (e.g., accessed in step 2910 as at least part of the message data) in or as the payload of the message in one embodiment. For example, as shown in FIG. 24B, data associated with an indication of successful access of the session key (e.g., the data or content of "Key Transfer Successful") may be included in or as the payload of CoAP message 2400B in step 2930. And in one embodiment, data associated with an indication of successful access of the session key (e.g., the data or content of "Key Transfer Successful") may be included in or as another portion of the message in step 2930.

In one embodiment, step 2930 may involve generating a bit stream or byte stream including the message data (e.g., accessed in step 2910). In one embodiment, step 2930 may involve generating a bit stream or byte stream including the message data (e.g., accessed in step 2910) and the authentication data (e.g., generated in step 2920). The bit stream or byte stream may be formatted in accordance with CoAP in one embodiment.

Although FIG. 29 depicts process 2900 as including a specific number of steps, it should be appreciated that process 2900 may include a different number of steps in other embodiments. Although FIG. 29 depicts process 2900 as including a specific ordering of steps, it should be appreciated that process 2900 may include a different ordering of steps in other embodiments.

Turning back to FIG. 13B, step 1360 involves optionally communicating the fourth message (e.g., generated in step 1355 and/or in accordance with one or more steps of process 2900 of FIG. 29) from the second computer system (e.g., 120) to the first computer system (e.g., 110). In one embodiment, the fourth message may be communicated in step 1360 over a connection (e.g., 130 between computer system 110 and computer system 120). The fourth message may be communicated in step 1360 as a bit stream or a byte stream in one embodiment. And in one embodiment, step 1360 may involve communicating the fourth message using at least one communication interface (e.g., 118 of computer system 110, 128 of computer system 120, etc.).

In one embodiment, step 1360 may involve communicating the fourth message using DTLS. For example, where the fourth message is a CoAP message (e.g., 2400B), step 1360 may involve communicating the fourth message over CoAP using DTLS.

Step 1365 involves optionally performing fourth processing associated with the fourth message. In one embodiment, step 1365 may involve performing the fourth processing associated with the fourth message at the first computer system (e.g., 110). For example, responsive to receiving the fourth message (e.g., communicated in step 1360), the first computer system (e.g., 110) may perform the fourth processing. And in one embodiment, the fourth processing may be performed using a security component (e.g., 112).

Where the fourth message includes authentication data, the fourth processing may involve performing message validation with respect to the fourth message in one embodiment. Message validation may be performed in step 1365 based on authentication data accessed from the fourth message in one embodiment. For example, the first computer system (e.g., 110) may generate second authentication data based on at least a portion of the fourth message (e.g., a header, a token, at least one option, a payload marker, a payload, etc.). The second authentication data may be compared to the authentication data (e.g., included in the fourth message) to verify the authenticity of the second computer system (e.g., 120), verify the integrity of the fourth message, detect and/or act on a replay attack, some combination thereof, etc.

In one embodiment, the second authentication data may be generated in step 1365 using an authentication mechanism such as HMAC, OAuth, OAuth 2.0, OpenID, etc. The second authentication data may be generated in step 1365 using a key in one embodiment. For example, where the authentication mechanism used to generate the second authentication data in step 1365 is HMAC, the second authentication data may be generated by performing a hash function (e.g., MD5, SHA-1, SHA256, SHA512, etc.) on at least a portion of the fourth message (e.g., a header, a token, at least one option, a payload marker, a payload, some combination thereof, etc.) using a key. And in one embodiment, the fourth message may be free of the key used to generate the second authentication data in step 1365.

An instance of the session key (e.g., accessed and/or stored in step 1330, accessed in step 2260, stored in step 2270, etc.) may be used to generate the second authentication data in step 1365 in one embodiment. The instance of the session key may be stored locally at the first computer system (e.g., 110) in one embodiment. For example, the instance of the session key may be stored locally in a security component (e.g., 112 of computer system 110), in a memory (e.g., of computer system 110), in a database (e.g., of computer system 110), etc. Alternatively, the instance of the session key may be stored remotely (e.g., at another system or device) and accessed by the first computer system (e.g., 110) in a secure manner in one embodiment. Accordingly, an instance of the session key may be securely accessed and used by the first computer system (e.g., 110) to generate the second authentication data in step 1365 in one embodiment.

In one embodiment, step 1365 may be performed in accordance with one or more steps of process 2800. In this case, the one or more steps of process 2800 may be performed at or by a caller system (e.g., the first computer system or computer system 110).

For example, the fourth message may be processed (e.g., in accordance with step 2810) in step 1365. Message validation may be performed in step 1365 (e.g., in accordance with step 2820), where the message validation may be performed based on authentication data (e.g., included in the fourth message) in one embodiment. If the fourth message is determined to be valid (e.g., in accordance with step 2830), then at least one operation associated with the fourth message may be performed in step 1365 (e.g., in accordance with step 2840). Alternatively, if the fourth message is determined to be invalid (e.g., in accordance with step 2830), then at least one other operation associated with the fourth message may be performed in step 1365 (e.g., in accordance with step 2850).

As shown in FIG. 13B, step 1370 involves increasing the security of communications between the first and second computer systems using the session key. In one embodiment, a respective instance of the session key may be used in step 1370 at each of the first and second computer systems to increase communication security. For example, an instance of the session key (e.g., accessed and/or stored in step 1330, accessed in step 2260, stored in step 2270, etc.) may be used at the first computer system (e.g., 110), whereas another instance of the session key (e.g., accessed and/or stored in step 1345, accessed in step 2660, stored in step 2665, etc.) may be used at the second computer system (e.g., 120).

In one embodiment, communication security may be increased in step 1370 by using at least one instance of the session key to generate authentication data and/or perform message validation based thereon. For example, the first computer system (e.g., 110) may access and use an instance of the session key (e.g., accessed and/or stored in step 1330, accessed in step 2260, stored in step 2270, etc.) to generate authentication data to be included in a message. Responsive to receiving the message, the second computer system (e.g., 120) may use another instance of the session key (e.g., accessed and/or stored in step 1345, accessed in step 2660, stored in step 2665, etc.) to perform message validation with respect to the message. In one embodiment, message validation may be performed (e.g., by the second computer system) with respect to the message by generating second authentication data, based on the message, using the another instance of the session key and determining if the second authentication data correlates to authentication data accessed from the message. In this manner, communication security may be increased by allowing the second computer system to verify the authenticity of the sender of the message (e.g., the first computer system), verify the integrity of the message, detect and/or act on a replay attack, some combination thereof, etc.

As another example, the second computer system (e.g., 120) may access and use an instance of the session key (e.g., accessed and/or stored in step 1345, accessed in step 2660, stored in step 2665, etc.) to generate authentication data to be included in a message. Responsive to receiving the message, the first computer system (e.g., 110) may use another instance of the session key (e.g., accessed and/or stored in step 1330, accessed in step 2260, stored in step 2270, etc.) to perform message validation with respect to the message. In one embodiment, message validation may be performed (e.g., by the first computer system) with respect to the message by generating second authentication data, based on the message, using the another instance of the session key and determining if the second authentication data correlates to authentication data accessed from the message. In this manner, communication security may be increased by allowing the first computer system to verify the authenticity of the sender of the message (e.g., the second computer system), verify the integrity of the message, detect and/or act on a replay attack, some combination thereof, etc.

Communication security may be increased in step 1370 by using at least one instance of the session key to encrypt and/or decrypt at least a respective portion of one or more messages communicated between the first and second computer systems in one embodiment. For example, at least a portion of a message generated by the first computer system (e.g., 110) may be encrypted using the an instance of the session key (e.g., accessed and/or stored in step 1330, accessed in step 2260, stored in step 2270, etc.), and responsive to receiving the message, the encrypted data may be decrypted by the second computer system (e.g., 120) using another instance of the session key (e.g., accessed and/or stored in step 1345, accessed in step 2660, stored in step 2665, etc.). As another example, at least a portion of a message generated by the second computer system (e.g., 120) may be encrypted using the an instance of the session key (e.g., accessed and/or stored in step 1345, accessed in step 2660, stored in step 2665, etc.), and responsive to receiving the message, the encrypted data may be decrypted by the first computer system (e.g., 110) using another instance of the session key (e.g., accessed and/or stored in step 1330, accessed in step 2260, stored in step 2270, etc.). In one embodiment, encryption and/or decryption in step 1370 of at least a respective portion of one or more messages communicated between the first and second computer systems may be performed using AES, Blowfish, RC4, the Extended Tiny Encryption Algorithm (XTEA) scheme, another symmetric-key algorithm, etc.

In one embodiment, at least a portion of a message encrypted and/or decrypted using the session key (or at least one instance thereof) in step 1370 may be the payload of the message. The portion of a message encrypted and/or decrypted using the session key (or at least one instance thereof) in step 1370 may include authentication data generated using the session key (or at least one instance thereof) in one embodiment. And in one embodiment, the portion of a message encrypted and/or decrypted using the session key (or at least one instance thereof) in step 1370 may be free of authentication data (e.g., generated using the session key or at least one instance thereof).

Step 1370 may involve communicating at least one message using DTLS in one embodiment. For example, where the at least one message is a CoAP message (e.g., 200, 500A, 500B, etc.), step 1370 may involve communicating the at least one message over CoAP using DTLS.

Where the session key (or at least one instance thereof) is generated by and/or communicated from a third computer system (e.g., 1430), the third computer system may be used to perform one or more operations on behalf of the second computer system (e.g., 120). For example, the third computer system (e.g., 1430) may determine whether the first computer system (e.g., 110) is authorized to communicate with the second computer system (e.g., 120), verify the authenticity of the first computer system (e.g., 110), verify message integrity, detect and/or act on a replay attack, some combination thereof, etc. In this manner, the third computer system (e.g., 1430) may act as an intermediary or broker to assist the second computer system (e.g., 120), thereby increasing communication security.

In addition to increasing communication security, use of the third computer (e.g., 1430) system can provide other benefits. For example, offloading operations to the third computer system (e.g., 1430) can reduce the processing resources and/or storage resources utilized by the second computer system (e.g., 120) for communication security. As another example, where the storage resources of the third computer system (e.g., 1430) exceed the storage resources of the second computer system (e.g., 120), use of the third computer system (e.g., 1430) to store data (e.g., registration data, permissions data, permissions configuration data, at least one key, at least one secret key, at least one private key, at least one session key, at least one instance of at least one session key, some combination thereof, etc.) associated with the operations (e.g., offloaded to the third computer system) can allow the second computer system (e.g., 120) to communicate with a larger number of computer systems or devices (e.g., including computer system 110, at least one other computer system or device, etc.).

Figure 30A:
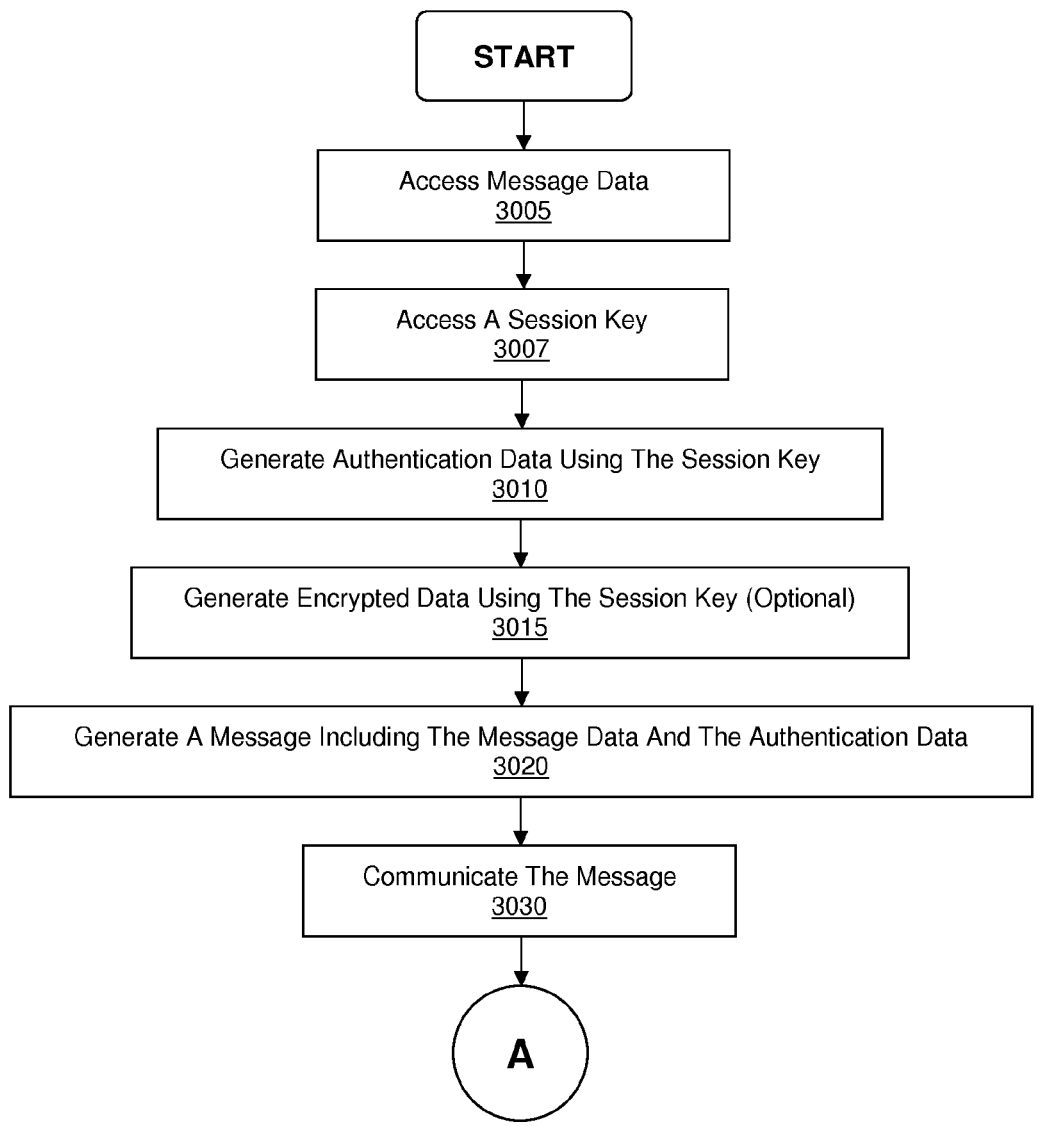
FIG. 30A shows a first portion of a flowchart of a process for increasing communication security in accordance with one embodiment.
Figure 30B:
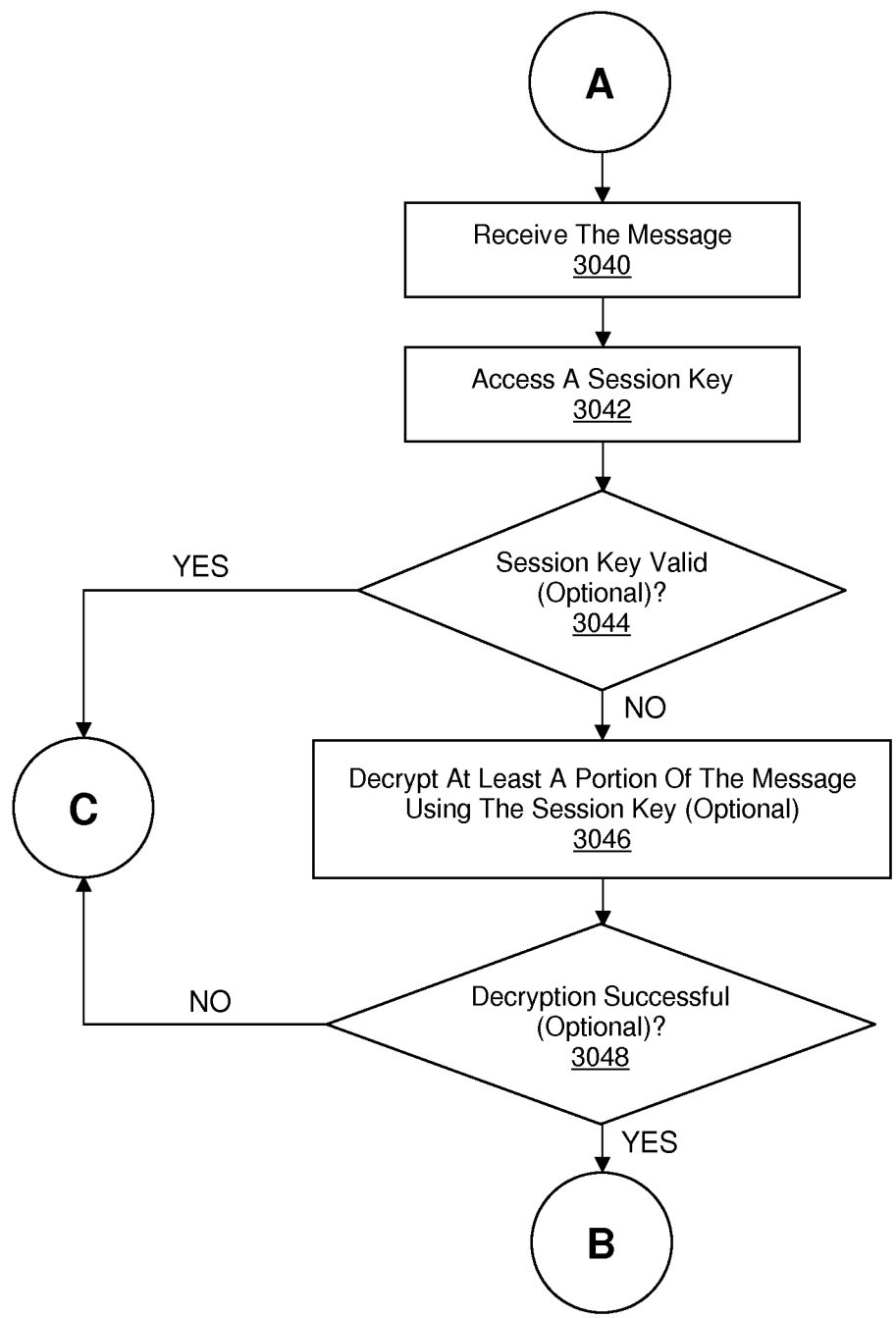
FIG. 30B shows a second portion of a flowchart of a process for increasing communication security in accordance with one embodiment.
Figure 30C:
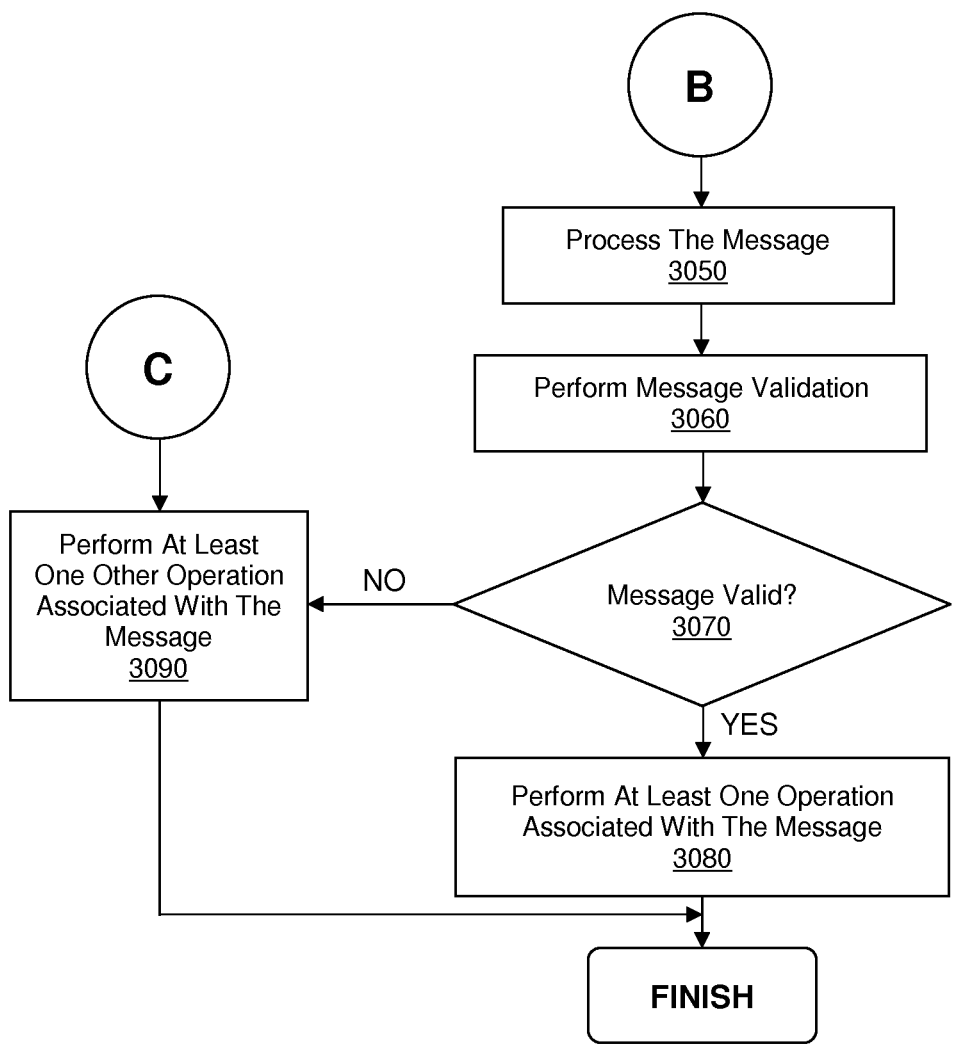
FIG. 30C shows a third portion of a flowchart of a process for increasing communication security in accordance with one embodiment.

In one embodiment, step 1370 may be performed in accordance with one or more steps of process 3000 of FIGS. 30A, 30B, and 30C. FIGS. 30A, 30B, and 30C show a flowchart of process 3000 for increasing communication security in accordance with one embodiment. In one embodiment, one or more steps of process 3000 may be performed during and/or define at least a portion of a session.

As shown in FIG. 30A, step 3005 involves accessing message data. In one embodiment, step 3005 may be performed using a message generation component (e.g., 114 of computer system 110, 124 of computer system 120, etc.).

In one embodiment, the message data accessed in step 3005 may include data other than authentication data. For example, the message data may include data associated with a header (e.g., included in portion 210 of CoAP message 200), data associated with a token (e.g., included in portion 220 of CoAP message 200), data associated with at least one option (e.g., included in portion 230 of CoAP message 200), data associated with a payload marker (e.g., included in portion 240 of CoAP message 200), data associated with at least a portion of a payload (e.g., included in portion 250 of CoAP message 200), data other than the authentication data (e.g., "Authentication Data 1" of CoAP message 500A, "Authentication Data 2" of CoAP message 500B, etc.), some combination thereof, etc.

As shown in FIG. 30A, step 3007 involves accessing a session key (or an instance thereof). In one embodiment, step 3007 may be performed using a security component (e.g., 112 of computer system 110, 122 of computer system 120, etc.).

For example, step 3007 may involve accessing an instance of a session key (e.g., accessed and/or stored in step 1330, accessed in step 2260, stored in step 2270, etc.) at a caller system (e.g., the first computer system or computer system 110). Step 3007 may involve accessing an instance of the session key that is stored locally at a caller system (e.g., the first computer system or computer system 110) in one embodiment. For example, the instance of the session key may be accessed in step 3007 from a security component (e.g., 112 of computer system 110), a memory (e.g., of computer system 110), a database (e.g., of computer system 110), etc. Alternatively, the instance of the session key may be remotely accessed by a caller system (e.g., the first computer system or computer system 110) in step 3007 from another system or device in one embodiment.

As another example, step 3007 may involve accessing an instance of a session key (e.g., accessed and/or stored in step 1345, accessed in step 2660, stored in step 2665, etc.) at a target system (e.g., the second computer system or computer system 120). Step 3007 may involve accessing an instance of the session key that is stored locally at the target system in one embodiment. For example, the instance of the session key may be accessed in step 3007 from a security component (e.g., 122 of computer system 120), a memory (e.g., of computer system 120), a database (e.g., of computer system 120), etc. Alternatively, the instance of the session key may be remotely accessed by the target system in step 3007 from another system or device in one embodiment.

As shown in FIG. 30A, step 3010 involves generating authentication data using the session key (e.g., accessed in step 3007). In one embodiment, step 3010 may be performed using a security component (e.g., 112 of computer system 110, 122 of computer system 120, etc.).

In one embodiment, the authentication data may be generated in step 3010 using an authentication mechanism such as HMAC, OAuth, OAuth 2.0, OpenID, etc. Where the authentication mechanism used to generate the authentication data in step 3010 is HMAC, the authentication data may be generated by performing a hash function (e.g., MD5, SHA-1, SHA256, SHA512, etc.) on message data (e.g., accessed in step 3005) using the session key (e.g., accessed in step 3007). In one embodiment, the message data may be free of the session key (e.g., accessed in step 3007).

As shown in FIG. 30A, step 3015 involves optionally generating encrypted data using the session key. Step 3015 may involve encrypting data to generate the encrypted data (e.g., as or including ciphertext). In one embodiment, the data encrypted in step 3015 may include at least a portion of the message data (e.g., accessed in step 3005), at least a portion of the authentication data (e.g., generated in step 3010), some combination thereof, etc. And in one embodiment, the encrypted data may be generated in step 3015 using AES, Blowfish, RC4, the Extended Tiny Encryption Algorithm (XTEA) scheme, another symmetric-key algorithm, etc.

Where the encrypted data includes authentication data, it should be appreciated that the encrypted authentication data (e.g., as ciphertext) may be generated by performing a plurality of operations using the session key (or an instance thereof). For example, the authentication data may be generated (e.g., in step 3010) using an instance of the session key, and the authentication data (e.g., alone, or with other data or content) may be encrypted (e.g., in step 3015) using the instance of the session key.

In one embodiment, the data encrypted in step 3015 may include data or content associated with a payload. For example, step 3015 may involve encrypting authentication data (e.g., "Authentication Data 1") associated with and/or to be included in a payload of a message (e.g., CoAP message 500A). As another example, step 3015 may involve encrypting authentication data (e.g., "Authentication Data 2") and/or other data (e.g., the data or content of "22.5 C") associated with and/or to be included in a payload of a message (e.g., CoAP message 500B).

As shown in FIG. 30A, step 3020 involves generating a message including the message data (e.g., accessed in step 3005) and the authentication data (e.g., generated in step 3010). In one embodiment, step 3020 may be performed using a message generation component (e.g., 114 of computer system 110, 124 of computer system 120, etc.).

In one embodiment, where the message generated in step 3020 is a CoAP message (e.g., 500A, 500B, etc.), step 3020 may involve formatting the message data (e.g., accessed in step 3005) in accordance with CoAP (e.g., into one or more portions of CoAP message 200). The authentication data (e.g., generated in step 3010) may be included in or as the payload (e.g., associated with portion 250 of CoAP message 200) of the CoAP message in one embodiment. For example, as shown in FIG. 5A, authentication data (e.g., "Authentication Data 1") may be included in or as the payload of CoAP message 500A. As another example, as shown in FIG. 5B, authentication data (e.g., "Authentication Data 2") may be included in or as the payload of CoAP message 500B.

Step 3020 may involve including other data or content (e.g., accessed in step 3005 as at least part of the message data) in or as the payload of the message in one embodiment. For example, as shown in FIG. 5B, other data or content (e.g., "22.5 C") may be included in or as the payload of CoAP message 500B in step 3020. And in one embodiment, other data or content (e.g., accessed in step 3005 as at least part of the message data) may be included in or as another portion of the message in step 3020.

Step 3020 may involve including encrypted data (e.g., generated in step 3015) in or as the payload of the message in one embodiment. For example, where encrypted data includes authentication data (e.g., "Authentication Data 1" as depicted in FIG. 5A), step 3020 may involve including the authentication data as encrypted data (e.g., as ciphertext) in or as the payload of the message (e.g., CoAP message 500A). As another example, where encrypted data includes authentication data (e.g., "Authentication Data 2" as depicted in FIG. 5B) and other data or content (e.g., "22.5 C" as depicted in FIG. 5B), step 3020 may involve including the authentication data and the other data or content as encrypted data (e.g., as ciphertext) in or as the payload of the message (e.g., CoAP message 500B). And in one embodiment, step 3020 may involve including encrypted data (e.g., generated in step 3015) in or as another portion of the message in step 3020.

In one embodiment, step 3020 may involve generating a bit stream or byte stream including the message data (e.g., accessed in step 3005) and the authentication data (e.g., generated in step 3010). In one embodiment, step 3020 may involve generating a bit stream or byte stream including the encrypted data (e.g., generated in step 3015) and/or other data (e.g., at least a portion of the message data, at least a portion of the authentication data, etc.). The bit stream or byte stream may be formatted in accordance with CoAP in one embodiment.

As shown in FIG. 30A, step 3030 involves communicating the message (e.g., generated in step 3020). Where the message is generated (e.g., in step 3020) at a caller system (e.g., the first computer system or computer system 110), step 3030 may involve communicating the message from the caller system to a target system (e.g., the second computer system or computer system 120). Alternatively, where the message is generated (e.g., in step 3020) at a target system (e.g., the second computer system or computer system 120), step 3030 may involve communicating the message from the target system to a caller system (e.g., the first computer system or computer system 110).

In one embodiment, the message may be communicated in step 3030 over a connection (e.g., 130 between computer system 110 and computer system 120). The message may be communicated in step 3030 as a bit stream or a byte stream in one embodiment. And in one embodiment, step 3030 may involve communicating the message using at least one communication interface (e.g., 118 of computer system 110, 128 of computer system 120, etc.).

Step 3030 may involve communicating the message using Datagram Transport Layer Security (DTLS) in one embodiment. For example, where the message is a CoAP message (e.g., 200, 500A, 500B, etc.), step 3030 may involve communicating the message over CoAP using DTLS.

As shown in FIG. 30B, step 3040 involves receiving the message (e.g., communicated in step 3030). Where the message is communicated (e.g., in step 3030) from a caller system (e.g., the first computer system or computer system 110), step 3040 may involve receiving the message at a target system (e.g., the second computer system or computer system 120). Alternatively, where the message is communicated (e.g., in step 3030) from a target system (e.g., the second computer system or computer system 120), step 3040 may involve receiving the message at a caller system (e.g., the first computer system or computer system 110).

In one embodiment, the message may be received in step 3040 over a connection (e.g., 130). The message may be received in step 3040 as a bit stream or a byte stream in one embodiment. And in one embodiment, step 3040 may involve receiving the message using a communication interface (e.g., 118 of computer system 110, 128 of computer system 120, etc.).

Step 3040 may involve receiving the message using Datagram Transport Layer Security (DTLS) in one embodiment. For example, where the message is a CoAP message (e.g., 200, 500A, 500B, etc.), step 3040 may involve receiving the message over CoAP using DTLS.

As shown in FIG. 30B, step 3042 involves accessing a session key (or an instance thereof). And in one embodiment, step 3042 may be performed using a security component (e.g., 112 of computer system 110, 122 of computer system 120, etc.).

Where the message is received at a caller system (e.g., the first computer system or computer system 110) in step 3040, step 3042 may involve accessing an instance of a session key (e.g., accessed and/or stored in step 1330, accessed in step 2260, stored in step 2270, etc.) at the caller system. Step 3042 may involve accessing an instance of the session key that is stored locally at a caller system (e.g., the first computer system or computer system 110) in one embodiment. For example, the instance of the session key may be accessed in step 3042 from a security component (e.g., 112 of computer system 110), a memory (e.g., of computer system 110), a database (e.g., of computer system 110), etc. Alternatively, the instance of the session key may be remotely accessed by a caller system (e.g., the first computer system or computer system 110) in step 3042 from another system or device in one embodiment.

Where the message is received at a target system (e.g., the second computer system or computer system 120) in step 3040, step 3042 may involve accessing an instance of a session key (e.g., accessed and/or stored in step 1345, accessed in step 2660, stored in step 2665, etc.) at the target system. Step 3042 may involve accessing an instance of the session key that is stored locally at a target system (e.g., the second computer system or computer system 120) in one embodiment. For example, the instance of the session key may be accessed in step 3042 from a security component (e.g., 122 of computer system 120), a memory (e.g., of computer system 120), a database (e.g., of computer system 120), etc. Alternatively, the instance of the session key may be remotely accessed by a target system (e.g., the second computer system or computer system 120) in step 3042 from another system or device in one embodiment.

In one embodiment, the session keys accessed in steps 3007 and 3042 may be different instances of the same session key. For example, the session keys accessed in steps 3007 and 3042 may be different instances of the same session key generated (e.g., at or by the third computer system or computer system 1430) in step 1320, in step 2035, etc.

As shown in FIG. 30B, step 3044 involves optionally determining whether the session key (e.g., accessed in step 3042) is valid. In one embodiment, step 3044 may be performed using a security component (e.g., 112 of computer system 110, 122 of computer system 120, etc.).

In one embodiment, step 3044 may involve determining whether the session key (e.g., accessed in step 3042) is valid based on expiration data (e.g., accessed in step 2650). For example, the session key may be determined to be valid in step 3044 if the session key is not expired (e.g., as determined based on the expiration data). As another example, the session key may be determined to be invalid in step 3044 if the session key is expired (e.g., as determined based on the expiration data). If the session key is determined to be valid in step 3044, then step 3046 may be performed.

As shown in FIG. 30B, step 3046 involves optionally decrypting at least a portion of the message using the session key (e.g., accessed in step 3042). In one embodiment, where the message includes encrypted data (e.g., generated in step 3015), the at least a portion of the message decrypted in step 3046 may include the encrypted data. And in one embodiment, the at least a portion of the message may be decrypted in step 3046 using AES, Blowfish, RC4, the Extended Tiny Encryption Algorithm (XTEA) scheme, another symmetric-key algorithm, etc. And in one embodiment, step 3046 may be performed using a security component (e.g., 112 of computer system 110, 122 of computer system 120, etc.).

Step 3046 may involve decrypting at least a portion of the message (e.g., as ciphertext) to generate other data (e.g., as or including plaintext or unencrypted data) in one embodiment. The other data may include at least a portion of the message data (e.g., accessed in step 3005), at least a portion of the authentication data (e.g., generated in step 3010), the data used to generate the encrypted data (e.g., in step 3015), some combination thereof, etc.

The key used to decrypt at least a portion of the message (e.g., in step 3046) and the key used to generate encrypted data (e.g., in step 3015) may be different instances of the same session key (e.g., each stored at and/or accessible to a respective computer system) in one embodiment. In this manner, a symmetric-key algorithm may be used to secure data (e.g., used to generate the encrypted data in step 3015 and/or generated as a result of the decryption performed in step 3046) communicated using one or more messages.

As shown in FIG. 30B, step 3048 involves optionally determining whether the decryption (e.g., performed in step 3046) is successful. In one embodiment, step 3048 may be performed using a security component (e.g., 112 of computer system 110, 122 of computer system 120, etc.). If the decryption (e.g., performed in step 3046) is determined to be successful in step 3048, then step 3050 may be performed.

As shown in FIG. 30C, step 3050 involves processing the message. In one embodiment, step 3050 may involve processing the message as received in step 3040. In one embodiment, step 3050 may involve processing the message including other data generated as a result of decryption performed in step 3046. And in one embodiment, the other data (e.g., generated as a result of decryption performed in step 3046) may be processed in step 3050 alone or in combination with at least one other portion of the message (e.g., in the format or state as received in step 3040).

Processing of the message in step 3050 may involve accessing authentication data from the message in one embodiment. In one embodiment, step 3050 may involve processing the message using a security component (e.g., 112 of computer system 112, 122 of computer system 120, etc.). And in one embodiment, where the message is a CoAP message, step 3050 may be performed in accordance with step 650 and/or one or more steps of process 900 of FIG. 9.

As shown in FIG. 30C, Step 3060 involves performing message validation (e.g., with respect to the message received in step 3040, processed in step 3050, etc.). The message validation may be used to verify the authenticity of the sender of the message and/or the integrity of the message. Where the message includes a nonce, the message validation may be used to detect a replay attack.

In one embodiment, message validation may be performed in step 3060 based on authentication data (e.g., accessed from the message in step 3050). And in one embodiment, message validation may be performed in step 3060 using at least one message invalidity condition.

Where message validation is performed based on authentication data, message validation may be performed in step 3060 by comparing second authentication data to the authentication data in one embodiment. For example, the recipient of the message (e.g., computer system 110, computer system 120, etc.) may generate second authentication data based on at least a portion of the message (e.g., a header, a token, at least one option, a payload marker, a payload, some combination thereof, etc.). The second authentication data may be compared to the authentication data (e.g., included in the message and/or accessed in step 3050) to verify the authenticity of the sender of the message (e.g., computer system 110, computer system 120, etc.), verify the integrity of the message, detect and/or act on a replay attack, some combination thereof, etc.

In one embodiment, the second authentication data may be generated in step 3060 using an authentication mechanism such as HMAC, OAuth, OAuth 2.0, OpenID, etc. The second authentication data may be generated in step 3060 using a key in one embodiment. For example, where the authentication mechanism used to generate the second authentication data in step 3060 is HMAC, the second authentication data may be generated by performing a hash function (e.g., MD5, SHA-1, SHA256, SHA512, etc.) on at least a portion of the message (e.g., a header, a token, at least one option, a payload marker, a payload, some combination thereof, etc.) using a key. And in one embodiment, the message may be free of the key used to generate the second authentication data in step 3060.

An instance of a session key may be used to generate the second authentication data in step 3060 in one embodiment. For example, where the message is received (e.g., in step 3040) at a caller system (e.g., the first computer system or computer system 110), an instance of a session key (e.g., accessed and/or stored in step 1330, accessed in step 2260, stored in step 2270, etc.) may be used by the caller system to generate the second authentication data in step 3060. The instance of the session key may be stored locally at the caller system in one embodiment. For example, the instance of the session key may be stored locally in a security component (e.g., 112 of computer system 110), in a memory (e.g., of computer system 110), in a database (e.g., of computer system 110), etc. Alternatively, the instance of the session key may be stored remotely (e.g., at another system or device) and accessed by the caller system in a secure manner in one embodiment. Accordingly, an instance of a session key may be securely accessed and used by a caller system (e.g., the first computer system or computer system 110) to generate the second authentication data in step 3060 in one embodiment.

As another example, where the message is received (e.g., in step 3040) at a target system (e.g., the second computer system or computer system 120), an instance of a session key (e.g., accessed and/or stored in step 1345, accessed in step 2660, stored in step 2665, etc.) may be used by the target system to generate the second authentication data in step 3060. The instance of the session key may be stored locally at the target system in one embodiment. For example, the instance of the session key may be stored locally in a security component (e.g., 122 of computer system 120), in a memory (e.g., of computer system 120), in a database (e.g., of computer system 120), etc. Alternatively, the instance of the session key may be stored remotely (e.g., at another system or device) and accessed by the target system in a secure manner in one embodiment. Accordingly, an instance of a session key may be securely accessed and used by a target system (e.g., the second computer system or computer system 120) to generate the second authentication data in step 3060 in one embodiment.

Where message validation is performed using at least one message invalidity condition, the message may be determined to be invalid in step 3060 if any of the at least one message invalidity condition is triggered in one embodiment. For example, the message may be determined to be invalid in step 3060 responsive to a failure to access a unique identifier associated with the sender of the message. As another example, the message may be determined to be invalid in step 3060 responsive to a failure to access a nonce from the message. As a further example, the message may be determined to be invalid in step 3060 responsive to determining that a nonce accessed from the message is not different from another nonce accessed from a previous message. As yet another example, the message may be determined to be invalid in step 3060 responsive to determining that a payload of the message is not at least a predetermined size. And as another example, the message may be determined to be invalid in step 3060 responsive to a failure to access a key (e.g., an instance of the session key) used to generate the second authentication data or otherwise perform the message validation.

The message validation may be performed in step 3060 using a security component (e.g., 112 of computer system 110, 122 of computer system 120, etc.) in one embodiment. And in one embodiment, where the message is a CoAP message, step 3060 may be performed in accordance with step 660, one or more steps of process 1000 of FIG. 10, one or more steps of process 1100 of FIG. 11, some combination thereof, etc.

As shown in FIG. 30C, step 3070 involves determining whether the message (e.g., received in step 3040, processed in step 3050, etc.) is valid (e.g., based on the results of the message validation performed in step 3060). Step 3070 may be performed using a security component (e.g., 112 of computer system 110, 122 of computer system 120, etc.) in one embodiment. If it is determined in step 3070 that the message is valid, then step 3080 may be performed.

Step 3080 involves performing at least one operation associated with the message (e.g., received in step 3040, processed in step 3050, etc.). In one embodiment, step 3080 may involve performing at least one operation using an operation component (e.g., 116 of computer system 110, 126 of computer system 120, etc.).

In one embodiment, the at least one operation performed in step 3080 may include at least one operation associated with a request of the message. For example, where the message is associated with a request to obtain data or content (e.g., a temperature, a voltage, etc.), the at least one operation may involve accessing the requested data or content.

The at least one operation performed in step 3080 may include communication of another message in one embodiment. For example, responsive to determining that the message is valid (e.g., in step 3070), another message may be communicated in step 3080 from the recipient of the message. Another message may be communicated in step 3080 to the sender of the message (e.g., received in step 3040, processed in step 3050, etc.), to another computer system or device, etc. In one embodiment, where another message is generated and/or communicated in step 3080, step 3080 may involve repeating or otherwise performing one or more steps of process 3000.

In one embodiment, the at least one operation performed in step 3080 may include at least one operation associated with a response of the message. For example, where the message is associated with a response including data or content, the at least one operation may include processing the data or content, performing one or more other operations with respect to the data or content, etc.

Step 3080 may be performed in accordance with step 2840 of process 2800 in one embodiment. And in one embodiment, where the message (e.g., received in step 3040, processed in step 3050, etc.) is a CoAP message, step 3080 may be performed in accordance with step 680 of process 600.

Alternatively, if it is determined in step 3070 that the message (e.g., received in step 3040, processed in step 3050, etc.) is not valid, then at least one other operation associated with the message may be performed in step 3090. In one embodiment, step 3090 may involve performing at least one operation using an operation component (e.g., 116 of computer system 110, 126 of computer system 120, etc.).

In one embodiment, step 3090 may involve acting responsive to a message validation failure such as a triggering of a message invalidity condition (e.g., corresponding to one or more steps of process 1100, a failure to access a unique identifier associated with the sender of the message, a failure to access a nonce from the message, determining that a nonce accessed from the message is not different from another nonce accessed from a previous message, determining that a payload of the message is not at least a predetermined size, a failure to access a key used to generate the second authentication data or otherwise perform the message validation, some combination thereof, etc.), another message validation failure (e.g., determining that the second authentication data generated based on at least a portion of the message does not correlate to authentication data accessed from the message, another message validation failure, etc.), etc. And in one embodiment, step 3090 may involve acting on a suspected or detected replay attack.

The at least one other operation performed in step 3090 may include ignoring the message (e.g., received in step 3040, processed in step 3050, etc.) in one embodiment. For example, another message may not be generated and/or communicated in reply to the message (e.g., received in step 3040, processed in step 3050, etc.) in step 3090. As another example, no further processing related to the message (e.g., received in step 3040, processed in step 3050, etc.) may be performed in step 3090. And in one embodiment, the at least one other operation performed in step 3090 may include limiting access to the recipient (e.g., of the message received in step 3040) of the sender (e.g., of the message communicated in step 3030).

In one embodiment, one or more steps of process 3000 may be repeated with respect to at least one other message. For example, where a message is generated and communicated (e.g., in accordance with one or more steps of process 3000), at least one other message may be generated and/or communicated (e.g., in accordance with one or more steps of process 3000). In one embodiment, the message may be associated with a request, and the at least one other message may be associated with at least one response (e.g., related to the request of the message).

Although FIG. 30 depicts process 3000 as including a specific number of steps, it should be appreciated that process 3000 may include a different number of steps in other embodiments. Although FIG. 30 depicts process 3000 as including a specific ordering of steps, it should be appreciated that process 3000 may include a different ordering of steps in other embodiments.

Although FIG. 14 shows system 1400 with a specific number and type of systems or devices, it should be appreciated that system 1400 may include a different number and/or type of systems or devices in other embodiments. For example, system 1400 may include more than one instance of computer system 110 and/or computer system 120 in one or more other embodiments. Where system 1400 includes more than one instance of computer system 110, each instance of computer system 110 may communicate with computer system 120 over a respective connection (e.g., similar to connection 130). Where system 1400 includes more than one instance of computer system 120, each instance of computer system 120 may communicate with computer system 110 over a respective connection (e.g., similar to connection 130). As such, embodiments can increase the security associated with communication of messages between any number of systems or devices.

Although FIGS. 13A and 13B depict process 1300 as including a specific number of steps, it should be appreciated that process 1300 may include a different number of steps in other embodiments. Although FIGS. 13A and 13B depict process 1300 as including a specific ordering of steps, it should be appreciated that process 1300 may include a different ordering of steps in other embodiments.

In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction thereto. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of increasing communication security, said method comprising:
    receiving, at a first computer system, a first message including a first data portion and a second data portion, wherein said first data portion is associated with a security token, wherein said first data portion includes a first instance of a session key, and wherein said second data portion includes a second instance of said session key;

generating a second message including said first data portion;

communicating said second message from said first computer system for delivery to a second computer system;

receiving, at said first computer system, a third message from said second computer system; and performing, using said second instance of said session key, message validation associated with said third message.

2. The method of claim 1, wherein said first data portion includes said security token, and wherein said security token includes a unique identifier associated with said first computer system, a unique identifier associated with said second computer system, expiration data associated with said security token, and said first instance of said session key.

3. The method of claim 1, wherein said receiving further comprises receiving said first message from a third computer system, and further comprising:

generating, at said first computer system, a fourth message associated with communication between said first computer system and said second computer system, wherein said fourth message includes a unique identifier associated with said second computer system; and communicating said fourth message from said first computer system for delivery to said third computer system, and wherein said receiving further comprises receiving said first message responsive to said communicating said fourth message.

4. The method of claim 1 further comprising:

decrypting, at said first computer system, said second data portion using a key associated with said first computer system; and storing said second instance of said session key at said first computer system.

5. The method of claim 1, wherein said first message includes authentication data, and further comprising:

performing, at said first computer system, message validation associated with said first message, wherein said performing message validation associated with said first message comprises performing message validation based on said authentication data, and wherein said generating further comprises generating said second message if said first message is valid, and wherein said communicating further comprises communicating said second message if said first message is valid.

6. The method of claim 1 further comprising:

generating authentication data using said second instance of said session key;

generating a fourth message including said authentication data; and communicating said fourth message from said first computer system for delivery to said second computer system.

7. The method of claim 6 further comprising:

encrypting, using said second instance of said session key, data to generate encrypted data, wherein said data includes said authentication data, and wherein said generating said fourth message further comprises including said encrypted data as a payload of said fourth message.

8. The method of claim 1, wherein said third message includes authentication data, wherein said performing message validation comprises performing message validation based on said authentication data, and further comprising:

if said third message is valid, performing at least one operation associated with said third message.

9. The method of claim 8 further comprising:

decrypting, using said second instance of said session key, a payload of said third message to access said authentication data, and wherein said performing message validation further comprises performing message validation responsive to said decrypting.

10. The method of claim 1, wherein said first message, said second message, and said third message are Constrained Application Protocol (CoAP) messages.

11. The method of claim 1, wherein said receiving said first message comprises receiving said first message using Datagram Transport Layer Security (DTLS), wherein said communicating comprises communicating said second message using DTLS, and wherein said receiving said third message comprises receiving said third message using DTLS.

12. An apparatus comprising:

a communication interface configured to receive a first message including a first data portion and a second data portion, wherein said first data portion is associated with a security token, wherein said first data portion includes a first instance of a session key, and wherein said second data portion includes a second instance of said session key;

a message generation component configured to generate a second message including said first data portion; and a security component, and wherein said communication interface is further configured to communicate said second message, wherein said communication interface is further configured to receive a third message, and wherein said security component is configured to perform, using said second instance of said session key, message validation associated with said third message.

13. The apparatus of claim 12, wherein said first data portion includes said security token, and wherein said security token includes a unique identifier associated with a first computer system, a unique identifier associated with a second computer system, expiration data associated with said security token, and said first instance of said session key.

14. The apparatus of claim 12, wherein said communication interface and said message generation component are part of a first computer system, and wherein said communication interface is further configured to communicate said second message from said first computer system for delivery to a second computer system.

15. The apparatus of claim 14, wherein said communication interface is further configured to receive said first message from a third computer system, wherein said message generation component is further configured to generate a fourth message associated with communication between said first computer system and said second computer system, wherein said fourth message includes a unique identifier associated with said second computer system, wherein said communication interface is further configured to communicate said fourth message from said first computer system for delivery to said third computer system, and wherein said communication interface is further configured to receive said first message responsive to said communicating said fourth message.

16. The apparatus of claim 14 further comprising:
a security component configured to decrypt said second data portion using a key associated with said first computer system; and
a memory configured to store said second instance of said session key, and
wherein said security component and said memory are part of said first computer system.

17. The apparatus of claim 14, wherein said first message includes authentication data,
wherein said security component is further configured to perform, based on said authentication data, message validation associated with said first message, wherein said security component is part of said first computer system,
wherein said message generation component is further configured to generate said second message if said first message is valid, and
wherein said communication interface is further configured to communicate said second message if said first message is valid.

18. The apparatus of claim 14, wherein said security component is further configured to generate authentication data using said second instance of said session key, wherein said security component is part of said first computer system, and
wherein said message generation component is further configured to generate a fourth message including said authentication data, and
wherein said communication interface is further configured to communicate said fourth message from said first computer system for delivery to said second computer system.

19. The apparatus of claim 18, wherein said security component is further configured to encrypt, using said second instance of said session key, data to generate encrypted data, wherein said data includes said authentication data, and wherein said message generation component is further configured to include said encrypted data as a payload of said fourth message.

20. The apparatus of claim 14, wherein said communication interface is further configured to receive said third message from said second computer system, wherein said third message includes authentication data,
wherein said security component is further configured to perform said message validation based on said authentication data, and further comprising:
an operation component configured to perform, if said third message is valid, at least one operation associated with said third message, and
wherein said security component and said operation component are part of said first computer system.

21. The apparatus of claim 20, wherein said security component is further configured to decrypt, using said second instance of said session key, a payload of said third message to access said authentication data, and wherein said security component is further configured to perform said message validation responsive to decryption of said payload.

22. The apparatus of claim 14, wherein said first message, said second message, and said third message are Constrained Application Protocol (CoAP) messages.

23. The apparatus of claim 14, wherein said communication interface is further configured to receive said first message using Datagram Transport Layer Security (DTLS), wherein said communication interface is further configured to communicate said second message using DTLS, and wherein said communication interface is further configured to receive said third message using DTLS.

24. An apparatus comprising:
means for receiving, at a first computer system, a first message including a first data portion and a second data portion, wherein said first data portion is associated with a security token, wherein said first data portion includes a first instance of a session key, and wherein said second data portion includes a second instance of said session key;
means for generating a second message including said first data portion;
means for communicating said second message from said first computer system for delivery to a second computer system;
means for receiving, at said first computer system, a third message from said second computer system; and
means for performing, using said second instance of said session key, message validation associated with said third message.

25. The apparatus of claim 24, wherein said first data portion includes said security token, and wherein said security token includes a unique identifier associated with said first computer system, a unique identifier associated with said second computer system, expiration data associated with said security token, and said first instance of said session key.

26. The apparatus of claim 24, wherein said means for receiving further comprises means for receiving said first message from a third computer system, and further comprising:
means for generating, at said first computer system, a fourth message associated with communication between said first computer system and said second computer system, wherein said fourth message includes a unique identifier associated with said second computer system; and
means for communicating said fourth message from said first computer system for delivery to said third computer system, and
wherein said means for receiving further comprises means for receiving said first message responsive to communication of said fourth message.

27. The apparatus of claim 24 further comprising:
means for decrypting, at said first computer system, said second data portion using a key associated with said first computer system; and
means for storing said second instance of said session key at said first computer system.

28. The apparatus of claim 24, wherein said first message includes authentication data, and further comprising:
means for performing, at said first computer system, message validation associated with said first message, wherein said means for performing message validation associated with said first message comprises means for performing message validation based on said authentication data, and
wherein said means for generating further comprises means for generating said second message if said first message is valid, and
wherein said means for communicating further comprises means for communicating said second message if said first message is valid.

29. The apparatus of claim 24 further comprising:
means for generating authentication data using said second instance of said session key;

means for generating a fourth message including said authentication data; and means for communicating said fourth message from said first computer system for delivery to said second computer system.

30. The apparatus of claim 29 further comprising:

means for encrypting, using said second instance of said session key, data to generate encrypted data, wherein said data includes said authentication data, and wherein said means for generating said fourth message further comprises means for including said encrypted data as a payload of said fourth message.

31. The apparatus of claim 24, wherein said third message includes authentication data, wherein said means for performing message validation comprises means for performing message validation based on said authentication data, and further comprising:

means for performing, if said third message is valid, at least one operation associated with said third message.

32. The apparatus of claim 31 further comprising:

means for decrypting, using said second instance of said session key, a payload of said third message to access said authentication data, and wherein said means for performing message validation further comprises means for performing message validation responsive to decryption of said payload.

33. The apparatus of claim 24, wherein said first message, said second message, and said third message are Constrained Application Protocol (CoAP) messages.

34. The apparatus of claim 24, wherein said means for receiving said first message comprises means for receiving said first message using Datagram Transport Layer Security (DTLS), wherein said means for communicating comprises means for communicating said second message using DTLS, and wherein said means for receiving said third message comprises means for receiving said third message using DTLS.

* * * * *